United States Patent [19]

Daniels

[11] 3,920,628

[45] Nov. 18, 1975

[54] 2''-DEOXYAMINOGLYCOSIDES AND 2'''-EPI-AMINO-3'''-DESAMINO DERIVATIVES THEREOF, METHODS FOR THEIR MANUFACTURE AND NOVEL INTERMEDIATES USEFUL THEREIN

[75] Inventor: Peter J. L. Daniels, Cedar Grove, N.J.

[73] Assignee: Schering Corporation, Kenilworth, N.J.

[22] Filed: Oct. 24, 1972

[21] Appl. No.: 300,083

[52] U.S. Cl.... 260/210 AB; 260/210 K; 260/210 R; 424/180
[51] Int. Cl.² ........................................ C07H 15/22
[58] Field of Search.................. 260/210 AB, 210 K

[56] References Cited
UNITED STATES PATENTS

| | | | |
|---|---|---|---|
| 3,268,508 | 8/1966 | Sugazawa et al................. | 260/210 K |
| 3,651,042 | 3/1972 | Marquez et al. ............. | 260/210 AB |
| 3,828,021 | 8/1974 | Beattie et al. ................ | 260/210 AB |

*Primary Examiner*—Johnnie R. Brown
*Attorney, Agent, or Firm*—Mary S. King

[57] ABSTRACT

Novel 2''-deoxy-pseudotrisaccharide aminoglycoside antibacterials include 2''-deoxygentamicins and related 2''-deoxyaminoglycosides and 2''-epi-amino-3''-desamino derivatives thereof.

Aminoglycoside antibiotics and antibacterially active derivatives thereof having a 2''-hydroxyl group and per-N-substituted amino functions are converted to a 2''-O-hydrocarbonsulfonyl ester and thence to a 2''-lower alkylthio-2''-deoxy derivative or to a 2''-epi-sulfhydryl-2''-deoxy derivative, followed by treatment thereof with a reductive desulfurization agent to obtain a 2''-deoxyaminoglycoside derivative.

In an alternate process, N-protecting groups are removed from a 2''-O-hydrocarbonsulfonylaminoglycoside derivative followed by ring closure thereof to form a 2''-deoxy-3''-desamino-2'',3''-epimino-aminoglycoside; hydrogenolysis of the foregoing or treatment thereof with a sulfur nucleophile followed by desulfurization produces a product mixture comprising a 2''-deoxyaminoglycoside and a 2''-deoxy-2''-epi-amino-3''-desamino-aminoglycoside.

36 Claims, No Drawings

2″-DEOXYAMINOGLYCOSIDES AND 2″-EPI-AMINO-3″-DESAMINO DERIVATIVES THEREOF, METHODS FOR THEIR MANUFACTURE AND NOVEL INTERMEDIATES USEFUL THEREIN

FIELD OF THE INVENTION

This invention relates to novel compositions of matter, to methods for their manufacture and to novel intermediates useful therein.

More specifically, this invention relates to novel 2″-deoxyaminoglycosides, 2″-deoxy-2″-epimethylamino-3″-desmethylamino-aminoglycosides and 2″deoxy-2″-epiamino 3″-desamino-aminoglycosides having antibacterial activity, to methods for their manufacture and to novel intermediates useful therein.

In particular, this invention relates to novel 2″-deoxygentamicins and 2″-deoxy derivatives of related aminoglycosides such as 2″-deoxysisomicin, 2″-deoxytobramycin, 2″-deoxyverdamicin and 3′,4′,2″-trideoxykanamycin B, and to the 2″-epi-methylamino-3″-desmethylamino (or 2″-epi-amino-3″-desamino-)-derivatives thereof, to methods for their manufacture from aminoglycoside antibiotics and antibacterially active derivatives thereof having a 2″-hydroxy group, and to novel intermediates useful therein, including 2″-O-hydrocarbonsulfonyl- and per-N-substituted-2″-O-hydrocarbonsulfonyl-derivatives, per-N-substituted-2″-alkythio-2″-deoxy derivatives, 2″-epi-sulfhydryl-2″-deoxy-and mono- and per-N-substituted-2″-epi-sulfhydryl-2″-deoxy-derivatives, 2″-deoxy-3″-desmethylamino-2″,3″-N-methylepimino (or 2″-deoxy-3″-desamino-2″,3″-epimino) derivatives, 2″-deoxy-3″-desamino-(or desmethylamino)-2″-epi-amino (or 2″-epi-N-methylamino-3″-epi-hydrocarbonthio (and acylthio)-derivatives and their per-N-substituted derivatives, 2″-deoxy-2″-hydrocarbonthio(and acylthio)-derivatives and their per-N-substituted derivatives, and per-N-substituted-2″-deoxy derivatives of gentamicin (particularly of gentamicin $C_1$, gentamicin $C_{1a}$ and gentamicin $C_2$), and of sisomicin, tobramycin, verdamicin and 3′,4′-dideoxykanamycin B, as well as cyclic ketals and acetals of the foregoing.

PRIOR ART

It is known that certain bacteria are resistant to aminoglycoside antibiotics and that this resistance can be mediated by infectious R-factors which are capable of enzymatic modifications of the antibiotics, producing derivatives of the antibiotics which are inactive against the bacteria. It is known, for example, that N-acetylation, O-phosphorylation and O-adenylylation are mechanisms of inactivation of aminoglycoside antibiotics by certain R-factor carrying bacteria.

The gentamicin C complex is cidal against phosphorylating and N-acetylating strains of R-factor-carrying bacteria; however, certain gram-negative bacteria (e.g. *Klebsiella pneumoniae* and *Escherichia coli*) have developed an R-factor-mediated resistance to the gentamicin C complex with concomitant inactivation of gentamicin C. This resistance is attributable to the ability of these bacteria to O-adenylylate gentamicin C, producing 2″-adenylylgentamicin C which is inactive as an antibacterial.

By my invention, 2″-deoxy derivatives and 2″-deoxy-2″-epi-methylamino-3″-desmethylamino derivatives of gentamicin and of related aminoglycoside antibiotics and derivatives thereof are prepared which have anti-bacterial activity, the preferred compounds of which, advantageously, are active against bacteria resistant to gentamicin, particularly against the R-factor-carrying strains of bacteria which adenylylate gentamicin. By my invention, therefore, 2″-deoxyaminoglycoside antibiotic derivatives are prepared which possess an improved antibacterial spectrum over that possessed by the parent aminoglycoside antibiotic or derivative thereof having a 2″-hydroxyl function.

SUMMARY OF INVENTION

A composition-of-matter aspect of this invention includes antibacterially active chemical compounds having a pseudotrisaccharide aminoglycoside structure, said compounds being 2″-deoxy derivatives and 2″-deoxy-2″epi-methylamino-3″-desmethylamino (or 2″-deoxy-2″-epi-amino-3″-desamino) derivatives of aminoglycoside antibiotics and antibacterially active derivatives thereof, which possess a 2″-hydroxy group. Of particular interest are the 2″-deoxyaminoglycoside antibacterials, particularly 2″-deoxygentamicin $C_1$, 2″-deoxygentamicin $C_{1a}$, 2″-deoxygentamicin $C_2$, 2″-deoxysisomicin, 2″-deoxyverdamicin, and non-toxic pharmaceutically acceptable acid addition salts of the foregoing which possess antibacterial activity, preferred compounds being those active against adenylylating R-factor-carrying strains of bacteria which are resistant to gentamicin C.

Another composition-of-matter aspect of this invention relates to chemical compounds valuable as intermediates in the preparation of the 2″-deoxyaminoglycoside antibacterials of this invention, said intermediates having a pseudotrisaccharide aminoglycoside structure and being derived from known aminoglycoside antibiotics having a 2″-hydroxy function and antibacterially active derivatives thereof. Included are 2′λ′-O-hydrocarbonsulfonyl aminoglycoside derivatives as well as 2″-O-hydrocabonsulfonyl derivatives wherein all the primary and secondary amino groups are protected by a member selected from the group consisting of lower alkanoyl, carbobenzyloxy, lower thioalkanoyl, thioaroyl, and lower alkylthiocarbamoyl, and wherein protectable neighboring primary and secondary hydroxyl groups are optionally converted to a cyclic ketal or acetal selected from the group consisting of alkylidene, cycloalkylidene and aralkylidene, or wherein any primary hydroxyl group is converted to a triphenylmethyl ether derivative or is converted to a hydrocarbonsulfonate ester. Other intermediates include 2″-epi-sulfhydryl-2″-deoxy derivatives having free amino and free hydroxyl groups as well as those having protected amino and protected hydroxyl groups; 2″-deoxy-2″-hydrocarbonthio(or 2″-acylthio) derivatives and the per-N-substituted derivatives thereof; per-N-substituted-2″-epi-benzylthio-2″-deoxy derivatives; 2″-deoxy-3″-desmethylamino (or desamino)-2″-epi-N-methylamino-(or epi-amino)-3″-epi-hydrocarbonthio-(or epi-acylthio)-derivatives and their per-N-substituted derivatives; 2″-deoxy-3″-desmethylamino-2″,3″-N-methylepimino or 2″-deoxy-3″-desamino-2″,3″-epimino derivatives; per-N-substituted-2″-deoxyaminoglycosides; and per-N-substituted-2″-deoxy-3″-desmethylamino(or desamino)-2″-epi-N-methylamino (or epi-amino)-aminoglycosides; including acetals and ketals of the foregoing as well as acetals and ketals of the 2″-deoxyaminoglycoside antibacterials of this invention. Preferred intermediates are those derived from the aminoglycoside antibiotic precursors of the preferred 2''-deoxyaminoglycosides of this invention, e.g. those derived from gentamicin $C_1$, gentamicin $C_{1a}$, gentamicin $C_2$, sisomicin, and verdamicin.

The processes of this invention are, in general, directed toward the removal of the 2''-hydroxyl group in an aminoglycoside antibiotic or antibacterially active derivative thereof to obtain the corresponding, novel 2''-deoxyaminoglycoside derivative having antibacterial activity.

Briefly, in one process, the 2''-hydroxyl group of the aminoglycoside is converted to a 2''-hydrocarbonsulfonate ester which, in turn is converted to a 2''-deoxy-2''-thiol (or epithiol) derivative which is then desulfurized to form a 2''-deoxyaminoglycoside of this invention (see Chart A hereinbelow).

More specifically, by this process, an antibacterially active aminoglycoside having a 2''-hydroxy function, the primary and secondary amino groups of which are protected by a member selected from the group consisting of lower alkanoyl, lower thioalkanoyl, thioaroyl, and lower alkylthiocarbamoyl, and protectable primary and secondary hydroxyl groups of which are converted to an O-protecting function selected from the group consisting of a triphenylmethyl ether (also called a trityl ether) of a primary hydroxyl group and a cyclic ketal or cyclic acetal of protectable, neighboring hydroxyl groups, is treated with a hydrocarbonsulfonyl halide having up to eight carbon atoms in a tertiary amine, wherey is formed a 2''-O-hydrocarbonsulfonylaminoglycoside intermediate which is then converted to a 2''-thio-2''-deoxyaminoglycoside intermediate. This conversion is effected by treating a per-N-lower alkanoyl-2''-O-hydrocarbonsulfonylaminoglycoside with an alkali metal salt of a lower alkylthiol in an anhydrous, polar, non-hydroxylic solvent, optionally followed by acid hydrolysis of any O-protecting functions present, whereby the 2''-thio-2''-deoxy- intermediate formed is a 2''-lower alkylthio-2''-per-N-lower alkanoylaminoglycoside; alternatively said conversion is effected by heating a member selected from the group consisting of a per-N-thio-alkanoyl-2''-O-hydrocarbonsulfonylaminoglycoside, a per-N-thioaroyl-2''-O-hydrocarbonsulfonylaminoglycoside, and a per-N-alkylthiocarbamoyl-2''-O-hydrocarbonsulfonylaminoglycoside intermediate in an aqueous medium at temperatures in the range of from about 25°C to about 150°C followed by removal of any sulfur-containing amino protecting groups in the thereby formed 2''-epi-sulfhydryl-2''-deoxyaminoglycoside after otpional acid hydrolysis of any protecting groups present, whereby is formed a 2''-thio-2''-deoxy intermediate selected from the group consisting of a 2''-epi-sulfhydryl-2''-deoxyaminoglycoside, a 2''-epi-hydrocarbonthio-2''-deoxy-3''-N-lower alkanoyl (or aroyl or N'-lower alkyl carbamoyl)-amino-glycoside, said hydrocarbon having up to 8 carbon atoms, and a 2''-epi-carboxymethylenethio-2''-deoxy-3''-N-lower alkanoyl (or N'-lower alkylcarbamoyl)-aminoglycoside; removal of the 2''-thio function of said 2''-thio-2''-deoxyaminoglycoside intermediate is then effected, optionally after all free amino and sulfhydryl functions are acylated (e.g. acetylated) by treatment with a reductive desulfurization agent selected from the group consisting of Raney Nickel and aluminum amalgam, followed by alkaline hydrolysis of any amino protecting groups, whereby is obtained a 2'''-deoxyaminoglycoside of this invention.

In the foregoing process, the sulfur containing groups may be removed from said 2''-thio-2''-deoxy intermediate by alkaline hydrolysis which will remove all the N-protecting groups; or, alternatively, by S-alkylating the 2''-epi-sulfhydryl-2''-deoxyper-N-thioalkanoyl (or thioaroyl or N'-alkylthio carbamoyl)-aminoglycoside with a hydrocarbon halide having up to eight carbon atoms or with an α-halogenoalkanoic acid whereby is formed a 2''-epi-hydrocarbonthio (or carboxyalkylenethio)-2''-deoxy-3''-N-alkanoyl (or aroyl or N'-alkylcarbamoyl)-aminoglycoside having thioalkanoyl (or thioaroyl or N'-alkylthiocarbamoyl) quaternary salt derivatives of the other amino groups therein, which quaternary salts are conveniently removed by treatment with hydrogen sulfide.

Another process of this invention comprises treating an aminoglycoside antibiotic or antibacterially active derivative thereof having a 2''-hydroxy function and a 3''-primary or secondary amino function, the primary and secondary amino groups of which are protected by carbobenzyloxy groups, and any protectable primary and secondary neighboring hydroxyl groups of which are converted to a cyclic acetal or ketal function, with a hydrocarbonsulfonyl halide having up to eight carbon atoms in a tertiary amine; removing the carbobenzyloxy protecting groups by treating the 2''-O-hydrocarbonsulfonyl-per-N-carbobenzyloxyaminoglycoside thereby formed with hydrogen in the presence of a catalyst or by cleavage with an alkali metal in liquid ammonia; converting the resulting 2''-O-hydrocarbonsulfonylaminoglycoside to the corresponding 2''-deoxy-3''-desamino-2'',3''-epimino intermediate by means selected from the group consisting of spontaneous formation, and heating at temperatures in the range of from about 25° to about 100°C in lower alkanol alone or in the presence of an alkali metal salt of a lower alkanol; treating the corresponding 2''-deoxy-3''-desamino-2'',3''-epimino-aminoglycoside thereby formed with hydrogen in the presence of a catalyst or with a sulfur nucleophile, optionally followed by conversion of the resulting product mixture comprising a 2''-deoxy-2''-thiol- and a 2''-deoxy-2''-epi-amino-3''-desamino-3''-epi-thiointermediate to a per-N-substituted derivative thereof, followed by desulfurization (e.g. with Raney Nickel or aluminum amalgam), removal of any N-protecting groups with base and removal of any acetal or ketal functions with acid; whereby is obtained a 2''-deoxyaminoglycoside and the corresponding 2''-deoxy-2''-epi-amino-3''-desaminoaminoglycosides, respectively. Separation of the product mixture may be carried out either before or after removal of the N-protecting groups.

GENERAL DESCRIPTION OF THE INVENTION

Antibacterial Composition-of-Matter Aspect

Included among the antibacterially active compositions-of-matter aspect of this invention are compounds selected from the group consisting of 2''-deoxyaminoglycosides of the following structural formulae Ia and Ib, the corresponding 3''-desamino-2''-epi-amino derivatives thereof, and the non-toxic, pharmaceutically acceptable acid addition salts of the foregoing:

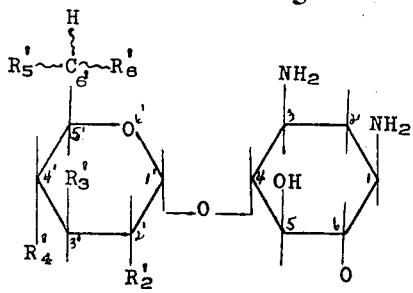
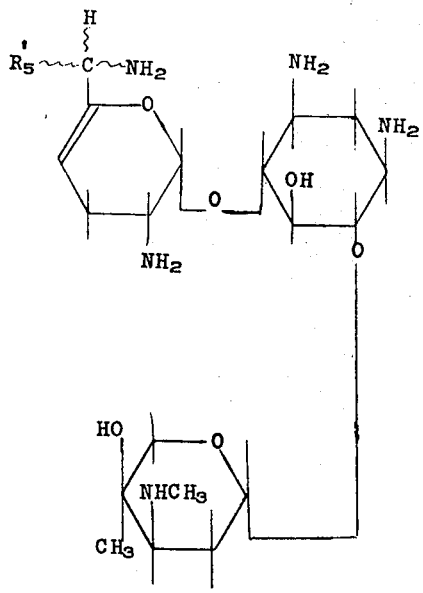

I(a)

I(b)

wherein $R_2'$ is a member selected from the group consisting of amino and hydroxy; $R_3'$ and $R_4'$ are each members selected from the group consisting of hydrogen and hydroxy; $R_5'$ is a member selected from the group consisting of hydrogen and methyl; $R_6'$ is a member selected from the group consisting of hydroxy, amino and methylamino; $R_3''$ and $R_4''$ are each members selected from the group consisting of hydrogen and methyl; and $R_5''$ is a member selected from the group consisting of hydrogen and hydroxymethyl.

The anti-bacterially active 3''-desamino-2''-epi-amino derivatives of the 2''-deoxyaminoglycosides of above formulae I(a) and I(b) are thus defined by following formulae II(a) and II(b):

wherein $R_2'$, $R_3'$, $R_4'$, $R_5'$, $R_6'$, $R_3''$, $R_4''$ and $R_5'$ are as defined hereinabove for formulae I(a) and I(b).

The compounds defined by the structural formulae in this specification and in the claims are numbered in accordance with standard practice for aminoglycosides such as disclosed hereinabove. The terminal glycoside rings are numbered according to usual carbohydrate nomenclature with prime numbers allocated to the 2-amino, 6-amino or 2,6-diaminosugar ring, double prime numbers allocated to the 3-amino-sugar ring and regular numbers assigned to the 2-deoxystreptamine ring with the carbon atom to which the 3-aminosugar unit is attached designated as position 6.

The stereoconfigurations of the 2''-deoxyamino-

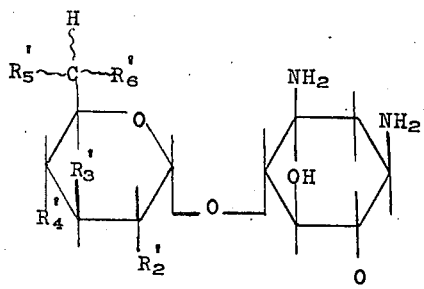
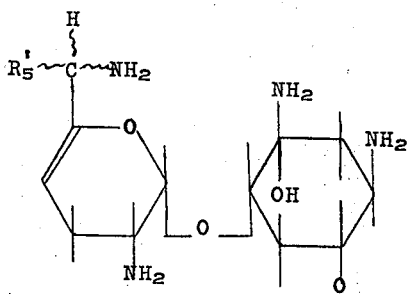

II(a)

II(b)

glycosides of formulae I(a), I(b), II(a) and II(b) are the same as those of their corresponding 2''-hydroxy precursors. Compounds designated as 2''-epi-derivatives have substituents at the 2''-position which are of opposite stereochemistry to those of the 2''-hydroxyl groups of the antibiotic precursors. In this specification and in the claims, while the structural formulae of the compounds of this invention will be designated in planar fashion as indicated hereinabove; it is to be understood, however, that the stereoconfiguration of the compounds defined thereby is the same as that of their 2''-hydroxyaminoglycoside precursors.

The anti-bacterially active compounds of this invention as defined by formulae Ia and Ib include the following:

2''-deoxygentamicin A (a compound of formula Ia wherein $R_2'$ is amino, $R_3'$, $R_4'$ and $R_6'$ are each hydroxy, $R_5'$, $R_4''$ and $R_5''$ are each hydrogen, and $R_3''$ is methyl);

2''-deoxygentamicin B (a compound of formula Ia wherein $R_2'$, $R_3'$ and $R_4'$ are each hydroxy, $R_6'$ is amino, $R_5'$ and $R_5''$ are each hydrogen, and $R_3''$ and $R_4''$ are each methyl);

2''-deoxygentamicin $B_1$ (a compound of formula Ia wherein $R_2'$, $R_3'$ and $R_4'$ are each hydroxy, $R_6'$ is amino, $6R_5'$, $R_3''$ and $R_4''$ are each methyl, and $R_5''$ is hydrogen);

2''-deoxygentamicin $X_2$ (a compound of formula Ia wherein $R_2'$ is amino, $R_3'$, $R_4'$ and $R_6'$ are each hydroxy, $R_5'$ and $R_5''$ are each hydrogen and $R_3''$ and $R_4''$ are each methyl);

2''-deoxy-Antibiotic JI-20-A (a compound of formula Ia wherein $R_2'$ and $R_6'$ are each amino, $R_3'$ and $R_4'$ are each hydroxy, $R_5'$ and $R_5''$ are each hydrogen, and $R_3''$ and $R_4''$ are each methyl);

2''-deoxy-Antibiotic JI-20-B (a compound of formula Ia wherein $R_2'$ and $R_6'$ are each amino, $R_3'$ and $R_4'$ are each hydroxy, $R_5'$, $R_3''$ and $R_4''$ are each methyl, and $R_5''$ is hydrogen);

2''-deoxytobramycin (a compound of formula Ia wherein $R_2'$ and $R_6'$ are each amino, $R_3'$, $R_5'$, $R_3''$ and $R_4''$ are each hydrogen, $R_4'$ is hydroxy, and $R_5''$ is hydroxymethyl); and 3',4',2''-trideoxykanamycin B (a compound of formula Ia wherein $R_2'$ and $R_6'$ are each amino, $R_3'$, $R_4'$, $R_5'$, $R_3''$ and $R_4''$ are each hydrogen, and $R_5''$ is hydroxymethyl).

A preferred group of compounds of my invention include those defined by formula Ib. Also preferred are compounds of formula Ia when $R_2'$ is amino, $R_3'$, $R_4'$ and $R_5''$ are each hydrogen, $R_3''$ and $R_4''$ are each methyl, $R_5'$ is hydrogen or methyl, and $R_6'$ is amino or methylamino, said compounds being defined by following formula Ia and include the non-toxic, pharmaceutically acceptable acid addition salts thereof:

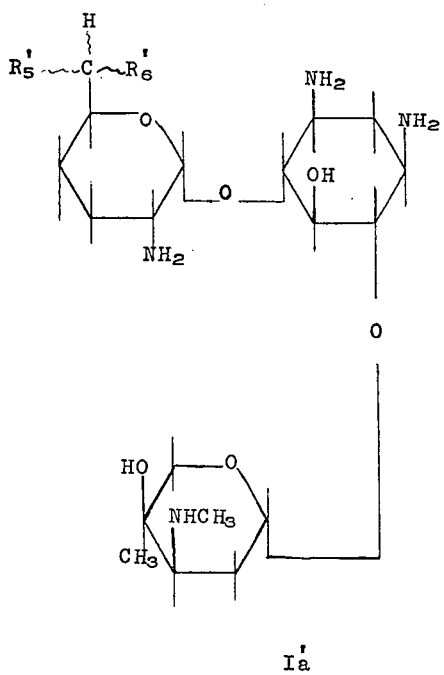

Ia' wherein $R_5'$ and $R_6'$ are as defined hereinabove for the compounds of formulae I(a) and I(b).

Included within this preferred group of compounds are:

2''-deoxygentamicin $C_1$ (compound of formula Ia' wherein $R_5'$ is methyl and $R_6'$ is methylamino);

2''-deoxygentamicin $C_{1a}$ (compound of formula $I_a'$ wherein $R_5'$ is hydrogen and $R_6'$ is amino);

2''-deoxygentamicin $C_2$ (compound of formula $I_a'$ wherein $R_5'$ is methyl and $R_6'$ is amino; the stereochemistry at C-6' being R);

2''-deoxygentamicin $C_{2a}$ (compound of formula $I_a'$ wherein $R_5'$ is methyl, $R_6'$ is amino, the sterochemistry at C-6' being S);

2''-desoxysisomicin (a compound of formula Ib wherein $R_5'$ is hydrogen); and

2''-deoxyverdamicin (a compound of formula Ib wherein $R_5'$ is methyl).

Exemplary of the antibacterially active compounds of this invention as defined by formula II(a) and II(b) are 2''-deoxy-3''-desamino-2''-epi-amino-aminoglycosides such as:

2''-deoxy-2''-epi-methylamino-3''-desmethylaminogentamicin $C_1$ (a compound of formula II(a) wherein $R_2'$ is amino, each of $R_3'$, $R_4'$ and $R_5''$ are hydrogen, each of $R_5'$, $R_3''$ and $R_4''$ are methyl, and $R_6'$ is methylamino);

2''-deoxy-2''-epi-methylamino-3''-desmethylaminogentamicin $C_{1a}$ (a compound of formula II(a) wherein each of $R_2'$ and $R_6'$ are amino, each of $R_3'$, $R_4'$, $R_5'$ and $R_5''$ are hydrogen, and each of $R_3''$ and $R_4''$ are methyl);

2''-deoxy-2''-epi-methylamino-3''-desmethylaminogentamicin $C_2$ (a compound of formula II(a) wherein each of $R_2'$ and $R_6'$ are amino, each of $R_3'$, $R_4'$ and $R_5''$ are hydrogen, and each of $R_5'$, $R_3''$ and $R_4''$ are methyl);

2''-deoxy-2''-epi-methylamino-3''-desmethylaminosisomicin (a compound of formula II(b) wherein $R_5'$ is hydrogen);

2''-deoxy-2''-epi-methylamino-3''-desmethylaminoverdamicin (a compound of formula II(b) wherein $R_5'$ is methyl);

2''-deoxy-2''-epi-amino-3''-desaminotobramycin (a compound of formula II(a) wherein each of $R_2'$ and $R_6'$ are amino, each of $R_3'$, $R_5'$, $R_4''$ and $R_3''$ are hydrogen, $R_4'$ is hydroxy and $R_5''$ is hydroxymethyl); and 3',4',2''-trideoxy-2''-epi-amino-3''-desaminokanamycin B (a compound of formula II(a) wherein each of $R_2'$, and $R_6'$ are amino, each of $R_3'$, $R_4'$, $R_5'$, $R_3''$ and $R_4''$ are hydrogen and $R_5''$ is hydroxymethyl).

The compounds of this invention as defined by formulae I(a) and I(b), e.g. 2''-deoxygentamicin $C_1$, 2''-deoxygentamicin $C_{1a}$, 2''-deoxygentamicin $C_2$, 2''-deoxysisomicin, 2''-deoxyverdamicin, 2''-deoxytobramycin, and 3',4',2''-trideoxykanamycin B and the 2''-epi-methylamino (or epi-amino)-3''-desmethylamino (or 3''-desamino)-derivatives thereof of formula II(a) and II(b) are characterized by being white amorphous powders.

Also included in the composition of matter aspect of this invention are pharmaceutically acceptable acid addition salts of the 2''-deoxyaminoglycosides as defined by formulae I(a), I(b), II(a) and II(b) which are made according to known procedures such as by neutralizing the free base with the appropriate acid to below about pH 7.0 and, advantageously, to about pH 2 to pH 6. Suitable acids for this purpose include acids such as hydrochloric and sulfuric.

The physical embodiments of the acid addition salts of the 2''-deoxyaminoglycosides of this invention are characterized by being white solids which are soluble in water and alcohols, e.g. methanol, ethanol, and the like, and are insoluble in most polar and non-polar organic solvents.

The compounds of this invention as defined by formulae I(a), I'(a), I(b), II(a) and II(b) and their non-toxic pharmaceutically acceptable acid addition salts, in general, exhibit anti-bacterial activity and usually have a spectrum of activity similar to that of their 2''-hydroxy precursors. Of these, some also exhibit antiprotozoal, anti-amoebic and/or anthelmintic properties. The preferred 2''-deoxyaminoglycosides of my invention (e.g. 2''-deoxygentamicin $C_1$, 2''-deoxygentamicin $C_{1a}$, 2''-deoxygentamicin $C_2$, 2''-deoxygentamicin $C_{2a}$, 2''-deoxysisomicin and 2''-deoxyverdamicin) are broad spectrum anti-bacterial agents, being active against gram positive bacteria (e.g. *Staphylococcus aureus*) and gram negative bacteria (e.g. *Escherichia Coli* and *Pseudomonas aeruginosa*) as determined by standard dilution tests mentioned hereinbelow. Advantageously, my preferred compounds are also cidal against the R-factor-carrying strains of bacteria which adenylylate gentamicin; thus, my preferred 2''-deoxyaminoglycosides exhibit an improved antibacterial spectrum over that possessed by the 2''-hydroxy precursor.

Compounds Useful as Intermediates

Compounds of this invention useful as intermediates are novel derivatives of known aminoglycoside antibiotics having a 2''-hydroxy function including compounds selected from the group consisting of 2''-O-hydrocarbonsulfonyl derivatives such as defined by structural formula III(a) and III(b) shown hereinbelow and the cyclic ketal and cyclic acetal derivatives thereof:

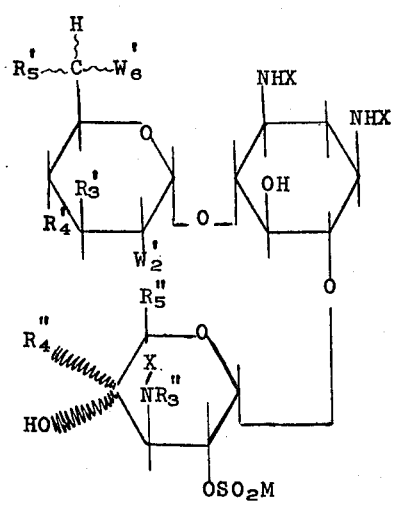

III(a)

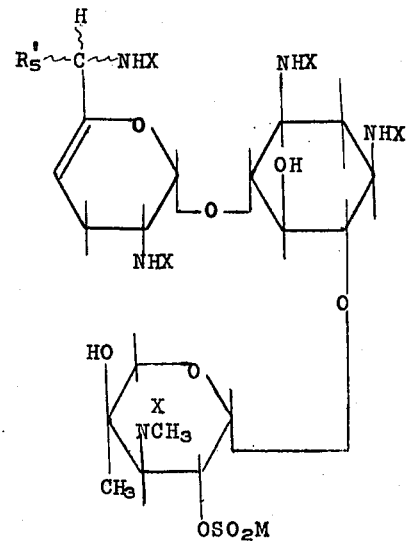

III(b)

wherein M is a hydrocarbon having up to 8 carbon atoms; X is a member selected from the group consisting of lower alkanoyl, carbobenzyloxy, lower thioalkanoyl, thioaroyl, and lower alkylthiocarbamoyl; $W_2'$ is a member selected from the group consisting of hydroxy and —NHX, X being as defined hereinabove; $W_6'$ is a member selected from the group consisting of hydroxy, —NHX and

X being as defined hereinabove; $R_3'$, $R_4'$, $R_5'$, $R_3''$, $R_4''$ and $R_5''$ being as defined for formula I(a).

The 2''-O-hydrocarbonsulfonyl derivatives contemplated are those derived from hydrocarbonsulfonic acids having up to 8 carbon atoms including ethanesulfonic acid, benzenesulfonic acid, p-toluenesulfonic acid, and preferably, methanesulfonic acid (i.e. compounds of formulae III(a) and III(b) hereinabove wherein M is ethyl, phenyl, p-tolyl, and preferably, methyl, respectively).

By "lower alkanoyl" are contemplated acyl radicals of lower alkanoic acids having up to 8 carbon atoms including propionyl, valeryl, caprylyl, and preferably, acetyl. Similarly, by lower thioalkanoyl is contemplated acyl radicals of thioalkanoic acids having up to 8 carbon atoms including acyl radicals such as thiopropionyl, thiocaprylyl and, preferably, thioacetyl.

By "thioaroyl" are contemplated acyl radicals of arylthiocarboxylic acids having up to 8 carbon atoms including thiobenzoyl, thiotoluyl and thiomesityloyl.

By "lower alkyl" are contemplated hydrocarbons having up to eight carbon atoms; thus, the radical "lower alkylthiocarbamoyl" includes radicals such as ethylthiocarbamoyl, n-propylthiocarbamoyl, n-butyl-thiocarbamoyl and preferably, methylthiocarbamoyl.

By "protectable neighboring hydroxyl groups" are contemplated vicinal and non-vicinal hydroxyl groups which together will form ketal and acetal functions with ketone derivatives and with aldehydes. Exemplary of such protectable hydroxyl groups are the 2', 3', 4',-hydroxy groups to gentamicin B and $B_1$, the 4',6'-hydroxy groups in gentamicin A and $X_2$ and in Antibiotic G-418, the 3', 4'-hydroxy groups in Antibiotics JI-20-A and JI-20-B, and the 4'',6''-hydroxy groups in tobramycin and 3', 4'-dideoxykanamycin B.

The cyclic ketal and acetal derivatives of said neighboring protectable hydroxyl groups of this invention include O-alkylidene (e.g. O-iso-propylidene), O-cycloalkylidene (e.g. O-cyclohexylidene) and O-aralkylidene (e.g. O-benzylidene) derivatives.

The preferred intermediates of formula III(a) and III(b) are those wherein M is methyl, X is a member selected from the group consisting of acetyl, carbobenzyloxy, thioacetyl, thiobenzoyl and methylthiocarbamoyl, and wherein said derivatives are derived from gentamicin $C_1$, gentamicin $C_{1a}$, gentamicin $C_2$, gentamicin $C_{2a}$, sisomicin and verdamicin. Preferred intermediates of formulae III(a) and III(b) include the following per-N-acetyl derivatives wherein M is methyl, X is acetyl, $W_2'$ is N-acetylamino, and wherein $R_3'$, $R_4'$, $R_3''$, $R_4''$ and $R_5''$ are the substituents defined for the corresponding positions of formula I(a);

2''-O-methanesulfonyl-1,3,2',6',3''-penta-N-acetyl-gentamicin $C_1$ (compound of formula III(a) wherein $W_6'$ is N-acetyl-N-methylamino and $R_5'$ is methyl);

2''-O-methanesulfonyl-1,3,2',6',3''-penta-N-acetyl-gentamicin $C_{1a}$ (compound of formula III(a) wherein $W_6'$ is N-acetylamino and $R_5'$ is hydrogen);

2''-O-methanesulfonyl-1,3,2',6',3''-penta-N-acetyl gentamicin $C_2$ (compound of formula III(a) wherein $W_6'$ is N-acetylamino and $R_5'$ is methyl), the stereochemistry at C-6' being R.

2''-O-methanesulfonyl-1,3,2',6',3''-penta-N-acetyl-gentamicin $C_2a$ (compound of formula III(a) wherein $W_6'$ is N-acetylamino and $R_5'$ is methyl, the stereochemistry at C-6' being S);

2''-O-methanesulfonyl-1,3,2',6',3''-penta-N-acetyl sisomicin (a compound of formula III(b) wherein $R_5'$ is hydrogen);

2''-O-methanesulfonyl-1,3,2',6',3''-penta-N-acetyl-verdamicin (a compound of formula III(b) wherein $R_5'$ is methyl).

Other useful intermediates of formulae III (a and b) include those derived from gentamicin A, gentamicin B, gentamicin $B_1$, gentamicin $X_2$ and Antibiotics JI-20-A, JI-20-B and G-418 which have protectable neighboring hydroxyl groups converted to a cyclic ketal thereof, preferably the isopropylidene derivative, such as the following:

2''-O-methanesulfonyl-4',6'-O-iso-propylidene-1,3,2',3''-tetra-N-acetylgentamicin A (a compound of formula III(a) wherein M is methyl, X is acetyl, $W_2'$ is N-acetylamino, $R_5'$, $R_4''$ and $R_5''$ are each hydrogen, $R_3''$ is methyl, and $R_3'$, $R_4'$ and $W_6'$ are each hydroxyl groups of which $W_6'$ and $R_4'$ are converted to the corresponding cyclic O-iso-propylidene ketal thereof);

2''-O-methanesulfonyl-2',3'(and 3',4')-O-iso-propylidene-1,3,6',3''-tetra-N-acetylgentamicin B(a compound of formula III(a) wherein M is methyl, X is acetyl, $W_6'$ is N-acetylamino, $R_5'$ and $R_5''$ are each hydrogen, $R_3''$ and $R_4''$ are each methyl, and $W_2'$ and $R_3'$ and $R_4'$ are hydroxyl groups converted to the corresponding 2',3' (and 3',4')-O-iso-propylidene ketal derivative thereof;

2''-O-methanesulfonyl-2',3'(or 3',4')-O-iso-propylidene-1,3,6',3''-tetra-N-acetylgentamicin $B_1$;

2''-O-methanesulfonyl-4',6'-O-iso-propylidene-1,3,2',3''-tetra-N-acetylgentamicin $X_2$;

2''-O-methanesulfonyl-3',4'-O-iso-propylidene-1,3,2',6',3''-penta-N-acetylantibiotic JI-20-A;

2''-O-methanesulfonyl-3',4'-O-iso-propylidene-1,3,2',6',3''-penta-N-acetylantibiotic JI-20-B; and 2''-O-methanesulfonyl-4',6'-O-iso-propylidene-1,3,2',3''-tetra-n-acetylantibiotic G-418.

In addition to the foregoing, valuable intermediates of the invention as defined by formula III(a) and III(b) are per-N-carbobenzyloxy, per-N-thioacetyl, per-N-thiobenzoyl and per-N-methyl-thiocarbamoyl derivatives of the 2''-O-methanesulfonyl esters of gentamicin $C_1$, gentamicin $C_{1a}$, gentamicin $C_2$, gentamicin $C_{2a}$, sisomicin and verdamicin; the 4',6'-O-iso-propylidene-per-N-carbobenzyloxy, the 4',6'-O-iso-propylidene-per-N-thioacetyl, the 4',6'-O-iso-propylidene-per-N-thiobenzoyl and the 4',6'-O-iso-propylidene-per-N-methylthiocarbamoyl derivatives of the 2''-O-methanesulfonyl esters of gentamicin A, gentamicin $X_2$ and of Antibiotic G-418; the 3',4'-O-iso-propylidene-per-N-carbobenzyloxy, the 3',4'-O-isopropylidene-per-N-thioacetyl, the 3',4'-O-iso-propylidene-per-N-thiobenzoyl and the 3',4'-O-iso-propylidene-per-N-methylthiocarbamoyl derivatives of the 2''-O-methanesulfonyl esters of Antibiotic JI-20-A and JI-20-B; as well as product mixtures comprising the 2',3'(and 3',4')-O-iso-propylidene-per-N-carbobenzyloxy, the 2',3' (and 3',4')-O-iso-propylidene-per-N-thioacetyl, the 2',3' (and 3',4')-O-iso-propylidene-per-N-thiobenzoyl and the 2',3' (and 3',-4')-O-iso-propylidene-per-N-methylthiocarbamoyl derivatives of the 2''-O-methanesulfonyl esters of gentamicin B and gentamicin $B_1$.

Also included within this invention are 2''-O-hydrocarbonsulfonyl derivatives of formulae III(a and b) of 2''-hydroxyaminoglycoside antibiotics having primary hydroxyl groups wherein said primary hydroxyl groups is either protected by an ether derivative, e.g. an O-triphenylmethylether derivative, or the primary hydroxyl group is also converted to its hydrocarbonylsulfonyl ester. Typical derivatives of this group are:

2''-O-methanesulfonyl-6''-O-triphenylmethyl-1,3,2',6',3''-penta-N-thioacetyltobramycin, 2''-O-methanesulfonyl-6''-O-triphenylmethyl-1,3,2',6',3''-penta-N-thioacetyl-3',4'-dideoxykanamycin B, 6'-O-triphenylmethyl-2''-O-methanesulfonyl-1,3,2',3''-tetra-N-thioacetylgentamicin A, 6'-O-triphenylmethyl-2''-O-methanesulfonyl-1,3,2',3''-tetra-N-thioacetylgentamicin X$_2$, 2'',6''-di-O-methanesulfonyl-1,3,2',6',3''-penta-N-acetyltobramycin, and 2'',6''-di-O-methanesulfonyl-1,3,2',6',3''-penta-N-acetyl-3',4'-dideoxykanamycin B.

The 2''-O-hydrocarbonsulfonyl derivatives of formulae III(a and b) are valuable as intermediates in all the processes of this invention. As described hereinbelow in detailed description of the processes, they are conveniently prepared from the corresponding 2''-hydroxy-per-N-substituted aminoglycosides having protectable hydroxyl groups derivatized (preferably as the O-iso-propylidene derivative) by treatment thereof with a hydrocarbonylsulfonyl halide (preferably methanesulfonyl chloride) in a tertiary amine (preferably pyridine).

Other useful intermediates of this invention include 2''-lower alkylthio-2''-deoxy derivatives of 2''-hydroxyaminoglycoside antibiotics selected from the group consisting of compounds defined by formulae IV (a and b) shown hereinbelow:

gen and hydroxy; $R_5'$ $R_3''$ and $R_4''$ are each a member selected from the group consisting of hydrogen and methyl; and the cyclic ketal and cyclic acetal derivatives thereof.

Preferred derivatives defined by formulae IV(a) and IV(b) are those wherein "alkyl" is ethyl and wherein Y is acetyl. Preferred intermediates of this invention thus include:

2''-ethylthio-2''-deoxy-1,3,2',6',3''-penta-N-acetylgentamicin C$_1$,

2''-ethylthio-2''-deoxy-1,3,2',6',3''-penta-N-acetylgentamicin C$_{1a}$,

2''-ethylthio-2''-deoxy-1,3,2',6',3''-penta-N-acetylgentamicin C$_2$,

2''-ethylthio-2''-deoxy-1,3,2',6',3''-penta-N-acetylgentamicin C$_{2a}$,

2''-ethylthio-2''-deoxy-1,3,2',6',3''-penta-N-acetylsisomicin, and

2''-ethylthio-2''-deoxy-1,3,2',6',3''-penta-N-acetylverdamicin.

Other useful 2''-alkylthio-2''-deoxy derivatives of Formulae IV(a and b) include:

Product mixture comprising 2''-ethylthio-2''-deoxy-2',3')-O-iso-propylidene-1,3,6',3''-tetra-N-acetylgentamicin B;

Product mixture comprising 2''-ethylthio-2''-deoxy-2',3'(and 3',4')-O-iso-propylidene-1,3,6',3''-tetra-N-acetylgentamicin B$_1$;

2''-ethylthio-2''-deoxy-3',4'-O-iso-propylidene-1,3,2',6'3''-penta-N-acetyl Antibiotic JI-20-A;

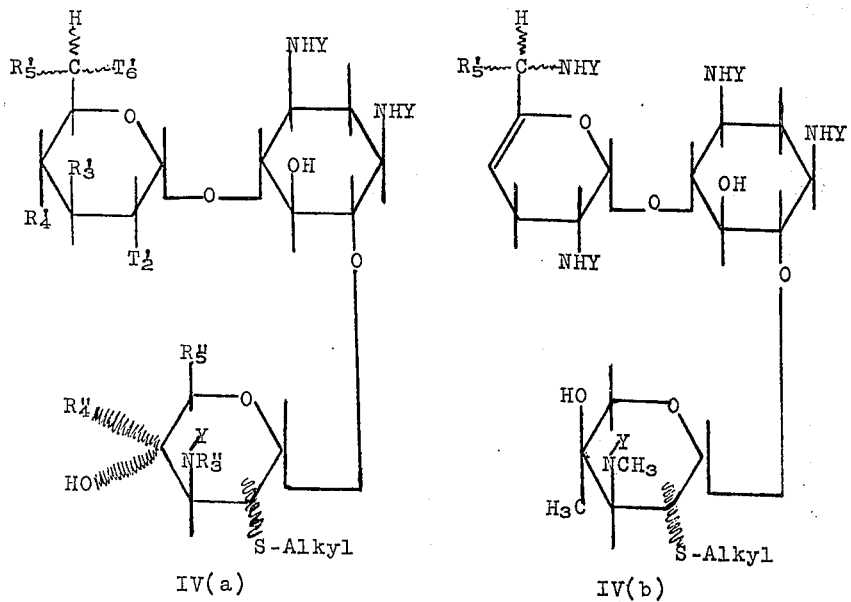

IV(a)  IV(b)

wherein "alkyl" is a hydrocarbon having up to 8 carbon atoms; Y is lower alkanoyl; $T_2'$ is a member selected from the group consisting of hydroxy and —NHY, Y being as defined hereinbelow; $T_6'$ is a member selected from the group consisting of hydroxy, —NHY and

Y being as defined hereinabove; $R_3'$ and $R_4'$ are each members selected from the group consisting of hydro- 2''-ethylthio-2''-deoxy-3',4'-O-iso-propylidene-1,3,2',6',3''-penta-N-acetyl Antibiotic JI-20-B;

2''-ethylthio-2''-deoxy-4',6'-O-iso-propylidene-1,3,2',3''-tetra-N-acetyl Antibiotic G-418.

The intermediates of formulae IV(a) and IV(b) are useful in a process of this invention as shown in Chart A and described in detail hereinbelow. The intermediates of formulae IV(a) and IV(b) are conveniently prepared from the per-N-acetyl derivatives of formulae III(a) and III(b) by treatment thereof with lithium thioethylate in dimethylformamide as described in detail in the Examples and in the detailed description of the processes of this invention.

Other novel intermediates of this invention include compounds selected from the group consisting of 2''-epi-sulfhydryl-2''-deoxy-per-N-substituted derivatives of known aminoglycoside antibiotics defined by formulae V(a) and V(b) shown hereinbelow, and cyclic ketals and acetals thereof;

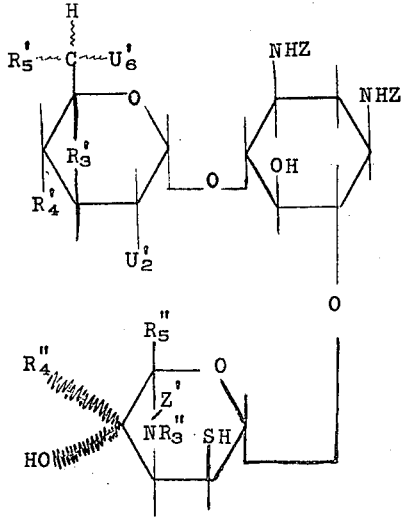

V(a)

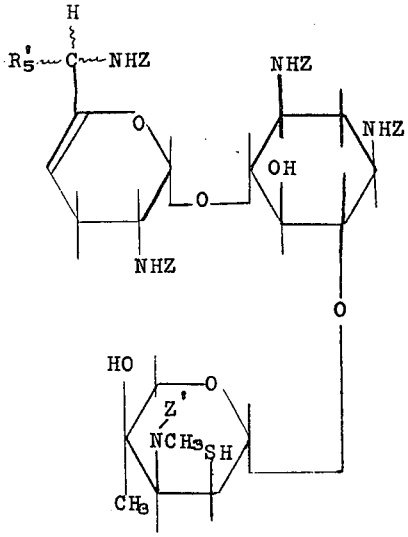

V(b)

wherein Z is a member selected from the group consisting of lower thioalkanoyl, thioaroyl and lower alkylthiocarbamoyl, Z' is a member selected from the group consisting of lower alkanoyl, aroyl and lower alkylcarbamoyl, $U_2'$ is a member selected from the group consisting of hydroxy, N-thioalkanoylamino, N-thioaroylamino and N-alkylthiocarbamoylamino, $U_6'$ is a member selected from the group consisting of hydroxy, —NHZ and

Z being as defined hereinabove, $R_3'$, $R_4'$, $R_5'$, $R_3''$, $R_4''$ and $R_5''$ being as defined for formula I(a).

Preferred 2''-epi-sulfhydryl-2''-deoxy-per-N-substituted intermediates of formulae V (a and b) are those wherein the alkanoyl group is acetyl, the aroyl group is benzoyl and the alkyl group is methyl and wherein said derivatives are derived from gentamicin $C_1$, gentamicin $C_1$ a, gentamicin $C_2$, gentamicin $C_2$a, sisomicin and verdamicin. Preferred intermediates of formulae V (a and b) thus include the following:

2'''-epi-sulfhydryl-2''-deoxy-3'''-N-acetyl-tetra-N-thioacetylgentamicin $C_1$ (a compound of formula Va wherein Z is thioacetyl, Z' is acetyl, $U_2'$ is N-thioacetylamino, $U_6'$ is N-thioacetyl-N-methylamino, $R_3'$, and $R_4'$ and $R_5''$ are each hydrogen, and $R_5'$, $R_3''$ and and $R_4''$ are each methyl), 2''-epi-sulfhydryl-2''-deoxy-3'''-N-(N'-methylcarbamoyl)-1,3,2',6'-tetra-N-(N'-methylthiocarbamoyl) gentamicin $C_1$ (a compound of formula Va wherein Z is methylthiocarbamoyl, Z' is methylcarbamoyl, $U_2'$ is N-methylthiocarbamoylamino, $U_6'$ is N'-methylthiocarbamoyl-N-methylamino, $R_3'$, $R_4'$ and $R_5''$ are each hydrogen, and $R_5'$, $R_3''$ and $R_4''$ are each methyl), 2''-epi-sulfhydryl-2''-deoxy-3'''-N-acetyl-1,3,2',6',-tetra-N-thioacetylgentamicin $C_1$a, 2''-epi-sulfhydryl-2''-deoxy-3'''-N-(N'-methylcarbamoyl)-1,3,2',6'-tetra-N-(N'-methylthiocarbamoyl)gentamicin $C_1$a, 2''-epi-sulfhydryl-2''-deoxy-3'''-N-acetyl-1,3,2',6'-tetra-N-thioacetylgentamicin $C_2$, 2''-epi-sulfhydryl-2''-deoxy-3'''-N-(N'-methylcarbamoyl)-1,3,2',6'-tetra-N-(N'-methylthiocarbamoyl) gentamicin $C_2$, 2''-epi-sulfhydryl-2''-deoxy-3'''-N-benzoyl-1,3,2', 6'-tetra-N-thiobenzoylgentamicin $C_2$, 2''-epi-sulfhydryl-2''-deoxy-3'''-N-acetyl-1,3,2',6',-tetra-N-thioacetylgentamicin $C_2$a, 2''-epi-sulfhydryl-2''-deoxy-3'''-N-(N'-methylcarbamoyl)-1,3,2',6',-tetra-N-(N'-methylthiocarbamoyl) gentamicin $C_2$a, 2''-epi-sulfhydryl-2''-deoxy-3'''-N-acetyl-1,3,2',6'-tetra-N-thioacetylsisomicin (compound of formula Vb wherein Z is thioacetyl, Z' is acetyl, and $R_5'$ is hydrogen), 2''-epi-sulfhydryl-2''-deoxy-3'''-N-(N'-methylcarbamoyl)-1,3,2',6',-tetra-N-(N'-methylthiocarbamoyl) sisomicin, 2''-epi-sulfhydryl-2''-deoxy-3''-N acetyl-1,3,2',6',-tetra-N-thioacetylverdamicin, and 2''-epi-sulfhydryl-2''-deoxy-3'''-N-(N'-methylcarbamoyl)-1,3,2',6';-tetra-N-(N'-methylthiocarbamoyl) verdamicin (compound of formula Vb wherein Z is methylthiocarbamoyl, Z' is methylcarbamoyl, and $R_5'$ is methyl).

Typical intermediates of formula Va derived from aminoglycosides having protectable hydroxy groups converted to cyclic ketals and acetals are as follows:

2''-epi-sulfhydryl-2''-deoxy-3'''-N-acetyl-4'-,6'-O-iso-propylidene-1,3,2'-tri-N-thioacetylgentamicin A (compound of formula Va wherein Z is thioacetyl, Z' is acetyl, $U_2'$ is N-thioacetylamino, $R_3'$ is hydroxy, $R_5'$, $R_4''$ and $R_5''$ are each hydrogen, and $R_4'$ and $U_6'$ together represent iso-propylidenedioxy), 2''-epi-sulfhydryl-2''-deoxy-3'''-N-(N'-methylcarbamoyl)-4',6'-O-iso-propylidene-1,3,2'-tri-N-(N'-methylthiocarbamoyl) gentamicin A, 2''-epi-sulfhydryl-2''-deoxy-3'''-N-acetyl-2',3' (and 3',4') O-iso-propylidene-1,3,6'-tri-N-thioacetylgentamicin B, 2''-epi-sulfhydryl-2''-deoxy-3'''-N-(N'-methylcarbamoyl)-2',3' (and 3',4')-O-iso-propylidene-1,3,6'-tri-N-(N'-methylthiocarbamoyl)-gentamicin $B_1$, 2''-epi-sulfhydryl-2''-deoxy-3'''-N-benzoyl-4',6'-O-isopropylidene-1,3,2'-tri-N-thiobenzoylgentamicin $X_2$, 2''-epi-sulfhydryl-2''-deoxy-3'''-N-acetyl-3',4'-O-iso-propylidene-1,3,2',6'-tetra-N-thioacetyl-Antiobiotic JI-20-A, and 2''-epi-sulfhydryl-2''-deoxy-3'''-N-methylcarbamoyl-3',4'-O-iso-propylidene-1,3,2',6'-tetra-N-(N'-methylthiocarbamoyl)-Antibiotic JI-20-B, 2''-epi-sulfhydryl-2''-deoxy derivatives of formulae V (a and b) are valuable as intermediates in a process of this invention as described in detail hereinbelow. In brief, the compounds of Va and Vb are conveniently prepared by heating the corresponding 2''-O-hydrocarbonsulfonyl derivatives of formulae III (a and b) when X is thioalkanoyl, thioaroyl or N-alkylthiocarbamoyl, in an aqueous medium.

Other useful intermediates include 2''-epi-sulfhydryl-2''-deoxy, 2''-epi-benzylthio-2''-deoxy and 2''-epi-carboxymethylenethio-2''-deoxy 3'''-N-substituted derivatives defined by the following formulae VIa and VIb:

bamoyl when L is benzyl and $R_2'$, $R_3'$, $R_4'$, and $R_5'$, $R_6'$, $R_3''$, $R_4''$, and $R_5''$ are as defined hereinabove for formula Ia, Intermediates defined by formula VI (a and b) wherein L and Z'' are each hydrogen, include the following:

2''-epi-sulfhydryl-2''-deoxygentamicin $C_1$,
2''-epi-sulfhydryl-2''-deoxygentamicin $C_1a$,
2''-epi-sulfhydryl-2''-deoxygentamicin $C_2$,
2''-epi-sulfhydryl-2''-deoxygentamicin $C_2a$,
2''-epi-sulfhydryl-2''-deoxysisomicin,
2''-epi-sulfhydryl-2''-deoxyverdamicin,
2''-epi-sulfhydryl-2''-deoxytobramycin,
2''-epi-sulfhydryl-3',4',2''-trideoxykanamycin B;
2''-epi-sulfhydryl-2''-deoxygentamicin A,
2''-epi-sulfhydryl-2''-deoxygentamicin B,
2''-epi-sulfhydryl-2''-deoxygentamicin $B_1$,
2''-epi-sulfhydryl-2''-deoxygentamicin $X_2$,
2''-epi-sulfhydryl-2''-deoxy-Antibiotic JI-20-A,
2''-epi-sulfhydryl-2''-deoxy-Antibiotic JI-20-B, and
2''-epi-sulfhydryl-2''-deoxy-Antibiotic G-418.

The above compounds of formulae VI (a and b) wherein L is hydrogen are conveniently prepared from the corresponding per-N-substituted derivatives defined by formulae V (a and b) via alkaline hydrolysis thereof at high temperatures (e.g. 120°C) for long periods of time (e.g. 96 hours) in a sealed tube.

Other intermediates defined by formulae VI (a and b) are 2''-epi-benzylthioderivatives wherein L is benzyl and Z'' is lower alkanoyl, aroyl or alkylcarbamoyl'' including the following:

2''-epi-benzylthio-2''-deoxy-3'''-N-acetylgentamicin $C_1$,

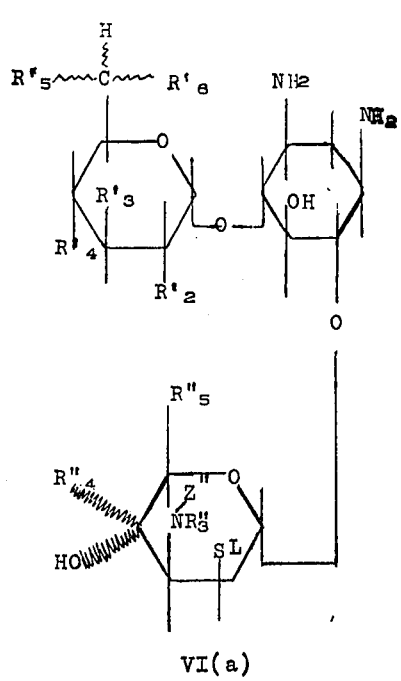

VI(a)

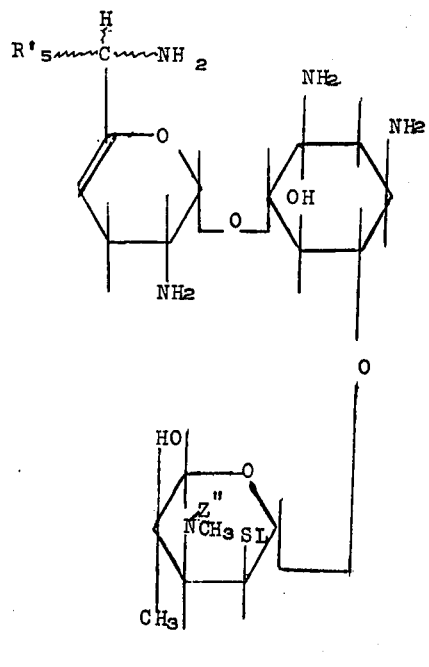

VI(b)

wherein L is a member selected from the group consisting of hydrogen and benzyl; Z'' is a member selected from the group consisting of hydrogen when L is hydrogen, and of lower alkanoyl, aroyl and lower alkylcar- 2''-epi-benzylthio-2''-deoxy-3'''-N-acetylgentamicin $C_1a$,
2''-epi-benzylthio-2''-deoxy-3'''-N-benzoylgentamicin C2, 2″-epi-benzylthio-2″-deoxy-3″-N-acetylgentamicin C₂a,
2″-epi-benzylthio-2″-deoxy-3″-N-acetylsisomicin and
2″-epi-benzylthio-2″-deoxy-3″-N-acetylverdamicin.

The 2″-epi-benzylthio-2″-deoxy-3-N-alkanoyl (or aroyl or alkylcarbamoyl) derivatives of formulae VI (a and b) are prepared from the 2″-epi-sulfhydryl 3″-N-substituted derivatives of formulae V (a and b) by treatment thereof with benzyl bromide and thence treatment of the intermediary salt thereby formed with hydrogen sulfide.

Another novel class of aminoglycoside intermediates of this invention are members selected from the group consisting of 2″-deoxy-3″-desamino-2″, 3″-epimino-aminoglycosides of structural formulae VIIa and VIIb and cyclic ketals and acetals thereof:

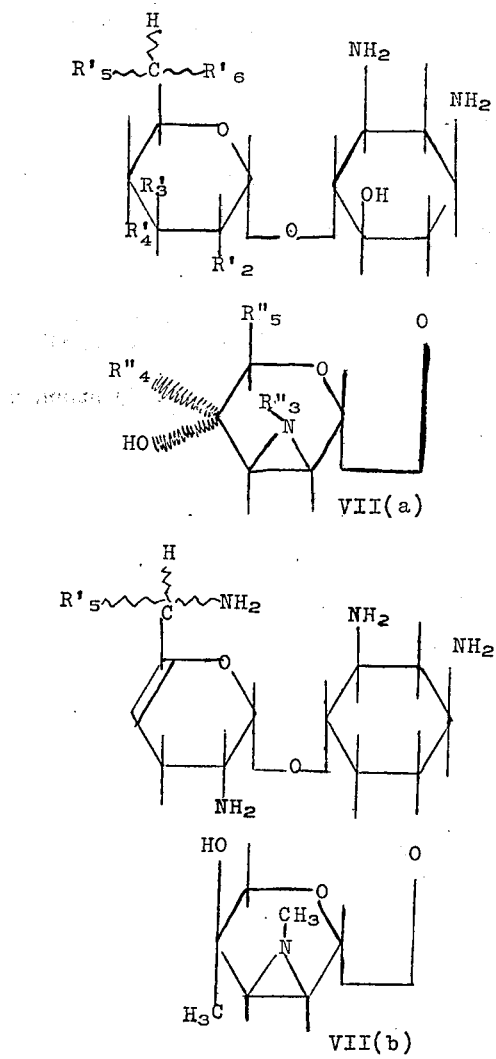

wherein R₂′ is a member selected from the group consisting of amino and hydroxy; R₃′ and R₄′ are each members selected from the group consisting of hydrogen and hydroxy; R₅′, R₃″ and R₄″ are each members selected from the group consisting of hydrogen and methyl; R₆′ is a member selected from the group consisting of hydroxy, amino and methylamino; and R₅″ is a member selected from the group consisting of hydrogen and hydroxymethyl.

Typical intermediates of formulae VIIa and VIIb are as follows:

2″-deoxy-3″-desmethylamino-2″,3″-N-methylepiminogentamicin C₁,
2″-deoxy-3″-desmethylamino-2″,3″-N-methylepiminogentamicin C₁ₐ,
2″-deoxy-3″-desmethylamino-2″,3″-N-methylepiminogentamicin C₂,
2″-deoxy-3″-desmethylamino-2″,3″-N-methylepiminosisomicin,
4′,6′-O-iso-propylidene-2″-deoxy-3″-desmethylamino-2″,3″-N-methylepiminogentamicin X₂, and,
4″,6″-O-iso-propylidene-2″-deoxy-3″-desamino-2″,3″-epiminotobramicin.

The intermediates of formulae VIIa and VIIb are prepared by removing the carbobenzyloxy protecting groups from a 2″-O-methanesulfonyl-per-N-carbobenzyloxyaminoglycoside by reduction. The resulting 2″-O-methanesulfonate ester then converts to a 2″-deoxy-3″-desamino-2″,3″-epimino derivative spontaneously of when heated in refluxing alkanol either alone or with an alkali metal salt of an alkanol.

Other intermediates formed in the alternate process of this invention include 2″-deoxy-2″-thiosubstituted derivatives and 2″-deoxy-3″-desamino-2″-epi-amino-3″-epi-thiosubstituted aminoglycoside derivatives selected from the group consisting of compounds of following formulae VIIIa, VIIIb, IXa and IXb and cyclic ketals and acetal derivatives thereof:

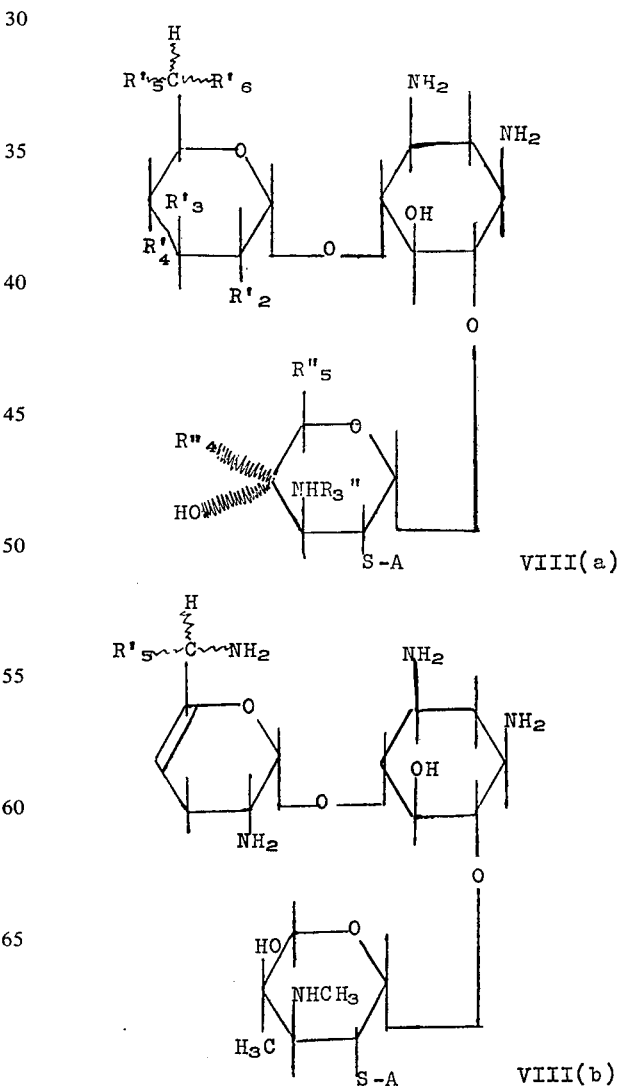

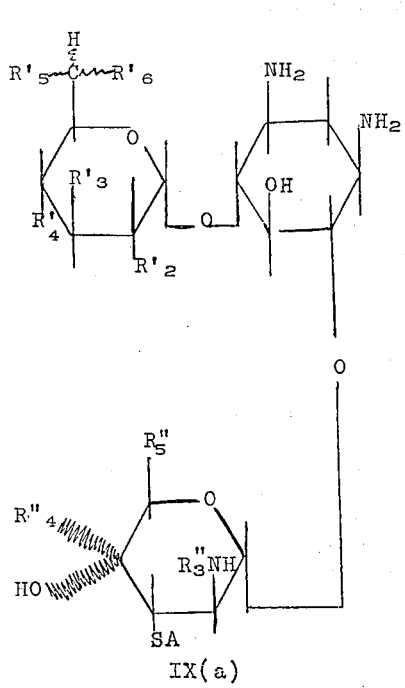

IX(a)

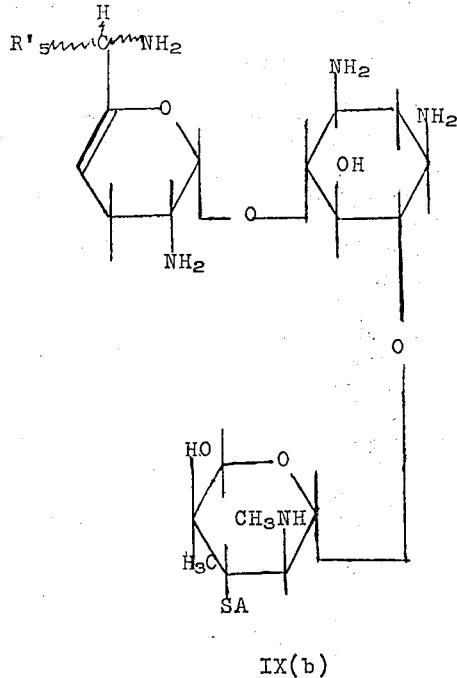

IX(b)

wherein $R_2'$, $R_3'$, $R_4'$, $R_5'$, $R_6'$, $R_3''$, $R_4''$ and $R_5''$ are as defined for formulae Ia and Ib, and A is a member selected from the group consisting of hydrogen, lower alkyl, aralkyl, aryl and lower alkanoyl.

The aryl, aralkyl, and alkanoyl groups contemplated for A in above formulae VIII(a), VIII(b), IX(a) and IX(b) have preferably up to eight carbon atoms including aryl radicals such as phenyl, tolyl and xylyl, aralkyl radicals such as benzyl, ethylphenyl and methyltolyl, and alkanoyl radicals such as acetyl and caprylyl.

The derivatives of formulae VIII(a), and VIII(b), IX(a) and IX(b) are derived from the corresponding intermediates of formulae VII(a) and VII(b) by treatment thereof with a sulfur nucleophile as described in the examples and in the description of the processes hereinbelow. Compounds of formulae IV(a) and IV(b) are per-N-alkanoyl derivatives of compounds of formulae VIII(a) and VIII(b) but wherein A is alkyl.

Typical intermediates of the above formulae include the following:

2''-deoxy-2''-sulfhydrylgentamicin $C_2$ (compound of formula VIII(a) wherein $R_2'$ and $R_6'$ are amino; $R_3'$ and $R_4'$ and $R_5''$ are hydrogen; $R_5'$, $R_3''$ and $R_4''$ are methyl; and A is hydrogen).

2''-deoxy-3''-desmethylamino-2''-epi-methylamino-3''-epi-sulfhydrylgentamicin $C_2$ (compound of formula IX(a) wherein $R_2'$ and $R_6'$ are amino; $R_3'$, $R_4'$ and $R_5''$ are hydrogen; $R_5'$, $R_3''$ and $R_4''$ are methyl; and A is hydrogen);

2''-deoxy-2''-phenylthiosisomicin (compound of formula VIII(b) wherein $R_5'$ is hydrogen and A is phenyl); and 2''-deoxy-3''-desmethylamino-2''-epi-methylamino-3''-epi-acetylthiosisomicin (compound of formula IX(b) wherein $R_5'$ is hydrogen and A is acetyl).

General Description of the Process Aspects of the Invention

The anti-bacterially active 2''-deoxyaminoglycosides of this invention as defined by formulae Ia, Ib, IIa and IIb are prepared by processes defined in the summary of this invention. In brief, in one process, an anti-bacterially active aminoglycoside having a 2''-hydroxy function and having all primary and secondary amino groups protected and protectable primary and secondary hydroxyl groups derivatized, upon treatment with a hydrocarbonsulfonyl halide in a tertiary amine is converted to a 2''-O-hydrocarbonsulfonyl ester (e.g. to a 2''-O-methanesulfonyl ester) which, in turn is converted to a 2''-thio-2''-deoxyaminoglycoside derivative selected from the group consisting of a 2''-alkylthio-2''-deoxy derivative, a 2''-epi-sulfhydryl-2''-deoxy derivative, a 2''-epi-benzylthio-2''-deoxy derivative and a 2''-epi-carboxymethylenethio-2''-deoxy derivative, then said 2''-thio-2''-deoxyaminoglycoside derivative following acid hydrolysis of any acetal or ketal which may be present, is desulfurized followed by basic hydrolysis of any N-alkanoyl protecting groups which may be present, whereby is obtained a 2''-deoxyaminoglycoside of formulae Ia and Ib having anti-bacterial activity.

In this process, the 2''-alkylthio-2''-deoxy species of the 2''-thio-2''-deoxyaminoglycoside intermediates are prepared by treating a 2''-O-hydrocarbonsulfonyl-aminoglycoside having N-alkanoyl protecting groups with an alkali metal salt of an alkanethiol, (e.g. lithium ethanethiolate) whereby is obtained a 2''-alkylthio-2''-deoxyaminoglycoside having N-alkanoyl protecting groups. Alternatively, the 2''-epi-sulfhydryl-2''-deoxy species of the 2''-thio-2''-deoxyaminoglycoside intermediates of this invention are prepared by treating a 2''-O-hydrocarbonsulfonylaminoglycoside having N-thioalkanoyl, N-thiobenzoyl or N-alkylthiocarbamoyl protecting groups in an aqueous medium at temperatures in the range of from about 25° to about 150°C followed by mild acid hydrolysis of any acetal or ketal functions which are present and thence treatment of the thereby formed per-N-substituted-2''-epi-sulfhydryl-2''-deoxy- derivative in a basic hydrolytic medium whereby is formed a 2''-epi-sulfhydryl-2''-deoxyaminoglycoside having free amino and hydroxyl groups. Alternatively, reaction of the aforementioned per-N-substituted-2''-epi-sulfhydryl-2''-deoxy- derivative with a hydrocarbon halide, e.g. benzyl bromide, or an α-halogeno alkanoic acid, e.g. α-bromoacetic acid, respectively, followed by treatment of the resulting S-substituted salt with hydrogen sulfide yields, e.g. the 2''-epi-benzylthio-2''-deoxy- and 2''-epi-carboxymethylenethio-2''-deoxy- species of the 2''-thio-2''-deoxyaminoglycoside intermediates of this invention, respectively, said species having the 3''-amino group protected by an N-alkanoyl, N-aroyl or an N-alkylcarbamoyl group.

This process of my invention is indicated schematically hereinbelow in Chart A wherein (with reference to formulae Ia and Ib and the disclosure immediately following) there is shown only the 3''-amino sugar ring of the aminoglycosides of this invention, the Roman numeral below each partial formula referring to the structural formula so identified hereinabove in the general description of the compounds of this invention, the substituent "v" designating the other two rings of the aminoglycoside as disclosed hereinabove.

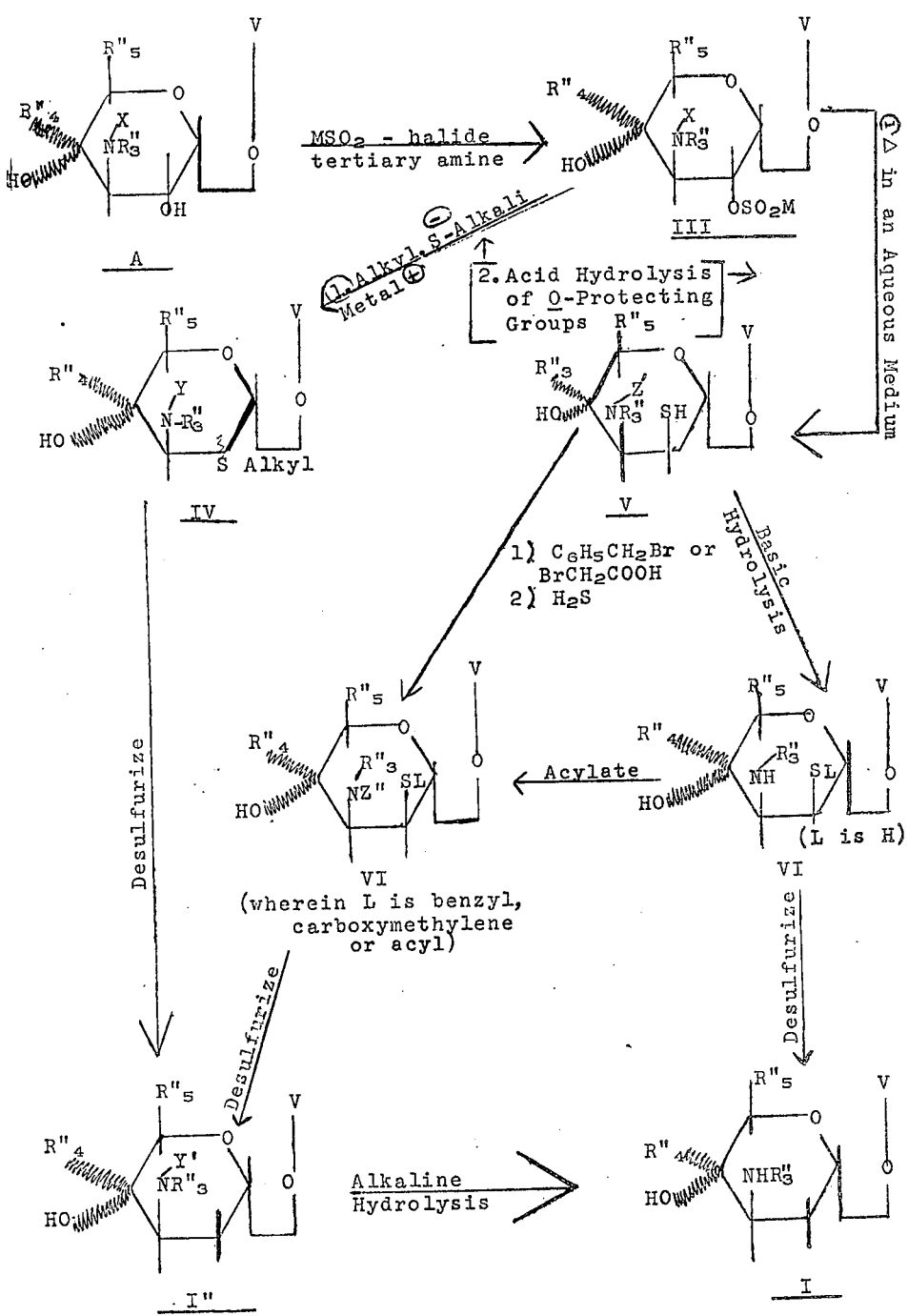

CHART A

The starting compounds of my invention (designated as Compound A in Chart A hereinabove) can be any aminoglycoside having a 2''-hydroxyl group which exhibits antibacterial activity against gram positive and/or gram negative organisms as determined by conventional in vitro techniques such as tube dilution tests, agar dilution tests, disc diffusion tests, and the like. An aminoglycoside which inhibits bacteria at concentrations equal to or less than about 50 to 100 mcg./ml. is considered to be an antibacterial agent. These aminoglycoside antibacterial starting compounds can be antibiotics such as gentamicin $C_2$ or derivatives of antibiotics such as 3',4'-dideoxykanamycin B.

Typical starting aminoglycoside antibacterials are such as the gentamicins (including gentamicin A, gentamicin B, gentamicin $B_1$, gentamicin $C_1$, gentamicin $C_{1a}$, gentamicin $C_2$, gentamicin $C_{2a}$, gentamicin $X_2$ and mixtures thereof), sisomicin, verdamicin, Antibiotic JI-20-A, Antibiotic JI-20-B, Antibiotic G-418, tobramycin and 3',4'-dideoxykanamycin B. Of the foregoing, preferred starting antibiotics are gentamicin $C_1$, gentamicin $C_{1a}$, gentamicin $C_2$, gentamicin $C_{2a}$, sisomicin and verdamicin which lead to the corresponding 2''-deoxy derivatives, preferred compounds of this invention as defined by formulae $I_a'$ and $I_b$.

Most of the aforementioned aminoglycoside antibiotics are known. Of the gentamicins, the starting compound referred to herein as gentamicin $X_2$ is also known in the art as gentamicin X; the starting compounds referred to herein as gentamicin $C_2$ and gentamicin $C_{2a}$ are stereoisomeric with each other about the carbon at the 6'-position (i.e. the 6'-carbon atom) gentamicin $C_2$ being a 2''-hydroxy derivative of formula $I_a'$ hereinabove wherein $R_5'$ is methyl, $R_6'$ is amino, and the stereochemistry at C-6'is R; gentamicin $C_{2a}$ being a 2''-hydroxy derivative of formula $I_a'$ wherein $R_5'$ is methyl, $R_6'$ is amino, and the stereochemistry at C-6' is S. The isolation, properties and planar configuration of gentamicin $C_2$ is described in U.S. Pat. No. 3,651,042; while the isolation, properties and planar configuration of gentamicin $C_{2a}$, as well as the stereoconfiguration about C-6' of gentamicin $C_2$ and $C_{2a}$, is described in copending application of common assignee as that of the instant application of Peter J. L. Daniels and J. A. Marquez, entitled *Novel Antibiotic from Micromonospora*, Ser. No. 269,914 filed July 7, 1972, now abandoned.

Verdamicin, Antibiotic G-418, Antibiotic JI-20-A and Antibiotic JI-20-B are all also described in copending U.S. applications of common assignee as that of the instant application; verdamicin being described in U.S. application Ser. No. 208,907 filed Dec. 16, 1971 as a continuation-in-part of U.S. Ser. No. 58,050 filed July 24, 1970, now abandoned, of M. J. Weinstein, G. H. Wagman, and J. Marquez entitled *Antibiotic and Process For Their Manufacture;* Antibiotic G-418 being described in application U.S. Ser. No. 196,707 filed Nov. 8, 1971 of M. J. Weinstein, G. H. Wagman, R. Testa and J. Marquez entitled *Antibiotic G-418 and Production Thereof;* while Antibiotics JI-20-A and JI-20-B are described in application U.S. Ser. No. 261,753 filed June 12, 1972 of Jan Ilavsky, Aris P. Bayan, William Charney and Hans Reimann entitled *New Antibiotic from Micromonospora Purpurea JI-20*.

Prior to carrying out my process as outlined in Chart A, it is necessary to protect functions in the aminoglycoside starting compound A which would be reactive to the reagents used therein, such as primary and secondary amino groups and hydroxyl groups. In particular, it is necessary to protect all primary and secondary amino functions by groups which can be easily removed without affecting the rest of the molecule. The choice of the amino protecting groups is also dependent upon the route one wishes to take in converting starting compound A to the 2''-deoxyaminoglycosides(I) of my invention. If one carries out my process via conversions A → III → IV → I'' → I as designated in Chart A, the protecting groups of choice are lower alkanoyl groups, preferably acetyl; whereas, when my process is to be carried out via the conversions indicated on Chart A as A → III → V → VI → I, the protecting groups of choice are thioalkanoyl (preferably thioacetyl), thioaroyl (preferably thiobenzoyl) and lower alkylthiocarbamoyl (preferably methylthiocarbamoyl). The amine protected derivatives are prepared according to methods known in the art as illustrated in the Preparations hereinbelow.

In order to minimize competing reactions in my process, primary hydroxyl groups and protectable neighboring hydroxyl groups in aminoglycoside starting compounds are also preferably protected prior to carrying out the conversions shown in Chart A, usually by a cyclic acetal or cyclical ketal of vicinal and neighboring hydroxyl groups or by an ether (preferably a triphenylmethyl ether, also called a trityl ether) of any primary hydroxyl groups. Thus, for example (with reference to Chart A), prior to the conversion of the starting compounds (A) to the 2''-O-hydrocarbonsulfonate esters (III) and, after the primary and secondary amino functions have been protected, vicinal hydroxyl groups such as those at the 3' and 4' positions in Antibiotics JI-20-A and JI-20-B and those at the 2', 3', and 4' positions in gentamicin B and $B_1$ are converted to a cyclic ketal (e.g. to a 3',4'-O-iso-propylidene) or to a cyclic acetal (e.g. to a 3',4'-O-benzylidene) by reaction thereof according to methods known in sugar chemistry as illustrated in the Procedures hereinbelow. In the case of gentamicin B and $B_1$, mixtures of the 3',4' and 2',3'-O-ylidene derivatives are formed, which mixtures can be used, as is, in my process. Primary hydroxyl groups such as are present at C-6' in gentamicin A and $X_2$ or at C-6'' in tobramycin and 3',4'-dideoxykanamycin B can be protected by conversion to the corresponding trityl ether by reaction with triphenylmethyl chloride in pyridine or, together with a neighboring hydroxyl group, by conversion to a cyclic ketal or a cyclic acetal, e.g. to the 4',6'-O-iso-propylidene derivatives of gentamicin A and of gentamicin $X_2$, and to the 4'',6''-O-iso-propylidene derivatives of tobyramycin and 3',-4'-dideoxykanamycin B. Exemplary of other protectable, neighboring hydroxy groups is the grouping of secondary hydroxyl groups at C-3', C-4' and C-6' in Antibiotic G-418 which form a 4',6'-O-ylidene derivative when reacted with dimethoxypropane or benzaldehyde, for example.

The O-protecting groups present in the starting aminoglycosides (A) of the process outlined in Chart A can be removed at any stage after preparation of the 2''-hydrocarbonsulfonate ester derivative (III) by mild acid hydrolysis; however, when following reaction sequence III → IV → I'' → I (in which sequence ketal or acetal O-protection groups are usually employed) removal of the ketal or acetal functions is conveniently carried out just prior to treatment of the 2''-thio-2''-deoxy intermediate (IV) with Raney Nickel; whereas, when following sequence III → V → VI → I, removal of the O-protecting groups is usually effected immediately after preparation of the sulfonate ester derivative (III) by subjecting any ketals or acetals to acid hydrolysis, while any trityl ether derivatives will cleave in the presence of acid during the conversion in an aqueous medium of the hydrocarbonsulfonate ester (III) to an episulfhydryl intermediate (V).

In the first step of my process, the 2''-hydroxy function in an aminoglycoside starting compound (A) is converted to the corresponding hydrocarbonsulfonate ester, i.e. to a 2''-O-hydrocarbonsulfonyl derivative (III), by treatment of said 2''-hydroxyaminoglycoside with an acid halide of a hydrocarbon-sulfonic acid in a tertiary amine (a preferred reagent mixture being methanesulfonyl chloride in pyridine).

Any hydrocarbonsulfonic acid halide having up to eight carbon atoms is suitable for use in this first step of my process, including the acid bromide and acid chloride derivatives of methanesulfonic acid, ethanesulfonic acid, benzenesulfonic acid and p-toluenesulfonic acid, methanesulfonic chloride being a reagent of choice.

Among the tertiary amines contemplated as suitable for use in the esterification step of my process are tertiary aliphatic and aromatic amines including cyclic amines such as trimethylamine, triethylamine, collidine, dimethylaminopyridine and, preferably, pyridine, which serve both as solvent and basic agent.

A convenient method of carrying out a preferred species of this esterification step of my process (i.e. that which utilizes methanesulfonyl chloride in pyridine as the esterification medium) comprises preparing a solution of the aminoglycoside antibiotic having all primary and secondary amino groups and vicinal hydroxyl groups protected, e.g. penta-N-acetylgentamicin $C_2$, in dry pyridine to which is then added an acid halide, e.g. methanesulfonyl chloride, in amounts of from about 1 to 1.5 moles of acid halide per mole of aminoglycoside (usually about 1.1 moles of acid halide), and allowing this solution to stand at room temperature (about 25°C) for a period of about 1 to 6 hours, usually 3 hours. Anhydrous alkanol, e.g. methanol, is then added to decompose any excess sulfonic acid halide and the 2''-O-hydrocarbonsulfonyl derivative of formula II thereby prepared, e.g. 2''-O-methanesulfonyl-penta-N-acetylgentamicin $C_2$, is then conveniently isolated and purified utilizing techniques known in the art such as solvent distillation, solvent extraction, precipitation, crystallization, chromatography and the like.

The 2''-O-hydrocarbonsulfonyl-per-N-substituted aminoglycosides of formula III are key intermediates of this invention from whence, depending on the nature of the N-protecting groups in the aminoglycosides, different routes may be taken to obtain the novel 2''-deoxyaminoglycosides of formula I. When the amino protecting groups are lower alkanoyl, preferably acetyl, the 2''-deoxyaminoglycoside products of formula I are conveniently derived from the 2''-O-hydrocarbonsulfonyl derivatives (III) via route III → IV → I'' → I by treatment thereof with an alkali metal thioalkanolate in a polar, non-hydrolytic medium followed by acid hydrolysis of any cyclic ketal or acetal functions present, thence, treatment of the resulting per-N-substituted-2''-alkylthio-2''-deoxyaminoglycoside of formula IV with Raney Nickel in an alkanol whereby is obtained a per-N-substituted-2''-deoxyaminoglycoside intermediate of formula I'', which, upon alkaline hydrolysis utilizing known techniques, is converted to a novel 2''-deoxyaminoglycoside anti-bacterial agent of formula I, having free amino groups.

When converting a 2''-O-hydrocarbonsulfonylaminoglycoside of formula III, e.g. 2''-O-methanesulfonyl-penta-N-acetylgentamicin $C_2$, to the corresponding 2''-alkylthio-2''-deoxy derivative of formula IV, e.g. to 2''-ethylthio-2''-deoxy-penta-N-acetylgentamicin $C_2$, the 2''-O-sulfonyl ester derivative is usually added to a solution comprising an anhydrous, polar, non-hydroxylic solvent containing about a molar excess of an alkali metal alkanethiolate (e.g. lithium ethanethiolate) with stirring, under an atmosphere of an inert gas (e.g. nitrogen, argon, and the like) at low temperatures (usually 0° to 4°C) followed by heating at elevated temperatures for several hours, e.g. in the range of 75° to 150°C for 2 to 6 hours. The 2''-alkylthio-2''-deoxy derivatives of formula IV thereby formed, e.g. 2''-ethylthio-2''-deoxy-penta-N-acetylgentamicin $C_2$, are conveniently isolated and purified utilizing chromatographic and solvent extraction techniques.

Alkali metal salts of thioalkanolates which are most suitable for Step III → IV of my process are alkali metal salts of low molecular weight (e.g. potassium, sodium, lithium) of lower alkanethiols (e.g. methanethiol, ethanethiol, and propanethiol). A preferred salt for use in this step of our process is lithium ethanethiolate prepared by addition of butyl lithium to ethanethiol in anhydrous dimethylformamide, for example. Other alkali metal salts which may be used are sodium n-propanethiolate (derived from sodium hydride and n-propanethiol) and potassium ethanethiolate (derived from potassium-hydride and ethanethiol).

Solvents suitable for use in the step of converting a 2''-O-hydrocarbonsulfonylaminoglycoside of formula III to the corresponding 2''-alkylthio-2''-deoxy derivative of formula IV include any anhydrous, polar, non-hydroxylic solvent, particularly amides such as hexamethylphosphoric triamide (HMPT or HMPA) and, preferably, dimethylformamide or dimethylacetamide.

The desulfurization step of my process as illustrated by conversion IV → I'' in Chart A hereinabove is conveniently carried out utilizing Raney Nickel. Usually, a 2''-alkylthio derivative of formula IV (e.g. 2''-ethylthio-2''-deoxy-penta-N-acetylgentamicin $C_2$) is dissolved in a suitable solvent (e.g. ethanol, water, or aqueous alkanol) and stirred with an excess of Raney Nickel (e.g. about 20 times the weight of aminoglycoside) at reflux temperature for several hours (e.g. 3 to 6 hours). Isolation of the resulting 2''-deoxy-per-N-alkanoyl derivative of formula I''(e.g. 2''-deoxy-penta-N-acetylgentamicin $C_2$) is easily carried out by removing the Raney Nickel by filtration followed by distillation of the solvent.

The anti-bacterially active 2''-deoxyaminoglycosides (I) are then easily derived from the per-N-alkanoyl-2''-deoxy intermediates (I'') by alkaline hydrolysis. For example, by adding a penta-N-alkanoyl derivative of formula I'', e.g. 2''-deoxypenta-N-acetylgentamicin $C_2$, to aqueous barium hydroxide or to aqueous sodium hydroxide (e.g. to a 4 to 5 Normal Solution) and heating the resulting solution in a sealed tube (preferably lined with a substance impervious to strong alkali) at elevated temperatures (usually about 100°C) for long periods of time (usually for about 2 to 3 days). Isolation of the thereby formed novel 2''-deoxyaminoglycoside (I) of this invention is then effected utilizing chromatographic techniques.

Referring to Chart A, an alternate method for carrying out my process is followed when the amino protecting groups are thio-derivatives such as thioalkanoyl (preferably thioacetyl), thioaroyl (preferably thiobenzoyl) or lower alkylthiocarbamoyl (preferably methylthiocarbamoyl) whereby a 2''-O-hydrocarbonsulfonylaminoglycoside intermediate (III) is converted to a 2''-deoxyaminoglycoside antibacterial (I) via route III → V → VI → I.

By this route, a per-N-thio-substituted-2''-O-hydrocarbonsulfonylaminoglycoside (III) is converted to a per-N-substituted-2''-epi-sulfhydryl-2''-deoxyaminoglycoside (V) by simply heating the 2''-O-hydrocarbonsulfonylaminoglycoside in an aqueous medium at temperatures in the range of 25° to 150°C (usually about 100°C) for periods of from about 30 minutes to 2 hours until no further starting sulfonate ester is present in the reaction mixture as determined by thin layer chromatography. The resultant per-N-substituted-2''-epi-sulfhydryl-2''-deoxyaminoglycoside intermediate is then conveniently isolated utilizing known techniques after any O-protecting groups present have been removed via mild acid hydrolysis.

Aqueous media suitable for use in the solvolysis step III → V of my process may be any solvent which does not affect the aminoglycoside intermediate and which contains water. Such media include water alone, aqueous solutions of lower alkanols (e.g. aqueous methanol and aqueous ethanol) and, preferably, aqueous dimethylformamide.

In this solvolysis step, the thioamide group at the 3''-position, e.g. 3''-N-thioacetyl, 3''-N-thiobenzoyl or 3''-N-(N'-methylthiocarbamoyl), is converted to the corresponding oxygen analog, e.g. to the 3''-N-acetyl, 3''-N-benzoyl or 3''-N-(N'-methylcarbamoyl) groups, respectively, while the other thioamide groups in the aminoglycoside derivative V remain unchanged.

Usually, when carrying out solvolysis step II → V, a per-N-thiosubstituted-2''-O-sulfonylaminoglycoside (III) (e.g. 2''-O-methanesulfonyl-penta-N-thioacetylgentamicin $C_2$, 2''-O-methanesulfonyl-penta-N-thiobenzoylgentamicin $C_2$ and 2''-O-methanesulfonyl-penta-N-(N'-methylthiocarbamoyl) gentamicin $C_2$) is heated in aqueous dimethylformamide (5 parts water to 95 parts DMF) at about 80°C for about an hour. Evaporation of the solvent in vacuo, followed by chromatography over silica gel using a 2:1:1-chloroformmethanol-15% ammonia system as eluant yields a 2''-epi-sulfhydryl derivative (V), e.g. 2''-eip-sulfhydryl-2''-deoxy-3''-N-acetyl-tetra-N-thioacetylgentamicin $C_2$, 2''-epi-sulfhydryl-2''-deoxy-3''-N-benzoyltetra-N-thiobenzoylgentamicin $C_2$ and 2''-epi-sulfhydryl-2''-deoxy-3''-N-(N'-methylcarbamoyl)-tetra-N-(N'-methylthiocarbamoyl) gentamicin $C_2$, respectively. After solvolysis of the 2''-O-sulfonate ester (III) and prior to purification of the 2''-sulfhydryl derivative (V), and O-protecting groups (e.g. trityl ethers, ketals or acetals) present are conveniently removed by mild acid hydrolysis (e.g. dilute acid at room termperature). Alternatively, aminoglycoside starting compounds (A) having primary hydroxyl groups (e.g. gentamicin A, gentamicin $X_2$, tobramycin and 3',4'-dideoxykanamycin B) after protection of the amino groups therein, may be converted to a 2''-O-sulfonate ester intermediate (III) having the primary hydroxyl group also esterified (e.g. to 6',2''-bis-O-sulfonyl derivatives of per-N-thioacetylgentamicin A and of per-N-thioacetylgentamicin $X_2$ or to 2'',6''-bis-O-sulfonyl derivatives of per-N-thioacetyltobramycin and of per-N-thioacetyl-3',4'-dideoxykanamycin B). Upon solvolysis of the thus formed polysulfonate ester intermediates in aqueous dimethylformamide containing sodium acetate, the primary sulfonate ester will hydrolyze and there is formed a 2''-eip-sulfhydryl intermediate (V) having free primary hydroxyl groups (e.g. 2''-eip-sulfhydryl-2''-deoxy-3''-N-acetyl-per-N-thioacetyl derivatives of gentamicin A, gentamicin $X_2$, tobramycin and of 3',4'-dideoxykanamycin B).

The sulfur-containing N-protecting groups of intermediates V are desirably removed prior to the desulfurization step of my process. This may be done directly (i.e. by step V → VI in Chart A) via alkaline hydrolysis utilizing techniques similar to those used when hydrolyzing N-alkanoyl protecting groups (i.e. step I'' → I) described hereinabove. Thus, for example, a 2''-epi-sulfhydryl intermediate of formula V, e.g. 2''-epi-sulfhydryl-2''-deoxy-3''-N-acetyl(or benzoyl or N'-methylcarbamoyl)-tetra-N-thioacetyl(or thiobenzoyl or N'-methylthiocarbamoyl)-gentamicin $C_2$, upon treatment with aqueous sodium hydroxide (e.g. about 4 Normal) at elevated temperatures (e.g. 120°C) in a sealed Teflon-lined tube for several days will yield a 2'λ'-epi-sulfyhydryl intermediate (VI) free of N-protecting groups, e.g. 2''-eip-sulfhydryl-2''-deoxygentamicin $C_2$ of formula VI wherein L is hydrogen, which, upon desulfurization in ethanol according to my process as described hereinabove with reference to step IV → I'' yields a 2''-deoxyaminoglycoside of formula I having antibacterial activity, e.g. 2''-deoxygentamicin $C_2$. Optionally, the intermediate VI wherein L is hydrogen may be acylated to form an intermediate VI wherein L is acyl(e.g. acetyl) and having corresponding N-acyl groups(e.g. N-acetyl) which is then converted via the reaction sequence VI(L is acyl) → I'' → I as described hereinbelow.

Alternatively, the sulfur-containing N-protecting groups of the 2''-epi-sulfhydryl-2''-deoxy intermediates of formula V are removed via reaction sequence V → VI → I'' → I by forming S-alkylated halide salts of each of the N-thiocarbonyl derivatives followed by treatment thereof with hydrogen sulfide whereby is obtained a 2''-epi-sulfhydryl-2''-deoxy-3''-N-alkanoyl (or 3''-N-aroyl or 3''-N-(N'-alkylcarbamoyl derivative of formula VI) wherein L is the hydrocarbon (or other) radical of the halide agent, which compound, upon desulfurization followed by alkaline hydrolysis according to my process, yields a 2''-deoxyaminoglycoside of formula I. S-alkylated halide salts which are useful in this alternative "deblocking" method of my process are preferably those formed with benzyl bromide, although salts formed with other halides such as methyl iodide or α-bromoacetic acid may be used. More specifically, when carrying out conversions V → VI → I'' → I of my process, a 2''-epi-sulfhydryl-2''-deoxy-per-N-substituted derivative of formula V, e.g. 2''-epi-sulfhydryl-2''-deoxy-3''-N-acetyl(or thiobenzoyl or N'-methylcarbamoyl)-tetra-N-thioacetyl(or thiobenzoyl or N-methylthiocarbamoyl)-gentamicin $C_2$, is dissolved in a dry halogenated hydrocarbon solvent (e.g. dry chloroform) to which is added an excess of a halide agent (e.g. α-bromoacetic acid, methyl iodide, or, preferably, benzyl bromide); and the solution is allowed to stand at room temperature for several hours during which time the thereby formed 2''-epi-benzylthio-per-N-(α-benzylthio)alkylidene-aminoglycoside quaternary halide salt precipitates and is easily isolated by filtration and, without further purification, is suspended in anhydrous alkanol (e.g. anhydrous ethanol) and treated with hydrogen sulfide to obtain a 2''-epi-benzylthio-3''-N-alkanoyl (or aroyl or N'-methylcarbamoyl)-aminoglycoside (VI), e.g. 2''-epi-benzylthio-3''-N-acetyl-(or benzoyl or N'-methylcarbamoyl)-gentamicin $C_2$. Desulfurization of the foregoing intermediate VI (wherein L is benzyl) yields a 2''-deoxy-3''-N-lower alkanoyl(or aroyl or N'-methylcarbamoyl)-aminoglycoside of formula I''. Alkaline hydrolysis removes the amino protecting group at C-3'' to give a 2''-deoxyaminoglycoside of formula I, e.g. 2''-deoxygentamicin $C_2$.

In addition to the process of my invention outlined in Chart A and discussed hereinabove, the novel 2''-deoxyaminoglycosides of formulae I (a and b) and II (a and b) are prepared by another process as outlined in Chart B hereinabove. Only the 3''-amino sugar ring of the aminoglycosides of this invention are shown, the Roman numeral below each partial formula referring to the structural formulae identifications disclosed in the general description of the compounds of this invention, the substituent V designating the other two rings of the aminoglycosides as disclosed hereinabove.

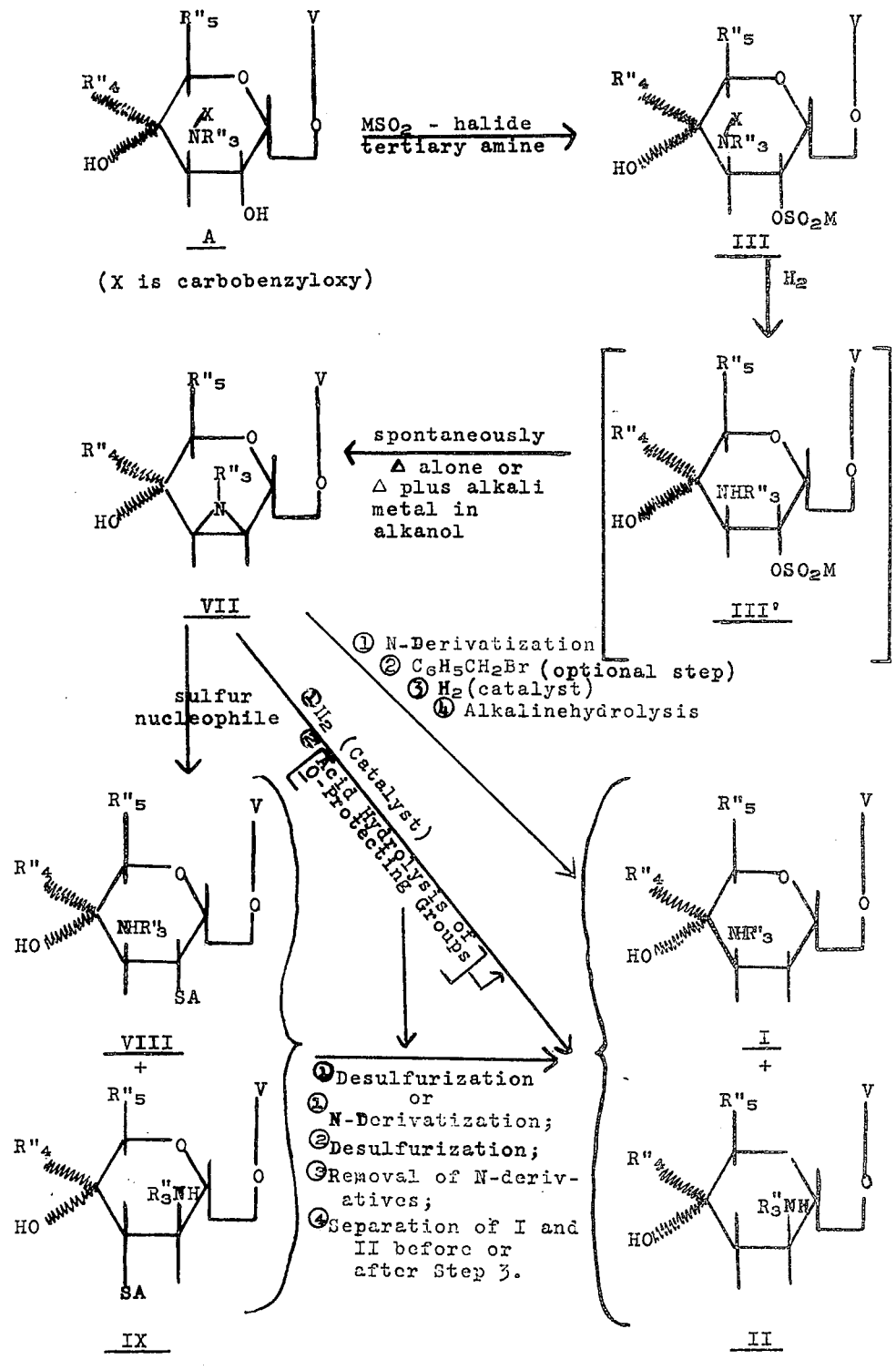

A=H, hydrocarbon, alkanoyl.

CHART B

In brief, in alternate process B, an antibacterially active aminoglycoside having a 2''-hydroxy function and a 3''-primary or secondary amino function, and having all primary and secondary amino functions protected by N-carbobenzyloxy groups and having all protectable primary and secondary hydroxy neighboring groups protected by a cyclic ketal or acetal, is converted to a per-N-carbobenzyloxy-2''-O-hydrocarbonsulfonate ester (III), followed by removal of the carbobenzyloxy groups usually by hydrogenation in the presence of a catalyst or, when easily reduceable double bonds are present in the molecule such as the 4',5'-double bond in sisomicin and verdamicin, by cleavage with an alkali metal (e.g. lithium, sodium and potassium) in liquid ammonia, using 2 gm. atoms of said alkali metal for each carbobenzyloxy group present. The 2''-O-hydrocarbonsulfonate ester having free amino groups (III') thereby formed either spontaneously ring closes in situ to form a 2''-deoxy-3''-desamino-2'',3''-epiminoaminoglycoside intermediate (VII), or the conversion is effected by heating the 2''-O-hydrocarbonsulfonate ester (III') in a lower alkanol (e.g. methanol) either alone or together with an equivalent molar quantity of an alkali metal salt of said alkanol (e.g. sodium methylate) at temperatures in the range of from about 25° to about 100°C. The epimino (or methylepimino) intermediate (VII) thereby formed is then treated with hydrogen in the presence of a catalyst (e.g. palladium on charcoal) followed by acid hydrolysis of any ketal or acetal functions which may be present whereby is formed a product mixture comprising 2''-deoxyaminoglycosides of formula I and 2''-deoxy-3''-desmethyalmino(or desamino)-2''-epi-methylamino(or epi-amino)-aminoglycosides of formula II which are separable via chromatographic techniques.

Alternatively, prior to reduction, the epimino intermediate (VII) wherein $R_3''$ is methyl is N-derivatized (e.g. to a tetra-N-acetyl optionally followed by treatment with an organic halide (e.g. benzyl bromide) to form a quaternary salt, e.g. a 2''-deoxy-3''-desmethylamino-2'',3''-(N-benzyl-N-methyl)-epiminoaminoglycoside quaternary bromide salt. Hydrogenation of the N-derivatized intermediate in the presence of a catalyst (e.g. Raney Nickel at high pressures and temperature or, palladium on charcoal when a quaternary salt has been prepared) followed by removal of the N-protecting groups via alkaline hydrolysis yields the product mixture of compounds I and II. Alternatively, the epimino (or methylepimino) intermediate (VII) wherein $R_3''$ is hydrogen or methyl is treated with a sulfur nucleophile (e.g. sodium thiophenoxide) to obtain a mixture comprising a 2''-deoxy-2''-hydrocarbonthioaminoglycoside intermediate (VIII) and a 2''-deoxy-3''-desamino (or desmethylamino)-2''-epi-amino-(or 2''-epi-N-methylamino)-aminoglycoside intermediate (IX) which upon desulfurization followed by acid hydrolysis of any ketal or acetal functions which may be present produces a product mixture of the novel, antibacterially active aminoglycosides (I and II) of my invention separable via chromatographic techniques.

Alternatively, and in some cases preferably, desulfurization of the intermediates of formulae VIII and IX may be accomplished by formation of the N-protected derivatives (e.g. the per-N-acetyl derivatives), followed by desulfurization and removal of the N-protecting groups (e.g. using sodium or barium hydroxide in water according to known procedures). Separation of I and II is optionally carried out before or after removal of the N-protecting groups.

The process of Chart B is also, and usually preferably, carried out according to procedures described in co-pending application Ser. No. 299,983 filed concomitantly herewith now U.S. Pat. No. 3,868,360, of Jay Weinstein and Peter J. L. Daniels for "Process for Preparing 2''-Deoxy-3''-Desamino-2'',3''-Epiminoaminoglycoside Derivatives," whereby the primary and secondary amino functions in the aminoglycoside starting compound are protected by Schiff base oxazolidine condensation products with aldehydes (preferably N-benzylidene and N, O-benzylidene derivatives) which, after preparation of the 2''-hydrocarbonsulfonate ester, are conveniently removed by treatment with dilute aqueous acid. The use of Schiff base-oxazolidine N-protecting groups represents an improvement of my process as outlined in Chart B in that the N-Schiff base and N,O-oxazolidine groups are usually easier to prepare and to remove than are the N-carbobenzyloxy protecting groups of my process, and their use usually results in higher yields of the 2''-deoxy-3''-desamino (or desmethylamino)-2'',3''-epimino (or N-methylepimino)aminoglycoside key intermediate of the process of Chart B.

The processes shown in Charts A and B are illustrated in detail hereinbelow in the examples which should not be construed as limiting the invention in spirit or in scope.

PREPARATION OF STARTING INTERMEDIATES

PREPARATION 1

Per-N-lower alkanoylaminoglycosides
A. 1,3,2',6',3''-Penta-N-acetylgentamicin $C_1$ Dissolve 1.0 g. of gentamicin $C_1$ in 10 ml. of ethanol and add 3.0 ml. of acetic anhydride with cooling and stirring. Allow the reaction mixture to stand at room temperature for 5 hours, then add the solution dropwise, with vigorous stirring, to 250 ml. of dry ether. Filter off the resultant white precipitate, wash the precipitate with dry ether, and dry in vacuo at 50°C to give 1,3,2',6',3''-penta-N-acetylgentamicin $C_1$ dihydrate; m.p. = 360°C (decomp.); $[\alpha]_D^{26}+157°$ (0.3, water).

B. In a manner similar to that described in Preparation 1A, treat each of the following aminoglycoside antibiotics with acetic anhydride in methanol:
gentamicin $C_{1a}$,
gentamicin $C_2$,
gentamicin $C_{2a}$,
sisomicin,
verdamicin,
tobramycin,
3',4'-dideoxykanamycin B,
antibiotic JI-20-A,
antibiotic JI-20-B,
gentamicin B,
gentamicin $B_1$,
antibiotic G-418,
gentamicin A, and
gentamicin $X_2$.

Isolate and purify the resultant products in a manner similar to that described in Preparation 1A to give, respectively:
1,3,2',6',3''-penta-N-acetylgentamicin $C_{1a}$ dihydrate, m.p. = 36°C (dec.), $[\alpha]_D^{26}+146°$ (water),
1,3,2',6',3''-penta-N-acetylgentamicin $C_2$ dihydrate, m.p. = 360°C (dec.), $[\alpha]_D^{26}+160°$ (water),
1,3,2',6',3''-penta-N-acetylgentamicin $C_{2a}$,
1,3,2',6',3''-penta-N-acetylsisomicin,
1,3,2',6',3''-penta-N-acetylverdamicin dihydrate, $[\alpha]_D^{26}+147°$ (water), 1,3,2',6',3''-penta-N-acetyltobramycin,
1,3,2',6',3''-penta-N-acetyl-3',4'-dideoxykanamycin B,
1,3,2',6',3''-penta-N-acetyl-antibiotic JI-20-A,
1,3,2',6',3'-penta-N-acetyl-antibiotic JI-20-B,
1,3,6',3''-tetra-N-acetylgentamicin B tetrahydrate, $[\alpha]_D^{26}$ +119° (water),
1,3,6',3''-tetra-N-acetylgentamicin $B_1$ trihydrate, $[\alpha]_D^{26}$ +134° (water),
1,3,2',3''-tetra-N-acetyl-antibiotic G-418 monohydrate $[\alpha]_D^{26}$ +150° (water),
1,3,2',3''-tetra-N-acetylgentamicin A, and
1,3,2',3''-tetra-N-acetlygentamicin $X_2$.

C. In the procedure described in Preparation 1A, by substituting other alkanoic acid anhydrides for acetic anhydride, e.g. propionic anhydride, valeric anhydride, and caprylic anhydride, there is obtained the corresponding penta-N-lower alkanoyl derivative, e.g.

1,3,2',6',3''-penta-N-propionylgentamicin $C_1$,
1,3,2',6',3''-penta-N-valerylgentamicin $C_1$, and
1,3,2',6',3''-penta-N-caprylylgentamicin $C_1$.

In similar fashion, there is obtained the penta-N-propionyl-, the penta-N-valeryl-, and the penta-N-caprylyl- derivatives of the aminoglycoside starting compounds listed in Preparation 1B.

PREPARATION 2

Per-N-lower thioalkanoylaminoglycosides and per-N-thioaroylaminoglycosides

A. 1,3,2',6',3''-Penta-N-Thioacetylgentamicin $C_2$

Add 1.0 g. of gentamicin $C_2$ to a solution of thioacetylthioglycollic acid (1.65 g., 5.1 equiv.) in aqueous 1 N-sodium hydroxide solution (11.0 ml., 5.0 equiv.). Allow the solution to stand at 2°C in the refrigerator for 10 days, then decant the aqueous solution from the resultant dark oil which has separated; dissolve the oil in 10 ml. of ethanol and add dropwise into 200 ml. of ether. Isolate by filtration the reasultant solid precipitate comprising 1,3,2',6',3''-penta-N-thioacetylgentamicin $C_2$; yield = 1.44 g.

Purify by chromatographing over silica gel (50 g.), eluting with chloroform-methanol-15% ammonium hydroxide (2:1:1), combine the like fractions as determined by thin layer chromatography, and distill the combined eluates in vacuo to a residue comprising 1,3,2',6',3''-penta-N-thioacetylgentamicin $C_2$.

B. In a manner similar to that described in Preparation 2A, treat each of the following aminoglycoside antibiotics with thioacetylthioglycollic acid in aqueous sodium hydroxide:

gentamicin $C_1$,
gentamicin $C_{1a}$,
gentamicin $C_{2a}$,
sisomicin,
verdamicin,
antibiotic JI-20-A,
antibiotic JI-20-B,
gentamicin B,
gentamicin $B_1$,
antibiotic G-418,
gentamicin A,
gentamicin $X_2$,
tobramycin, and
3',4'-dideoxykanamycin B.

Isolate and purify the resultant products in a manner similar to that described in Preparation 2A to give, respectively:

1,3,2',6',3''-penta-N-thioacetylgentamicin $C_1$,
1,3,2',6',3''-penta-N-thioacetylgentamicin $C_{1a}$,
1,3,2',6',3''-penta-N-thioacetylgentamicin $C_{2a}$,
1,3,2',6',3''-penta-N-thioacetylsisomicin,
1,3,2',6',3''-penta-N-thioacetylverdamicin,
1,3,2',6'3''-penta-N-thioacetyl-antibiotic JI-20-A,
1,3,2',6',3''-penta-N-thioacetyl-antibiotic JI-20-B,
1,3,6',3''-tetra-N-thioacetylgentamicin B,
1,3,6',3''-tetra-N-thioacetylgentamicin $B_1$,
1,3,2',3''-tetra-N-thioacetyl-antibiotic G-418,
1,3,2',3''-tetra-N-thioacetylgentamicin in A,
1,3,2',3''-tetra-N-thioacetylgentamicin $X_2$,
1,3,2',6',3''-penta-N-thioacetyltobramycin, and
1,3,2',6',3''-penta-N-thioacetyl-3',4'-dideoxykanamycin B.

C. In the procedure of Preparation 2A, by substituting for thioacetylthioglycollic acid other lower thioacylthio-glycollic acids, e.g. thiopropionylthioglycollic acid, thio-caprylylthioglycollic acid, and thiobenzoylthioglycollic acid, there is prepared the corresponding per-N-thioacylgentamicin $C_2$, e.g. 1,3,2',6',3''-penta-N-thiopropionylgentamicin $C_2$, 1,3,2',6',3''-penta-N-thiocaprylylgentamicin $C_2$, and 1,3,2',6',3''-penta-N-thiobenzoylgentamicin $C_2$, respectively.

D. In procedure of Preparation 2B, by substituting thiobenzoylthioglycollic acid for thioacetylthioglycollic acid there is prepared the corresponding per-N-thiobenzoylaminoglycoside.

PREPARATION 3

Per-N-(N'-methylthiocarbamoyl)aminoglycosides

A. 1,3,2',6',3''-Penta-N-(N'-methylthiocarbamoyl)-gentamicin $C_2$

To a solution of 2.0 g. of gentamicin $C_2$ in 40 ml. of methanol, add 3.2 g. of methyl isothiocyanate (10.2 equiv.). Allow the reaction mixture to stand at room temperature for 3 days. Evaporate the solvent in vacuo to a residue comprising 1,3,2',6',3''-penta-N-(N'-methylthiocarbamoyl)gentamicin $C_2$ as an amorphous yellow solid; yield = 3.1 g.

Purify by dissolving the amorphous solid in a minimum amount of methanol and adding the methanol solution to a large volume of ether. Separate by filtration the resultant cream-colored solid which can be used without further purification in the process of this invention as described in the Examples. To further purify, if desired, chromatograph over silica gel, eluting with 2:1:1 chloroform-methanol-15% ammonium hydroxide, combine the like fractions as determined by thin layer chromatography and evaporate to a residue comprising 1,3,2',6',3''-penta-N-(N'-methylthiocarbamoyl)gentamacin $C_2$ as the hydrate; $[\alpha]_D^{26}$+103.0°λ (methanol).

B. In a manner similar to that described in Preparation 3A, treat each of the following aminoglycoside antibiotics with methyl isothiocyanate in methanol:

gentamicin $C_1$,
gentamicin $C_{1a}$,
gentamicin $C_{2a}$,
sisomicin,
verdamicin,
antibiotic JI-20-A,
antibiotic JI-20-B,
gentamicin B,
gentamicin $B_1$,
antibiotic G-418,
gentamicin A,
gentamicin $X_2$,
tobramycin, and
3',4'-dideoxykanamycin B.

Isolate and purify the resultant products in a manner similar to that described in Preparation 3A to give, respectively:

1,3,2',6',3''-penta-N-(N'-methylthiocarbamoyl)gentamicin $C_1$,
1,3,2',6',3''-penta-N-(N'-methylthiocarbamoyl)gentamicin $C_{1a}$,
1,3,2',6',3''-penta-N-(N'-methylthiocarbamoyl)gentamicin $C_{2a}$,
1,3,2',6',3''-penta-N-(N'-methylthiocarbamoyl)-sisomicin,
1,3,2',6',3''-penta-N-(N'-methylthiocarbamoyl)verdamicin,
1,3,2',6',3''-penta-N-(N'-methylthiocarbamoyl-antibiotic JI-20-A,
1,3,2',6',3''-penta-N-(N'-methylthiocarbamoyl)-antibiotic JI-20-B,
1,3,6',3''-tetra-N-(N'-methylthiocarbamoyl)gentamicin, B,
1,3,6',3''-tetra-N-(N'-methylthiocarbamoyl)gentamicin $B_1$,
1,3,2',3''-tetra-N-(N'-methylthiocarbamoyl)-antibiotic G-418,
1,3,2',3''-tetra-N-(N'-methylthiocarbamoyl)gentamicin A,
1,3,2',3''-tetra-N-(N'-methylthiocarbamoyl)gentamicin $X_2$,
1,3,2',6',3''-penta-N-(N'-methylthiocarbamoyl)tobramycin, and
1,3,2',6',3''-penta-N-(N'-methylthiocarbamoyl)-3',4'-dideoxykanamycin B.

PREPARATION 4

O-Iso-propylidene-per-N-lower thioalkanoylaminoglycosides and O-Iso-propylidene-per-N-(N'-methylthiocarbamoyl)aminoglycosides A. 3',4'-O-Iso-propylidene-1,3,2',6',3''-penta-N-thioacetylantibiotic JI-20-A To a solution of 5.0 g. of 1,3,2',6',3''-penta-N-thioacetyl-antibiotic JI-20-A in 25 ml. of anhydrous dimethylformamide, add 5 ml. of 2,2-dimethoxypropane and 300 mg. of dry p-toluene-sulfonic acid, and heat in a sealed flask at 110°C for 4 hours. Cool the solution and then treat the cooled solution with 6 ml. of Amberlite IR-401S resin in the hydroxide form. Filter off the resin and evaporate the filtrate in vacuo to a residue comprising 3',4'-O-iso-propylidene-1,3,2',6',3''-penta-N-thioacetyl-antibiotic JI-20-A which can be used without further purification as an intermediate in my process as set forth hereinbelow in the Examples.

An analytical sample is prepared by chromatographing the foregoing residue over silica gel, eluting with chloroform-methanol-15% ammonium hydroxide (2:1:1), combining the like fractions as determined by thin layer chromatography, and distilling the combined fractions in vacuo to a residue comprising 3',4'-O-iso-propylidene-1,3,2',6',3''-penta-N-thioacetyl-antibiotic JI-20-A.

B. In a manner similar to that described in Preparation 4A, treat each of the following per-N-thioacetylaminoglycosides in dimethylformamide with 2,2-dimethoxypropane and dry p-toluene-sulfonic acid in a sealed flask at 110°C:

1,3,2',6',3''-penta-N-thioacetyl-antibiotic JI-20-B,
1,3,6',3''-tetra-N-thioacetylgentamicin B,
1,3,6',3''-tetra-N-thioacetylgentamicin $B_1$,
1,3,2',3''-tetra-N-thioacetyl-antibiotic G-418,
1,3,2',3''-tetra-N-thioacetylgentamicin A,
1,3,2',3''-tetra-N-thioacetylgentamicin $X_2$,
1,3,2',6',3''-penta-N-thioacetyltobramycin, and
1,3,2',6',3''-penta-N-thioacetyl-3',4'-dideoxy-kanamycin B.

Isolate and purify the resultant products in a manner similar to that described hereinabove to obtain, respectively:

3',4'-O-iso-propylidene-1,3,2',6',3''-penta-N-thioacetylantibiotic JI-20-B,
a mixture comprising 2',3'-O-iso-propylidene-1,3,6',3''-tetra-N-thioacetylgentamicin B and 3',4'-O-iso-propylidene-1,3,6',3''-tetra-N-thioacetyl-gentamicin B,
a mixture comprising 2',3'-O-iso-propylidene-1,3,6',3''-tetra-N-thioacetylgentamicin $B_1$ and 3',4'-O-iso-propylidene-1,3,6',3''-tetra-N-thioacetyl-gentamicin $B_1$,
4',6'-O-iso-propylidene-1,3,2',3''-tetra-N-thioacetylantibiotic G-418,
4',6'-O-iso-propylidene-1,3,2',3''-tetra-N-thioacetylgentamicin A,
4',6'-O-iso-propylidene-1,3,2',3''-tetra-N-thioacetylgentamicin $X_2$,
4'',6''-O-iso-propylidene-1,3,2',6',3''-penta-N-thioacetyltobramycin, and
4'',6''-O-iso-propylidene-1,3,2',6',3''-penta-N-thioacetyl-3',4'-dideoxykanamycin B.

The foregoing products and product mixtures can be used without further purification as intermediates in the process described hereinbelow in the Examples.

C. In the procedures of Preparations 4A and 4B, by substituting for the per-N-thioacetylaminoglycoside starting compounds named therein, other per-N-lower thioalkanoylaminoglycosides, such as 1,3,2',6',3''-penta-N-thiopropionyl-antibiotic JI-20-A, there is obtained the corresponding O-iso-propylidene derivative, e.g. 3',4'-O-iso-propylidene-1,3,2',6',3''-penta-N-thiopropionylantibiotic JI-20-A.

D. O-Iso-propylidene-per-N-(N'-methylthiocarbamoyl)aminoglycosides

In a manner similar to that described in Preparations 4A and 4B, treat each of the following per-N-(N'-methylthiocarbamoyl)aminoglycosides in dimethylformamide with 2,2-dimethoxypropane and dry p-toluenesulfonic acid in a sealed flask at 110°C:

1,3,2',6',3''-penta-N-(N'-methylthiocarbamoyl)-antibiotic JI-20-A,
1,3,2',6',3''-penta-N-(N'-methylthiocarbamoyl)-antibiotic JI-20-B,
1,3,6',3''-tetra-N-(N'-methylthiocarbamoyl)gentamicin B,
1,3,6',3''-tetra-N-(N'-methylthiocarbamoyl)gentamicin $B_1$,
1,3,2',3''-tetra-N-(N'-methylthiocarbamoyl)-antibiotic G-418,
1,3,2',3''-tetra-N-(N'-methylthiocarbamoyl)gentamicin A, and
1,3,2',3''-tetra-N-(N'-methylthiocarbamoyl)gentamicin $X_2$.

Isolate and purify the resultant products in a manner similar to that described in Preparations 4A and 4B to obtain, respectively:

3',4'-O-iso-propylidene-1,3,2',6',3''-penta-N-(N'-methylthiocarbamoyl)-antibiotic JI-20-A,
3',4'-O-iso-propylidene-1,3,2',6',3''-penta-N-(N'-methylthiocarbamoyl)-antibiotic JI-20-B,
a mixture comprising 2',3'-O-iso-propylidene-1,3,6',3''-tetra-N-(N'-methylthiocarbamoyl)gentamicin B and 3',4'-O-isopropylidene-1,3,6',3''-tetra-N-(N'methylthiocarbamoyl)gentamicin B,
a mixture comprising 2',3'-O-iso-propylidene-1,3,6',3''-tetra-N-(N'-methylthiocarbamoyl)gentamicin $B_1$ and 3',4'-O-iso-propylidene-1,3,6',3''- tetra-N-(N'-methylthiocarbamoyl)gentamicin $B_1$,
4',6'-O-iso-propylidene-1,3,2',3''-tetra-N-(N'-methylthiocarbamoyl)-antibiotic G-418,
4',6'-O-iso-propylidene-1,3,2',3''-tetra-N-(N'-methylthiocarbamoyl)gentamicin A, and
4',6'-O-iso-propylidene-1,3,2',3''-tetra-N-(N'-methylthiocarbamoyl)gentamicin $X_2$.

PREPARATION 5

Per-N-carbobenzyloxyaminoglycosides
A. 1,3,2',6',3''-Penta-N-carbobenzyloxygentamicin $C_1$ Dissolve 22 g. of gentamicin $C_1$ in 500 ml. of methanol-water (4:1) and cool the solution to 0°C. While stirring the solution and maintaining the solution temperature of 0° to 5°C, add dropwise 56 g. of carbobenzyloxy chloride while also slowly adding aqueous sodium carbonate in quantities sufficient to maintain the reaction mixture pH in the range of from about 8 to 10. After the addition of carbobenzyloxy chloride is completed, stir the reaction mixture for an additional 6 hours while allowing the reaction mixture to warm to room temperature. Separate the resultant precipitate by filtration, wash the precipitate with water and air dry to obtain 1,3,2',6',3''-penta-N-carbobenzyloxygentamicin $C_1$ (yield = 46 g.) which is used without further purification in the process as described in the Examples.

B. 1,3,2',6',3''-Penta-N-carbobenzyloxysisomicin

Dissolve 25 g. of sisomicin and 13 g. of sodium carbonate in 625 ml. of water. Add 100 ml. of carbobenzyloxy chloride to the stirred solution at 25°C and continue stirring the mixture for 16 hours. Separate the resultant precipitate by filtration, wash the precipitate thoroughly with water, dry in vacuo and then wash with hexane to give 1,3,2',6',3''-penta-N-carbobenzyloxysisomicin (yield = 62 g.) as a colorless, amorphous solid which can be used without further purification in the Examples.

Purify further by chromatographing over silica gel, using 40% acetone in benzene as the eluant to obtain an analytical sample of 1,3,2',6',3''-penta-N-carbobenzyloxysisomicin (m.p. = 165°–173°C (dec.)).

C. In a manner similar to that described in Preparations 5A and 5B, treat each of the following aminoglycoside antibiotics with carbobenzyloxy chloride and sodium carbonate:

gentamicin $C_{1a}$,
gentamicin $C_2$,
gentamicin $C_{2a}$,
verdamicin,
tobramycin,
3',4'-dideoxykanamycin B,
antibiotic JI-20-A,
antibiotic JI-20-B,
gentamicin B,
gentamicin $B_1$,
antibiotic G-418,
gentamicin A, and
gentamicin $X_2$.

Isolate and purify the resultant products in a manner similar to that described in Preparations 5A and 5B to give, respectively:

1,3,2',6',3''-penta-N-carbobenzyloxygentamicin $C_{1a}$,
1,3,2',6',3''-penta-N-carbobenzyloxygentamicin $C_2$,
1,3,2',6',3''-penta-N-carbobenzyloxygentamicin $C_{2a}$,
1,3,2',6',3''-penta-N-carbobenzyloxyverdamicin,
1,3,2',6',3''-penta-N-carbobenzyloxytobramycin,
1,3,2',6',3''-penta-N-carbobenzyloxy-3',4'-dideoxykanamycin B,
1,3,2',6',3''-penta-N-carbobenzyloxy-antibiotic JI-20-A,
1,3,2',6',3''-penta-N-carbobenzyloxy-antibiotic JI-20-B,
1,3,6',3''-tetra-N-carbobenzyloxygentamicin B,
1,3,6',3''-tetra-N-carbobenzyloxygentamicin $B_1$,
1,3,6',3''-tetra-N-carbobenzyloxy-antibiotic G-418,
1,3,2',3''-tetra-N-carbobenzyloxygentamicin A, and
1,3,2',3''-tetra-N-carbobenzyloxygentamicin $X_2$.

Preparation 6

O-iso-propylidene(and O-benzylidene)-per-N-carbobenzyloxyaminoglycosides
A. O-iso-propylidene-per-N-carbobenzyloxy derivatives of gentamicin A, gentamicin B, gentamicin $B_1$, gentamicin $X_2$, Antibiotic-JI-20-A, Antibiotic JI-20-B, Antibiotic G-418, tobramycin and 3',4'-dideoxykanamicin B In a manner similar to that described in Preparation 4A, treat each of the following per-N-carbobenzyloxyaminoglycosides with 2,2-dimethoxypropane and dry p-toluenesulfonic acid in dimethylformamide:

1,3,2',3''-tetra-N-carbobenzyloxygentamicin A,
1,3,6',3''-tetra-N-carbobenzyloxygentamicin B,
1,3,6',3''-tetra-N-carbobenzyloxygentamicin $B_1$,
1,3,2',3''-tetra-N-carbobenzyloxygentamicin $X_2$,
1,3,2',6',3''-penta-N-carbobenzyloxy-antibiotic JI-20-A,
1,3,2',6',3''-penta-N-carbobenzyloxy-antibiotic JI-20-B,
1,3,2',3''-tetra-N-carbobenzyloxy-antibiotic G-418,
1,3,2',6',3''-penta-N-carbobenzyloxytobramycin and
1,3,2',6',3''-penta-N-carbobenzyloxy-3',4'-dideoxykanamicin B Isolate and purify each of the resultant products in a manner similar to that described in Preparation 4A to obtain, respectively:

4',6'-O-iso-propylidene-1,3,2',3''-tetra-N-carbobenzyloxygentamicin A,
a mixture comprising 2',3'-O-iso-propylidene(and 3',4'-O-iso-propylidene)-1,3,6',3''-tetra-N-carbobenzyloxygentamicin B,
a mixture comprising 2',3'-O-iso-propylidene(and 3',4'-O-iso-propylidene)-1,3,6',3''-tetra-N-carbobenzyloxygentamicin $B_1$,
4',6'-O-iso-propylidene-1,3,2',3''-tetra-N-carbobenzyloxygentamicin $X_2$,
3',4'-O-iso-propylidene-1,3,2',6',3''-penta-N-carbobenzyloxy-antibiotic JI-20-A,
3',4'-O-iso-propylidene-1,3,2',6',3''-penta-N-carbobenzyloxy-antibiotic JI-20-B,
4',6'-O-iso-propylidene-1,3,2',3''-tetra-N-carbobenzyloxy-antibiotic G-418,
4'',6''-O-iso-propylidene-1,3,2',6',3''-penta-N-carbobenzyloxytobramycin, and
4'',6''-O-iso-propylidene-1,3,2',6',3''-penta-N-carbobenzyloxy-3',4'-dideoxykanamicin B.

B. O-benzylidene-per-N-carbobenzyloxyaminoglycosides

In the procedure described in Preparation 6A, by using an equivalent amount of benzaldehyde instead of 2,2-dimethoxypropane there is obtained the corresponding O-benzylidene derivative, respectively:

4',6'-O-benzylidene-1,3,2',3''-tetra-N-carbobenzyloxygentamicin A,
a mixture comprising 2',3'-O-benzylidene(and 3',4'-benzylidene)-1,3,6',3''-tetra-N-carbobenzyloxygentamicin B,
a mixture comprising 2',3'-O-benzylidene(and 3',4'-

O-benzylidene)-1,3,6',3''-tetra-N-carbobenzyloxygentamicin B₁,
4',6'-O-benzylidene-1,3,2',3''-tetra-N-carbobenzyloxygentamicin X₂,
3',4'-O-benzylidene-1,3,2',6',3''-penta-N-carbobenzyloxy-antibiotic JI-20-A,
3',4'-O-benzylidene-1,3,2',6',3''-penta-N-carbobenzyloxy-antibiotic JI-20-B,
4',6'-O-benzylidene-1,3,2',3''-tetra-N-carbobenzyloxy-antibiotic G-418,
4'',6''O-benzylidene-1,3,2',6',3''-penta-N-carbobenzyloxybramycin, and
4'',6''-O-benzylidene-1,3,2',6',3''-penta-N-carbobenzyloxy-3',4'-dideoxykanamicin B.

Preparation 7

Per-N-benzylideneaminoglycosides

A. 1,3,2',6'-tetra-N-benzylidene-3'',4''-N,O-benzylidenesisomicin

Add 5.65 ml. of benzaldehyde to 5 g. of sisomicin in 100 ml. of dry benzene. Stir together at room temperature until no starting material (sisomicin) is present as evidenced by thin layer chromatography (about 21 hours reaction time). Evaporate the benzene followed by drying in vacuo to give a residue (8.91g.) comprising 1,3,2',6'-tetra-N-benzylidene-3'',4''-N,O-benzylidenesisomicin. Purify by crystallization from chloroform-hexane as follows: dissolve a sample of the foregoing pentabenzylidene derivatives in a minimum of chloroform and add hexane to incipient turbidity. Allow the solution to stand until crystallization appears complete, then filter and dry the resultant crystalline precipitate comprising the purified pentabenzylidene, m.p. 123°–126°C; $[\alpha]_D^{26}$ + 42° (0.3% in chloroform).

B. In a manner similar to that described in Preparation 7A, treat each of the following aminoglycosides with benzaldehyde in dry benzene:
gentamicin C₁ₐ,
gentamicin C₂,
gentamicin C₂ₐ,
verdamicin,
Antibiotic JI-20-A,
Antibiotic JI-20-B,
gentamicin B,
gentamicin B₁,
Antibiotic G-418,
tobramycin,
3',4'-dideoxykanamicin, and
gentamicin X₂.

Isolate and purify each of the resultant products in a manner similar to that described in Preparation 7A to obtain respectively:
1,3,2',6'-tetra-N-benzylidene-3'',4''-N,O-benzylidenegentamicin C₁ₐ,
1,3,2',6'-tetra-N-benzylidene-3'',4''-N,O-benzylidenegentamicin C₂, m.p.=205.5°–212.2°C; $[\alpha]_D^{26}$ −16.8(0.3% in chloroform),
1,3,2',6'-tetra-N-benzylidene-3'',4''-N,O-benzylidenegentamicin C₂ₐ,
1,3,2',6'-tetra-N-benzylidene-3'',4''-N,O-benzylideneverdamicin,
1,3,2',6'-tetra-N-benzylidene-3'',4''-N,O-benzylidene-antibiotic JI-20-A,
1,3,2',6'-tetra-N-benzylidene-3'',4''-N,O-benzylidene-antibiotic JI-20-B,
1,3,6'-tri-N-benzylidene-3'',4''-N,O-benzylidenegentamicin B,
1,3,6'-tri-N-benzylidene-3'',4''-N,O-benzylidenegentamicin B₁,
1,3,2'-tri-N-benzylidene-3'',4''-N,O-benzylideneantibiotic G-418,
1,3,2'',6',3''-penta-N-benzylidene tobramycin,
1,3,2',6',3''-penta-N-benzylidene -3',4'-dideoxykanamycin B, and
1,3,2'-tri-N-benzylidene-3'',4''-N,O-benzylidenegentamicin X₂.

Preparation 8

In a manner similar to that described in Preparation 6B, treat each of the following per-N-benzylideneaminoglycosides with benzaldehyde p-toluene sulfonic acid in dry dimethyl formamide:
1,3,2',6',3''-penta-N-benzylidenetobramycin,
1,3,2',6',3''-penta-N-benzylidene-3',4'-dideoxykanamycin B,
1,3,2'-tri-N-benzylidene-3'',4''-N,O-benzylidenegentamicin X₂,
1,3,6', tri-N-benzylidene-3'',4''-N,O-benzylidenegentamicin B,
1,3,6'-tri-N-benzylidene-3'',4''-N,O-benzylidenegentamicin B₁,
1,3,2',6'-tetra-N-benzylidene-3'',4''-N,O-benzylidene Antibiotic JI-20-A,
1,3,2',6'-tetra-N-benzylidene-3'',4''-N,O-benzylidene Antibiotic JI-20-B, and
1,3,2'-tri-N-benzylidene-3'',4''-N,O-benzylidene Antibiotic G-418, Isolate and purify each of the resultant products in a manner similar to that described in Preparation 6B to obtain respectively:
4'',6''-O-benzylidene-1,3,2',6',3''-penta-N-benzylidenetobramycin,
4'',6''-O-benzylidene-1,3,2',6',3''-penta-N-benzylidene-3',4'-dideoxykanamycin B,
4',6'-O-benzylidene-1,3,2'-tri-N-benzylidene-3'',4''-N,O-benzylidenegentamicin X₂,
a mixture comprising 2',3'(and 3',4')-O-benzylidene-1,3,6'-tri-N-benzylidene,3'',4''-N,O-benzylidenegentamicin B,
a mixture comprising 2',3'(and 3',4')-O-benzylidene-1,3,6'-tri-N-benzylidene-3'',4''-N,O-benzylidenegentamicin B₁,
3',4'-O-benzylidene-1,3,2',6'-tetra-N-benzylidene-3'',4''-N,O-benzylidene Antibiotic JI-20-A,
3',4'-O-benzylidene-1,3,2',6'-tetra-N-benzylidene-3'',4''-N,O-benzylidene Antibiotic JI-20-B, and
4',6'-O-benzylidene-1,3,2'-tri-N-benzylidene-3'',4''-N,O-benzylidene Antibiotic G-418.

EXAMPLE 1

2''-O-Hydrocarbonsulfonyl-per-N-alkanoylaminoglycosides

A. 2''-O-Methanesulfonyl-1,3,2',6',3''-penta-N-acetylgentamicin C₁ₐ

Dissolve 10.5 g. of 1,3,2',6',3''-penta-N-acetylgentamicin C₁ₐ dihydrate (prepared as described in Preparation 1B) in 100 ml. of dry pyridine, then evaporate the pyridine in vacuo. Repeat this process with two additional 100 ml. portions of pyridine, then dissolve the resultant dry residue comprising 1,3,2',6',3''-penta-N-acetylgentamicin C₁ₐ in 50 ml. of pyridine, then add 1.35 ml. of methanesulfonyl chloride and allow the solution to stand at room temperature for 3 hours. Add 100 ml. of methanol and evaporate the solution to a residue. Dissolve the residue in the lower phase of a 2:1:1 mixture of chloroform-methanol-15% ammonium hydroxide and apply to a column of silica gel (300 g.). Elute the column with a 2:1:1 mixture of chloroform-methanol-15% ammonium hydroxide. Combine the like fractions as determined by thin layer chromatography and evaporate the combined fractions in vacuo to a residue comprising 2''-O-methanesulfonyl-1,3,2',6',-3''-penta-N-acetylgentamicin $C_{1a}$ as an amorphous white solid, having a single spot on thin layer chromatography, the nuclear magnetic resonance (n.m.r.) spectrum of which shows a 3 proton singlet resonance at ca $\delta 3.2$ p.p.m. attributable to the methanesulfonyl group.

B. In a manner similar to that described in Example 1A, treat each of the following penta-N-acetylaminoglycosides with methanesulfonyl chloride in pyridine:

1,3,2',6',3''-penta-N-acetylgentamicin $C_1$ dihydrate,
1,3,2',6',3''-penta-N-acetylgentamicin $C_2$ dihydrate,
1,3,2',6',3''-penta-N-acetylgentamicin $C_{2a}$,
1,3,2',6',3''-penta-N-acetylsisomicin, and
1,3,2',6',3''-penta-N-acetylverdamicin.

Isolate and purify the resultant products in a manner similar to that described in Example 1A to obtain, respectively:

2''-O-methanesulfonyl-1,3,2',6',3''-penta-N-acetylgentamicin $C_1$,
2''-O-methanesulfonyl-1,3,2',6',3''-penta-N-acetylgentamicin $C_2$,
2''-O-methanesulfonyl-1,3,2',6',3''-penta-N-acetylgentamicin $C_{2a}$,
2''-O-methanesulfonyl-1,3,2',6',3''-penta-N-acetylsisomicin, and
2''-O-methanesulfonyl-1,3,2',6',3''-penta-N-acetylverdamicin.

C. In the procedures described in Examples 1A and 1B, other per-N-alkanoylaminoglycosides (prepared as described in Preparation 1C) may be substituted for penta-N-acetylaminoglycoside starting compounds and there is obtained the corresponding 2''-O-methanesulfonyl derivative. Thus, treatment of 1,3,2',6',3''-penta-N-propionylgentamicin $C_1$ with methanesulfonyl chloride in pyridine and isolation and purification of the resultant product in the manner of Example 1A yields the corresponding 2''-O-methanesulfonyl-1,3,2',6',3''-penta-N-propionylgentamicin $C_1$.

D. 2''-O-p-Toluenesulfonyl-per-N-alkanoylaminoglycosides

In the procedure of Examples 1A, 1B and 1C, by substituting an equivalent quantity of p-toluenesulfonyl chloride for methanesulfonyl chloride, there is obtained the corresponding 2''-O-p-toluenesulfonyl-per-N-alkanoylaminoglycoside.

EXAMPLE 2

2''-Alkylthio-2''-deoxy-per-N-alkanoylaminoglycosides

A. 2''-Ethylthio-2''-deoxy-1,3,2',6',3''-penta-N-acetylgentamicin $C_{1a}$

To a solution of ethanethiol (483 mg.) in dry dimethylformamide (3 ml.) at 0°–4°C under an atmosphere of nitrogen, add with stirring 0.25 ml. of a 1.6 M solution of butyl lithium. To this resultant solution of lithium thioethylate maintained at 0°–4°C with stirring add dropwise under an atmosphere of nitrogen a solution of 2''-O-methanesulfonyl-1,3,2',6',3''-penta-N-acetylgentamicin $C_{1a}$ (196 mg., 0.257 mM.) in dry dimethylformamide (2 ml.). Stir the reaction mixture under an atmosphere of nitrogen for 3 hours at 114°C. Add 2 ml. of aqueous dimethylformamide, then evaporate the reaction mixture to a residue. Dissolve the residue in the lower phase of a 2:1:1 chloroform-methanol-15% ammonium hydroxide solvent mixture and apply the solution of the residue to a column of silica gel (7 g.). Elute with a 2:1:1 chloroform-methanol-15% ammonium hydroxide mixture and take 2 ml. fractions and combine the like fractions containing a single component as determined by thin layer chromatography. Evaporate the combined fractions in vacuo to a residue comprising 2''-ethylthio-2''-deoxy-1,3,2',6',3''-penta-N-acetylgentamicin $C_{1a}$ as a white amorphous solid; yield = 36 mg.; n.m.r. $\delta 5.2$ (1H, J=3.5H$_z$, anomeric proton), $\delta 4.9$ (1H, J=1.5H$_z$, anomeric proton), $\delta 3.15$ (3H, N—CH$_3$), $\delta 2.75$ (2H, quartet, J=7H$_z$, S—CH$_2$—), $\delta 1.2$ (3H, triplet, J=7H$_z$, CH$_2$—CH$_3$).

Alternatively, in the above procedure there may be substituted for the 2''-O-methanesulfonyl-1,3,2',6',3''-penta-N-acetylgentamicin $C_{1a}$ an equivalent amount (i.e. 0.257 mM.) of 2''-O-p-toluenesulfonyl-1,3,2',6',-3''-penta-N-acetylgentamicin $C_{1a}$, and there is obtained 2''-ethylthio-2''-deoxy-1,3,2',6',3''-penta-N-acetylgentamicin $C_{1a}$.

B. In a manner similar to that described in Example 2A, treat each of the 2''-O-methanesulfonyl-per-N-acetylaminoglycosides prepared as described in Example 1B with ethanethiol and butyl lithium in dry dimethylformamide under an atmosphere of nitrogen. Isolate and purify the resultant products in a manner similar to that described in Example 2A to obtain, respectively:

2''-ethylthio-2''-deoxy-1,3,2',6',3''-penta-N-acetylgentamicin $C_1$,
2''-ethylthio-2''-deoxy-1,3,2',6',3''-penta-N-acetylgentamicin $C_2$,
2''-ethylthio-2''-deoxy-1,3,2',6',3''-penta-N-acetylgentamicin $C_{2a}$,
2''-ethylthio-2''-deoxy-1,3,2',6',3''-penta-N-acetylsisomicin, and
2''-ethylthio-2''-deoxy-1,3,2',6',3''-penta-N-acetylverdamicin.

C. In the procedure of Examples 2A and 2B, by substituting other lower alkanethiols for ethanethiol, there is obtained the corresponding 2''-alkylthio-2''-deoxy derivative. Thus, addition of butyl lithium to a solution of n-propanethiol in dry dimethylformamide in the manner of Example 2A followed by addition of 2''-O-methanesulfonyl-2''-deoxy-1,3,2',6',3''-penta-N-acetylgentamicin $C_{1a}$ to the resultant solution of lithium propanethiolate yields 2''-n-propylthio-2''-deoxy-1,3,2', 6',3''-penta-N-acetylgentamicin $C_{1a}$.

D. In the procedure of Examples 2A through 2C, other 2''-O-methanesulfonyl-2''-deoxy-per-N-alkanoylaminoglycoside derivatives may be substituted for the 2''-O-methanesulfonyl-2''-deoxy-penta-N-acetylaminoglycoside starting compounds and there is obtained the corresponding 2''-alkylthio-2''-deoxy-per-N-alkanoylaminoglycoside, e.g. treatment of 2''-O-methanesulfonyl-1,3,2',6', 3''-penta-N-propionylgentamicin $C_{1a}$ with lithium ethanethiolate in the manner of Example 2A yields 2''-ethylthio-2''-deoxy-1,3,2',-6',3''-penta-N-propionylgentamicin $C_{1a}$.

EXAMPLE 3

2''-Deoxy-per-N-alkanoylaminoglycosides

A. 2''-Deoxy-1,3,2',6',3''-penta-N-acetylgentamicin $C_{1a}$

To a solution of 35 mg. of 2''-ethylthio-2''-deoxy-1,3,2',6',3''-penta-N-acetylgentamicin $C_{1a}$ in ethanol (15 ml), add about 1g. of Raney Nickel and heat the reaction mixture at reflux temperature for 4 hours. Filter the reaction mixture and distill the filtrate in vacuo to a residue comprising 2''-deoxy-1,3,2',6',3''-penta-N-acetylgentamicin $C_{1a}$; yield = 13.8 mg.

In the above procedure, in place of the 2''-ethylthio-2''-deoxy-1,3,2',6',3''-penta-N-acetylgentamicin $C_{1a}$ starting compound there may be used other 2''-alkylthio-2''-deoxy derivatives to obtain the compound of this Example; thus, 2''-n-propylthio-2''-deoxy-1,3,2',6',3''-penta-N-acetylgentamicin $C_{1a}$ upon treatment with Raney Nickel in ethanol at reflux temperature as described hereinabove yields 2''-deoxy-1,3,2',-6',3''-penta-N-acetylgentamicin $C_{1a}$.

B. In a manner similar to that described in Example 3A, treat each of the 2''-ethylthio-2''-deoxy-per-N-acetylaminoglycosides prepared in Example 2B with Raney Nickel in ethanol at reflux temperature. Isolate and purify the resultant products in a manner similar to that described hereinabove to obtain, respectively:

2''-deoxy-1,3,2',6',3''-penta-N-acetylgentamicin $C_1$,
2''-deoxy-1,3,2', 6',3''-penta-N-acetylgentamicin $C_2$,
2''-deoxy-1,3,2',6',3''-penta-N-acetylgentamicin $C_{2a}$,
2''-deoxy-1,3,2',6',3''-penta-N-acetylsisomicin, and
2''-deoxy-1,3,2',6',3''-penta-N-acetylverdamicin.

C. In the procedures described in Examples 3A and 3B, other 2''-alkylthio-2''-deoxy-per-N-lower alkanoylaminoglycoside intermediates may be used as starting compounds to prepare the corresponding 2''-deoxy-per-N-lower alkanoylaminoglycoside. Thus, treatment of 2''-ethylthio-2''-deoxy-1,3,2',6',3''-penta-N-propionylgentamicin $C_{1a}$ prepared according to the method of Example 2D with Raney Nickel in ethanol at reflux temperature in the manner described in Example 3A followed by isolation and purification of the resultant product in a manner similar to that described yields 2''-deoxy-1,3,2',6',3''-penta-N-propionylgentamicin $C_{1a}$.

EXAMPLE 4

2''-Deoxyaminoglycosides Derived from the Per-N-lower alkanoyl Derivatives Thereof A. 2''-Deoxygentamicin $C_{1a}$ To 13 mg. of 2''-deoxy-1,3,2',6',3''-penta-N-acetylgentamicin $C_{1a}$ in 1.6 ml. of water, add 0.34 ml. of 50% aqueous sodium hydroxide. Heat the solution in a sealed container (preferably made of material resistant to alkali) at 100°C for 42 hours. Lyophilize the solution and chromatograph the resultant residue over silica gel (2 g.), eluting with chloroform-methanol-15% ammonium hydroxide. Combine the like fractions as determined by thin layer chromatography and evaporate the combined fractions in vacuo to a residue comprising 2''-deoxygentamicin $C_{1a}$ as an amorphous white solid; yield = 6 mg.; n.m.r. $\delta 5.2$ (1H, doublet, J=3.5H$_2$, anomeric proton), $\delta 4.9$ (1H, quartet, J=3.5H$_2$ and 1.5H$_2$, anomeric proton), $\delta 3.2$ (3H, N—CH$_3$), $\delta 1.1$ (3H, C—CH$_3$); mass spectrum m/e 434 [(M + 1)$^+$], 319, 301, 291, 273, 191, 173, 163, 145, 144, 129.

In a similar manner treat other 2''-deoxy-per-N-alkanoylgentamicin $C_{1a}$ derivatives, e.g. 2''-deoxy-1,3,2',6',3''-penta-N-propionylgentamicin $C_{1a}$ with aqueous sodium hydroxide in the manner described hereinabove to obtain the compound of this Example, i.e. 2''-deoxygentamicin $C_{1a}$.

B. In a manner similar to that described in above Example 4A, treat each of the 2''-deoxy-per-N-acetylaminoglycosides prepared as described in Example 3B with aqueous sodium hydroxide in a sealed container at 100°C. Isolate and purify the resultant product in a manner similar to that described hereinabove to obtain, respectively:

2''-deoxygentamicin $C_1$,
2''-deoxygentamicin $C_2$,
2''-deoxygentamicin $C_{2a}$,
2''-deoxysisomicin, and
2''-deoxyverdamicin.

EXAMPLE 5

2''-O-Hydrocarbonsulfonyl-per-N-thioalkanoylaminoglycosides

A. 2''-O-Methanesulfonyl-1,3,2',6',3''-penta-N-thioacetylgentamicin $C_2$

In a manner similar to that described in Example 1A, prepare a solution of 1,3,2',6',3''-penta-N-thioacetylgentamicin $C_2$ in dry pyridine, then treat the solution with methanesulfonyl chloride at room temperature. Isolate and purify the resultant product in a manner similar to that described in Example 1A to obtain 2''-O-methanesulfonyl-1,3,2',6',3''-penta-N-thioacetylgentamicin $C_2$ as a white amorphous solid.

B. In a manner similar to that described in Example 5A, treat each of the following penta-N-thioacetylaminoglycosides with methanesulfonyl chloride in pyridine:

1,3,2',6',3''-penta-N-thioacetylgentamicin $C_1$,
1,3,2',6',3''-penta-N-thioacetylgentamicin $C_{2a}$,
1,3,2',6',3''-penta-N-thioacetylsisomicin, and
1,3,2',6',3''-penta-N-thioacetylverdamicin Isolate and purify the resultant products in a manner similar to that described in Example 5A to obtain, respectively:

2''-O-methanesulfonyl-1,3,2',6',3''-penta-N-thioacetylgentamicin $C_1$,
2''-O-methanesulfonyl-1,3,2',6',3''-penta-N-thioacetylgentamicin $C_{1a}$,
2''-O-methanesulfonyl-1,3,2',6',3''-penta-N-thioacetylgentamicin $C_{2a}$,
2''-O-methanesulfonyl-1,3,2',6',3''-penta-N-thioacetylsisomicin, and
2''-O-methanesulfonyl-1,3,2',6',3''-penta-N-thioacetylverdamicin.

C. In the process described in Examples 5A and 5B, other per-N-thioalkanoylaminoglycosides (prepared as described in Preparation 2C) may be substituted for the per-N-thioacetylaminoglycoside starting compounds, and there is obtained the corresponding 2''-O-methanesulfonyl derivative. Thus, treatment of each of 1,3,2',6',3''-penta-N-thiopropionylgentamicin $C_2$ and 1,3,2',6',3''-penta-N-thiocaprylylgentamicin $C_2$ with methanesulfonyl chloride in pyridine in the manner described in Example 5A yields, respectively: 2''-O-methanesulfonyl-1,3,2',6',3''-penta-N-thiopropionylgentamicin $C_2$ and 2''-O-methanesulfonyl-1,3,2',6',3''-penta-N-thiocaprylylgentamicin $C_2$.

D. 2''-O-p-Toluenesulfonyl-per-N-thioalkanoylaminoglycosides

In the procedure of Examples 5A–5C, by substituting an equivalent quantity of p-toluenesulfonyl chloride for methanesulfonyl chloride, there is obtained the corresponding 2''-O-p-toluenesulfonyl-per-N-thioalkanoylaminoglycoside.

EXAMPLE 6

2''-Epi-sulfhydryl-2''-deoxy-3''-N-alkanoyl-tetra-N-thioalkanoylaminoglycosides

A. 2''-Epi-sulfhydryl-2''-deoxy-3''-N-acetyl-1,3,2',6'-tetra-N-thioacetylgentamicin $C_2$ Dissolve 2 g. of 2''-O-methanesulfonyl-1,3,2',6',3''-penta-N-thioacetylgentamicin $C_2$ in 60 ml. of dimethylformamide-water (95:5) and heat the solution at reflux temperature for 1 hour. Evaporate the solvent in vacuo and chromatograph the resultant residue over silica gel (120 g.), eluting with the lower layer of a 2:1:1 chloroform-methanol-15% ammonium hydroxide mixture. Combine the like fractions as determined by thin layer chromatography and evaporate the combined fractions in vacuo to a residue comprising 2''-epi-sulfhydryl-2''-deoxy-3''-N-acetyl-1,3,2',6'-tetra-N-thioacetylgentamicin $C_2$.

Alternatively, 2''-O-p-toluenesulfonyl-1,3,2',6',3''-penta-N-thioacetylgentamicin $C_2$ in dimethylformamide-water (95:5) is heated at reflux temperature and the resultant product is isolated and purified as described hereinabove to obtain the compound of this Example.

B. In a manner similar to that described in Example 6A, treat each of the 2''-O-methanesulfonyl-per-N-thioacetylaminoglycosides prepared as described in Example 5B in dimethylformamide-water (95:5) at reflux temperature. Isolate and purify the resultant respective products in a manner similar to that described in Example 6A to obtain, respectively:

2''-epi-sulfhydryl-2''-deoxy-3''-N-acetyl-1,3,2',6'-tetra-N-thioacetylgentamicin $C_1$,
2''-epi-sulfhydryl-2''-deoxy-3''-N-acetyl-1,3,2',6'-tetra-N-thioacetylgentamicin $C_{1a}$,
2''-epi-sulfhydryl-2''-deoxy-3''-N-acetyl-1,3,2',6',-tetra-N-thioacetylgentamicin $C_{2a}$,
2''-epi-sulfhydryl-2''-deoxy-3''-N-acetyl-1,3,2',6'-tetra-N-thioacetylsisomicin, and
2''-epi-sulfhydryl-2''-deoxy-3''-N-acetyl-1,3,2',6'-tetra-N-thioacetylverdamicin.

C. In the procedure of Examples 6A and 6B by substituting other per-N-thioalkanoylaminoglycoside derivatives, there is obtained the corresponding 2''-epi-sulfhydryl-2''-deoxy-3''-N-alkanoyl-tetra-N-thioalkanoylaminoglycoside. Thus, treatment of each of 2''-O-methanesulfonyl-1,3,2',6',3''-penta-N-thiopropionylgentamicin $C_2$ and 2''-O-methanesulfonyl-1,3,2',6',3''-penta-N-thiocaprylylgentamicin $C_2$ in dimethylformamide-water (95:5) at reflux temperature in the manner described in Example 6A yields 2''-epi-sulfhydryl-2''-deoxy-3''-N-propionyl-1,3,2',6'-tetra-N-thiopropionylgentamicin $C_2$ and 2''-epi-sulfhydryl-2''-deoxy-3''-N-caprylyl-1,3,2',6'-tetra-N-thiocaprylylgentamicin $C_2$.

EXAMPLE 7

2''-O-Hydrocarbonsulfonyl-per-N-(N'-methylthiocarbamoyl)aminoglycosides

A. 2''-O-Methanesulfonyl-1,3,2',6',3''-penta-N-(N'-methylthiocarbamoyl)gentamicin $C_2$ In a manner similar to that described in Example 1A, treat 1,3,2',6',3''-penta-N-(N'-methylthiocarbamoyl)-gentamicin $C_2$ with methanesulfonyl chloride in pyridine at room temperature for 3 hours. Isolate and purify the resultant product in a manner similar to that described in Example 1A to obtain 2''-O-methanesulfonyl-1,3,2',6',3''-penta-N-(N'-methylthiocarbamoyl)-gentamicin $C_2$.

B. Treat each of the penta-N-(N'-methylthiocarbamoyl)aminoglycoside derivatives prepared as described in Preparation 3B with methanesulfonyl chloride in pyridine in a manner similar to that described in Example 7A. Isolate and purify each of the resultant products in a manner similar to that described to obtain, respectively:

2''-O-methanesulfonyl-1,3,2',6',3''-penta-N-(N'-methylthiocarbamoyl)gentamicin $C_1$,
2''-O-methanesulfonyl-1,3,2',6',3''-penta-N-(N'-methylthiocarbamoyl)gentamicin $C_{1a}$,
2''-O-methanesulfonyl-1,3,2',6',3''-penta-N-(N'-methylthiocarbamoyl)gentamicin $C_{2a}$,
2''-O-methanesulfonyl-1,3,2',6',3''-penta-N-(N'-methylthiocarbamoyl)sisomicin, and
2''-O-methanesulfonyl-1,3,2',6',3''-penta-N-(N'-methylthiocarbamoyl)verdamicin.

C. 2''-O-p-Toluenesulfonyl-per-N-(N'-methylthiocarbamoyl)aminoglycosides

In the procedures of Examples 7A and 7B, by substituting an equivalent quantity of p-toluenesulfonyl chloride for methanesulfonyl chloride, there is obtained the corresponding 2''-O-p-toluenesulfonyl-per-N-(N'-methylthiocarbamoyl)aminoglycoside.

EXAMPLE 8

2''-Epi-sulfhydryl-2''-deoxy-3''-N-(N'-methylcarbamoyl)-tetra-N-(N'-methylthiocarbamoyll)aminoglycosides A. 2''-Epi-sulfhydryl-2''-deoxy-3''-N-(N'-methylcarbamoyl)-1,3,2',6'-tetra-N-(N'-methylthiocarbamoyl)-gentamicin $C_2$ In a manner similar to that described in Example 6A, treat 2''-O-methanesulfonyl-1,3,2',6',3''-penta-N-(N'-methylthiocarbamoyl)gentamicin $C_2$ in aqueous dimethylformamide at reflux temperature for 1 hour. Isolate and purify the resultant product in a manner similar to that described to obtain 2''-epi-sulfhydryl2''-deoxy-3''-N-(N'-methylcarbamoyl)-1,3,2',6'-tetra-N-(N'-methylthiocarbamoyl)gentamicin $C_2$.

In similar manner treat 2''-O-p-toluenesulfonyl-1,3,2',6',3''-penta-N-(N'-methylthiocarbamoyl)gentamicin $C_2$ with aqueous dimethylformamide at reflux temperature. Isolate and purify in a manner similar to that described above to obtain the compound of this Example, i.e. 2''-epi-sulfhydryl-2''-deoxy-3''-N-(N'-methylcarbamoyl)-1,3,2',6'-tetra-N-(N'-methylthiocarbamoyl)gentamicin $C_2$.

B. Treat each of the compounds prepared as described in Example 7B in refluxing aqueous dimethylformamide and isolate and purify each of the resultant products in a manner similar to that described in Example 8A to obtain, respectively:

2''-epi-sulfhydryl-2''-deoxy-3''-N-(N'-methylcarbamoyl)-1,3,2',6'-tetra-N-(N'-methylthiocarbamoyl)gentamicin $C_1$,
2''-epi-sulfhydryl-2''-deoxy-3''-N-(N'-methycarbamoyl)-1,3,2',6'-tetra-N-(N'-methylthiocarbamoyl)gentamicin $C_{1a}$,
2''-epi-sulfhydryl-2''-deoxy-3''-N-(N'-methylcarbamoyl)-1,3,2',6'-tetra-N-(N'-methylthiocarbamoyl)gentamicin $C_{2a}$,
2''-epi-sulfhydryl-2''-deoxy-3''-N-(N'-methylcarbamoyl)-1,3,2',6'-tetra-N-(N'-methylthiocarbamoyl)sisomicin, and
2''-epi-sulfhydryl-2''-deoxy-3''-N-(N'-methylcarbamoyl)-1,3,2',6'-tetra-N-(N'-methylthiocarbamoyl)verdamicin.

EXAMPLE 9

O-Iso-propylidene-2''-O-hydrocarbonsulfonyl-per-N-lower thioalkanoylaminoglycosides A. 3',4'-O-Iso-propylidene-2''-O-methanesulfonyl-1,3,2',6'-3''-penta-N-thioacetyl-antiobiotic JI-20-A In a manner similar to that described in Example 1A, prepare a solution of 3',4'-O-iso-propylidene-1,3,2',6',3''-penta-N-thioacetyl-antibiotic JI-20-A in dry pyridine, then treat the solution with methanesuolfonyl chloride at room temperature. Isolate and purify the resultant product in a manner similar to that described in Example 1A to obtain 3',4'-O-iso-propylidene-2''-O-methanesulfonyl-1,3,2',6',3''-penta-N-thioacetyl-antiobiotic JI-20-A.

B. In the above procedure by substituting for the methanesulfonyl chloride other hydrocarbonsulfonyl halides, e.g. p-toluenesulfonyl chloride, there is obtained the corresponding 2''-O-hydrocarbonsulfonyl ester, e.g. 3',4'-O-iso-propylidene-2''-O-p-toluenesulfonyl-1,3,2',6',3''-penta-N-thioacetyl-antibiotic JI-20-A.

C. In a manner similar to that described in Example 9A, treat each of the following O-iso-propylidene-per-N-thioacetylaminoglycosides with methanesulfonyl chloride in pyridine:

3',4'-O-iso-propylidene-1,3,2',6',3''-penta-N-thioacetylantibiotic JI-20-B, a mixture comprising 2',3'-O-iso-propylidene-1,3,6',3''-tetra-N-thioacetylgentamicin B and 3',4'-O-iso-propylidene-1,3,6',3''-tetra-N-thioacetylgentamicin B, a mixture comprising 2',3'-O-iso-propylidene-1,3,6',3''-tetra-N-thioacetylgentamicin B$_1$ and 3',4'-O-iso-propylidene-1,3,6',3''-tetra-N-thioacetylgentamicin B$_1$, and 4',6'-O-iso-propylidene-1,3,2',3''-tetra-N-thioacetylantibiotic G-418.

Isolate and purify the resultant products in a manner similar to that described in Example 9A to obtain, respectively:

3',4'-O-iso-propylidene-2''-O-methanesulfonyl-1,3,2',6',3''-penta-N-thioacetyl-antibiotic JI-20-B, a mixture comprising 2',3'-O-iso-propylidene-2''-O-methanesulfonyl-1,3,6',3''-tetra-N-thioacetylgentamicin B and 3',4'-O-iso-propylidene-2''-O-methanesulfonyl-1,3,6',3''-tetra-N-thioacetylgentamicin B, a mixture comprising 2',3'-O-iso-propylidene-2''-O-methanesulfonyl-1,3,6',3''-tetra-N-thioacetylgentamicin B$_1$ and 3',4'-O-iso-propylidiene-2''-O-methanesulfonyl-1,3,6',3''-tetra-N-thioacetylgentamicin B$_1$, and 4',6'-O-iso-propylidene-2''-O-methanesulfonyl-1,3,2',3''-tetra-N-thioacetyl-antibiotic G-418.

EXAMPLE 10

2''-Epi-sulfhydryl-2''-deoxy-3''-N-alkanoyl-per-N-thioalkanoylaminoglycosides

A. 2''-Epi-sulfhydryl-2''-deoxy-3''-N-acetyl-1,3,2',6'-tetra-N-thioacetyl-antibiotic JI-20-A Dissolve 2 g. of 3',4'-O-iso-propylidene-2''-O-methanesulfonyl-1,3,2',6',3''-penta-N-thioacetyl-antibiotic JI-20-A in 60 ml. of dimethylformamide-water (95:5) and heat the solution at 100°C for one hour. Evaporate the solvent in vacuo to a residue comprising 3',4'-O-iso-propylidene-2''-epi-sulfhydryl-2''-deoxy-3''-N-acetyl-1,3,2',6'-tetra-N-thioacetyl-antibiotic JI-20-A. Dissolve the foregoing residue in 50% aqueous acetic acid and allow the solution to stand at room temperature for 1 hour. Evaporate the reaction mixture in vacuo to a residue comprising 2''-epi-sulfhydryl-2''-deoxy-3''-N-acetyl-1,3,2',6'-tetra-N-thioacetyl-antibiotic JI-20-A. Further purify by chromatography over silica gel using chloroform-methanol-15% ammonium hydroxide (2:1:1) as eluant, combine the like fractions as determined by thin layer chromatography and distill the combined fractions in vacuo to a residue comprising 2''-epi-sulfhydryl-2''-deoxy-3''-N-acetyl-1,3,2',6'-tetra-N-thioacetyl-antibiotic JI-20-A.

B. The compound of Example 10A is also obtained by the procedure of Example 10A by utilizing as starting compound other 2''-O-hydrocarbonsulfonyl esters, e.g. 3',4'-O-iso-propylidene-2''-O-p-toluenesulfonyl-1,3,2',6',3''-penta-N-thioacetylantibiotic JI-20-A.

C. In a manner similar to that described in Example 10A, treat each of the O-iso-propylidene-2''-O-methanesulfonyl-per-N-thioacetylaminoglycosides prepared in Example 9C with aqueous dimethylformamide at 100°C for 1 hour. Isolate the resultant product in a manner similar to that described to obtain, respectively:

3',4'-O-iso-propylidene-2''-epi-sulfhydryl-2''-deoxy-3''-N-acetyl-1,3,2',6'-tetra-N-thioacetyl-antibiotic JI-20-B, a product mixture comprising 2',3'-O-iso-propylidene-2''-epi-sulfhydryl-2''-deoxy-3''-N-acetyl-1,3,6'-tri-N-thioacetylgentamicin B and 3',4'-O-iso-propylidene-2''-epi-sulfhydryl-2''-deoxy-3''-N-acetyl-1,3,6'-tri-N-thioacetylgentamicin B, a product mixture comprising 2',3'-O-iso-propylidene-2''-epi-sulfhydryl-2''-deoxy-3''-N-acetyl-1,3,6'-tri-N-thioacetylgentamicin B$_1$ and 3',4'-O-iso-propylidene-2''-epi-sulfhydryl-2''-deoxy-3''-N-acetyl-1,3,6'-tri-N-thioacetylgentamicin B$_1$, and 4',6'-O-iso-propylidene-2''-epi-sulfhydryl-2''-deoxy-3''-N-acetyl-1,3,2'-tri-N-thioacetyl-antibiotic G-418.

Treat each of the foregoing ketal intermediates with aqueous acetic acid at room temperature for one hour in the manner described in Example 10A and isolate and purify the resultant products in a manner similar to that described to obtain, respectively:

2''-epi-sulfhydryl-2''-deoxy-3''-N-acetyl-1,3,2',6'-tetra-N-thioacetyl-antibiotic JI-20-B, 2''-epi-sulfhydryl-2''-deoxy-3''-N-acetyl-1,3,6'-tri-N-thioacetylgentamicin B, 2''-epi-sulfhydryl-2''-deoxy-3''-N-acetyl-1,3,6'-tri-N-thioacetylgentamicin B$_1$, and 2''-epi-sulfhydryl-2''-deoxy-3''-N-acetyl-1,3,2'-tri-N-thioacetyl-antibiotic G-418.

EXAMPLE 11

2''-Epi-sulfhydryl-2''-deoxyaminoglycosides

A. 2''-Epi-sulfhydryl-2''-deoxygentamicin C$_2$

1. To 250 mg. of 2''-epi-sulfhydryl-2''-deoxy-3''-N-acetyl-1,3,2',6'-tetra-N-thioacetylgentamicin C$_2$ in 20 ml. of water, add 2.0 ml. of 50% aqueous sodium hydroxide. Heat the mixture at 120°C for 96 hours in a sealed vessel. Lyophilize the solution to a residue comprising 2''-epi-sulfhydryl-2''-deoxygentamicin C$_2$ which is used without further purification in the procedure of Example 12A.

2. In a manner similar to that described in Example 11A (1) treat 2''-epi-sulfhydryl-2''-deoxy-3''-N-(N'- methylcarbamoyl)-1,3,2',6'-tetra-N-(N'-methylthiocarbamoyl)gentamicin $C_2$ with aqueous sodium hydroxide in a sealed tube at 120°C for 96 hours. Isolate and purify the resultant product in a manner similar to that described to obtain 2''-epi-sulfhydryl-2''-deoxygentamicin $C_2$.

B. 1. In a manner similar to that described in Example 11A, treat each of the 2''-epi-sulfhydryl-2''-deoxy-3''-N-alkanoyl-tetra-N-thioalkanoylaminoglycosides prepared as described in Example 6B with aqueous sodium hydroxide at 120°C. Isolate and purify each of the resultant products in a manner similar to that described to obtain, respectively:

2''-epi-sulfhydryl-2''-deoxygentamicin $C_1$,
2''-epi-sulfhydryl-2''-deoxygentamicin $C_{1a}$,
2''-epi-sulfhydryl-2''-deoxygentamicin $C_{2a}$,
2''-epi-sulfhydryl-2''-deoxysisomicin, and
2''-epi-sulfhydryl-2''-deoxyverdamicin.

2. In a similar manner treat each of the 2''-epi-sulfhydryl-2''-deoxy-3''-N-(N'-methylcarbamoyl)-tetra-N-(N'-methylthiocarbamoyl) aminoglycosides prepared as described in Example 8B with aqueous sodium hydroxide at 120°C. Isolate and purify each of the resultant products in a manner similar to that described in Example 11A to obtain the corresponding 2''-epi-sulfhydryl-2''-deoxy derivatives listed in above Example 11B1.

C. In similar manner treat each of 2''-epi-sulfhydryl-2''-deoxy-3''-N-propionyl-1,3,2',6'-tetra-N-thiopropionylgentamicin $C_2$ and 2''-epi-sulfhydryl-2''-deoxy-3''-N-caprylyl-1,3,2',6'-tetra-N-thiocaprylylgentamicin $C_2$ with 50% aqueous sodium hydroxide at 120°C for 96 hours to obtain 2''-epi-sulfhydryl-2''-deoxygentamicin $C_2$.

D. In a manner similar to that described in Example 11A, treat each of the 2''-epi-sulfhydryl-2''-deoxy-3''-N-alkanoyl-per-N-thioalkanoylaminoglycosides prepared as described in Examples 10A and 10C with sodium hydroxide at 120°C. Isolate and purify each of the resultant products in a manner similar to that described in Example 11A to obtain, respectively:

2''-epi-sulfhydryl-2''-deoxy-antibiotic JI-20-A,
2''-epi-sulfhydryl-2''-deoxy-antibiotic JI-20-B,
2''-epi-sulfhydryl-2''-deoxygentamicin B,
2''-epi-sulfhydryl-2''-deoxygentamicin $B_1$, and
2''-epi-sulfhydryl-2''-deoxy-antibiotic G-418.

EXAMPLE 12

2''-Deoxyaminoglycosides Derived from the 2''-Epi-sulfhydryl-2''-deoxy Derivatives Thereof A. 2''-Deoxygentamicin $C_2$ Dissolve 2''-epi-sulfhydryl-2''-deoxygentamicin $C_2$ in ethanol, add 20 times its weight of Raney Nickel, and stir at room temperature until thin layer chromatographic analysis of an aliquot indicates the starting compound has disappeared. Filter off the Raney Nickel, wash the Raney Nickel thoroughly with ethanol, then with water, and evaporate the combined filtrate and washings in vacuo to a residue. Chromatograph the residue over 50 times its weight of silica gel, eluting with the lower layer of a 2:1:1 mixture of a chloroform-methanol-15% ammonium hydroxide. Combine the like fractions as determined by thin layer chromatography and evaporate the combined fractions in vacuo to a residue comprising 2''-deoxygentamicin $C_2$; n.m.r. $\delta$ 5.2 (1H, doublet, J=3.5Hz, anomeric proton), $\delta$ 4.9 (1H, quartet, J=3.5 and 1.5Hz, anomeric proton), $\delta$ 3.2 (3H, singlet, N—$CH_3$), $\delta$1.2 (3H, doublet, J=7Hz, CH—$CH_3$), $\delta$1.1 (3H, singlet, C—$CH_3$); mass spectrum, m/e 448 [(M + 1)$^+$], 333, 305, 287, 191, 173, 163, 145, 144, 143.

B. Treat each of the 2''-epi-sulfhydryl-2''-deoxyaminoglycosides prepared as described in Example 11B with Raney Nickel in ethanol at room temperature in the manner of Example 12A. Isolate and purify each of the resultant products in a manner similar to that described to obtain, respectively:

2''-deoxygentamicin $C_1$,
2''-deoxygentamicin $C_{1a}$,
2''-deoxygentamicin $C_{2a}$,
2''-deoxysisomicin, and
2''-deoxyverdamicin.

C. In a manner similar to that described in Example 12A, treat each of the 2''-epi-sulfhydryl-2''-deoxyaminoglycosides prepared in Example 11D with Raney Nickel in methanol at room temperature. Isolate and purify each of the resultant products in a manner similar to that described to obtain, respectively:

2''-deoxy'antibiotic JI-20-A,
2''-deoxy'antibiotic JI-20-B,
2''-deoxygentamicin B,
2''-deoxygentamicin $B_1$, and
2''-deoxy-antibiotic G-418.

EXAMPLE 13

2''-O-Methanesulfonyl-per-N-carbobenzyloxyaminoglycosides

1. In a manner similar to that described in Example 1A, treat each of the following per -N-carbobenzyloxyaminoglycosides with methanesulfonyl chloride in dry pyridine:

1,3,2',6',3''-penta-N-carbobenzyloxygentamaicin $C_1$,
1,3,2',6',3''-penta-N-carbobenzyloxygentamicin $C_{1a}$,
1,3,2',6',3''-penta-N-carbobenzyloxygentamicin $C_2$,
1,3,2',6',3''-penta-N-carbobenzyloxygentamicin $C_{2a}$,
1,3,2',6',3''-penta-N-carbobenzyloxysisomicin,
1,3,2',6',3''-penta-N-carbobenzyloxyverdamicin.
4'',6''-O-iso-propylidene-1,3,2',6',3''-penta-N-carbobenzyloxytobramycin,
4'',6''-O-iso-propylidene-1,3,2',6',3''-penta-N-carbobenzyloxy-3',4'-dideoxykanamycin B,
4',6'-O-iso-propylidene-1,3,2',3''-tetra-N-carbobenzyloxygentamicin A,
4',6',-O-iso-propylidene-1,3,2',3''-tetra-N-carbobenzyloxygentamicin $X_2$,
3',4'-O-iso-propylidene-1,3,2',6',3''-penta-N-carbobenzyloxy antibiotic JI-20-A,
3',4'-O-iso-propylidene-1,3,2',6',3''-penta-N-carbobenzyloxy antibiotic JI-20-B,
4',6'-O-iso-propylidene-1,3,2',3''-tetra-N-carbobenzyloxy antibiotic G-418,
a mixture comprising 2',3'-O-iso-propylidene (and 3',4'-O-iso-propylidene)-1,3,6',3''-tetra-N-carbobenzyloxygentamicin B, and
a mixture comprising 2',3'-O-iso-propylidene (and 3',4'-O-iso-propylidene)-1,3,6',3''-tetra-N-carbobenzyloxygentamicin $B_1$.

Isolate and purify each of the resultant products in a manner similar to that described in Example 1A to obtain, respectively:

2''-O-methanesulfonyl-1,3,2',6',3''-penta-N-carbobenzyloxygentamicin $C_1$,

2''-O-methanesulfonyl-1,3,2',6',3''-penta-N-carbobenzyloxygentamicin $C_{1a}$,
2''-O-methanesulfonyl-1,3,2',6',3''-penta-N-carbobenzyloxygentamicin $C_2$,
2''-O-methanesulfonyl-1,3,2',6',3''-penta-N-carbobenzyloxygentamicin $C_{2a}$,
2''-O-methanesulfonyl-1,3,2',6',3''-penta-N-carbobenzyloxysisomicin,
2''-O-methanesulfonyl-1,3,2',6',3''-penta-N-carbobenzyloxyverdamicin,
2''-O-methanesulfonyl-4''',6''-O-iso-propylidiene-1,3,2',6',3''-penta-N-carbobenzyloxytobramycin,
2''-O-methanesulfonyl-4''',6''-O-iso-propylidiene-1,3,2',6',3''-penta-N-carbobenzyloxy-3',4'-dideoxykanamycin B,
2''-O-methanesulfonyl-4',6'-O-iso-propylidene-1,3,2',3''-tetra-N-carbobenzyloxygentamicin A,
2''O-methanesulfonyl-4',6'-O-iso-propylidene-1,3,2',3''-tetra-N-carbobenzyloxygentamicin $X_2$,
2''-O-methanesulfonyl-3',4'-O-iso-propylidene-1,3,2',6',3''-penta-N-carbobenzyloxy-antibiotic JI-20-A
2''-O-methanesfulonyl-3',4'-O-iso-propylidene1,3,2',6',3''-penta-N-carbobenzyloxy-antibiotic JI-20-B,
2''-O-methanesulfonyl14',6'-O-iso-propylidene-1,3,2',3''-tetra-N-carbobenzyloxy-antibiotic G-418,
a mixture comprising 2''-O-methanesulfonyl12',3'-O-iso-propylidene (and 3',4'-O-iso-propylidene)-1,3,6',3''-tetra-N-carbobenzyloxygentamicin B, and
a mixture comprising 2''-O-methanesulfonyl-2',3'-O-iso-propylidene (and 3',4'-O-iso-propylidene)-1,3,6',3''-tetra-N-carbobenzyloxygentamicin $B_1$.

2. In the procedure of Example 13-1, by using as starting compounds an equivalent quantity of O-benzylidene derivatives corresponding to the above-identified O-iso-propylidene starting compounds, there is obtained the corresponding 2''-O-methanesulfonyl-O-benzylidene intermediates, e.g. treatment of 4''',6''-O-benzylidene-1,3,2',6',3''-penta-N-carbobenzyloxytobramycin with methanesulfonyl chloride inpyridine yields 2''-O-methanesulfonyl14''',6''-O-benzylidene-1,3,2',6',3''-penta-N-carbobenzyloxytobramycin.

EXAMPLE 14

Alternate Procedure of Converting the 2''-Epi-sulfhydryl-2''-deoxyper-N-substituted-Aminoglycosides to the corresponding 2''-deoxyaminoglycosides A. 2''-Epi-benzylthio-2''-deoxy-3''-N-acetylgentamicin $C_2$ 1. Dissolve 2''-epi-sulfhydryl-2''-deoxy-3''-N-acetyl-1,3,2',6'-tetra-N-thioacetylgentamicin $C_2$ (0.769 g., lmM.) in dry chloroform and add a solution of benzyl bromide (1.03 g., 6mM.) in 10 ml. of dry chloroform. Allow the reaction mixture to stand at room temperature for 4 hours. Separate by filtration the resultant precipitate of the S-benzyl salt, i.e. of 2''-epi-benzylthio-2''-deoxy-3''-N-acetyl-1,3,2',6'-tetra-N-(S-benzylthioacetyl) gentamicin $C_2$ tetrabromide which is used without further purification in the following reaction step.

2. Suspend the S-benzyl salt prepared in the foregoing procedure 14A1 in 200 ml. of ethanol. Cool the solution to about 0°C and pass hydrogen sulfide through the cooled, stirred suspension for 2 hours. Stop the passage of hydrogen sulfide and continue stirring the suspension at room temperature for 18 hours. Add Amberlite IR-401S resin (hydroxide form) until the reaction solution is alkaline, then filter off the resin. Evaporate the filtrate in vacuo to a residue comprising 2''-epi-benzylthio-2''-deoxy-3''-N-acetylgentamicin $C_2$ which can be used without further purification in procedure 14B immediately following.

B. 3''-N-Acetyl-2''-Deoxygentamicin $C_2$

Dissolve 2''-epi-benzylthio-2''-deoxy-3''-N-acetylgentamicin $C_2$ (prepared as described in Example 14A) in ethanol, add 20 times its weight of Raney Nickel. Stir at room temperature until thin layer chromotographic analysis of an aliquot indicates no starting compound is present. Filter the reaction mixture and wash the residue well with ethanol followed by water. Evaporate the combined filtrate and washings in vacuo to a residue comprising 3''-N-acetyl-2''-deoxygentamicin $C_2$ which can be used without further purification in Example 14C immediately following.

C. 2''-Deoxygentamicin $C_2$

1. Dissolve the 3''-N-acetyl-2''-deoxygentamicin $C_2$ (prepared as described in Example 14B) in 10 ml. of water, add 2 ml. of 50% aqueous sodium hydroxide solution and heat the mixture in a sealed container at 100°C for 42 hours. Lyophilize the reaction mixture and dissolve the resultant residue in the lower phase of a 2:1:1 chloroform-methanol-concentrated ammonium hydroxide solvent system and apply the resulting solution to a column of silica gel (20 g.), eluting with the lower phase of a 2:1:1 chloroform-methanol-concentrated ammonium hydroxide solvent system. Combine the like, appropriate fractions as determined by thin layer chromatography and distill the combined eluates in vacuo to a residue comprising 2''-deoxygentamicin $C_2$.

2. Alternatively, heat a solution of the 3''-N-acetyl-2''-deoxygentamicin $C_2$ (obtained as described in Example 14B) in hydrazine hydrate for 6 hours at 140°C. Isolate and purify the resultant product in a manner similar to that described in procedure 14C1 hereinabove to obtain 2''-deoxygentamicin $C_2$.

D. 1. Treat each of the 2''-epi-sulfhydryl-2''-deoxy-3''-N-acetyl-per-N-thioacetylaminoglycosides of Example 6B with benzyl bromide in the manner described in Example 14A1 followed by treatment of the corresponding 2''-epi-benzylthio-2''-deoxy-3''-N-acetyl-1,3,2',6'-tetra-N-(S-benzylthioacetyl) aminoglycoside tetrabromide intermediates produced thereby with hydrogen sulfide in ethanol in the manner of Example 14A2 to obtain, respectively:

2''-epi-benzylthio-2''-deoxy-3''-N-acetylgentamicin $C_1$,
2''-epi-benzylthio-2''-deoxy-3''-N-acetylgentamicin $C_{1a}$,
2''-epi-benzylthio-2''-deoxy-3''-N-acetylgentamicin $C_{2a}$,
2''-epi-benzylthio-2''-deoxy-3''-N-acetylsisomicin, and
2''-epi-benzylthio-2''-deoxy-3''-N-acetylverdamicin.

2. Treat each of the foregoing intermediates prepared in Example 14D1 with Raney Nickel in ethanol at room temperature in the manner of Example 14B to obtain, respectively:

3''-N-acetyl-2''-deoxygentamicin $C_1$,
3''-N-acetyl-2''-deoxygentamicin $C_{1a}$,
3''-N-acetyl-2''-deoxygentamicin $C_{2a}$, 3''-N-acetyl-2''-deoxysisomicin, and
3''-N-acetyl-2''-deoxyverdamicin.

3. Treat each of the 3''-N-acetyl-2''-deoxyaminoglycosides prepared as described in Example 14D2 with either aqueous sodium hydroxide in the manner described in Example 14C1 or with hydrazine hydrate in the manner described in Example 14C2 to obtain the corresponding 2''-deoxyaminoglycosides, e.g.

2''-deoxygentamicin $C_1$,
2''-deoxygentamicin $C_{1a}$,
2''-deoxygentamicin $C_{2a}$,
2''-deoxysisomicin, and
2''-deoxyverdamicin.

EXAMPLE 15

Preparation of 2''-Deoxyaminoglycosides from Aminoglycosides Containing Vicinal Hydroxyl Groups and with Per-N-methylthiocarbamoyl Protecting Groups A. O-Iso-propylidene-2''-O-methanesulfonyl-per-N-(N'-methylthiocarbamoyl)aminoglycosides In a manner similar to that described in Example 1A, treat each of the following O-iso-propylidene-per-N-(N'-methylthiocarbamoyl)aminoglycosides with methanesulfonyl chloride in pyridine:

3',4'-O-iso-propylidene-1,3,2',6',3''-penta-N-(N'-methylthiocarbamoyl)-antibiotic JI-20-A,
3',4'-O-iso-propylidene-1,3,2',6',3''-penta-N-(N'-methylthiocarbamoyl)-antibiotic JI-20-B,
a mixture comprising 2',3'(and 3',4')-O-iso-propylidene-1,3,6',3''-tetra-N-(N'-methylthiocarbamoyl)gentamicin B,
a mixture comprising 2',3'(and 3',4')-O-iso-propylidene-1,3,6',3''-tetra-N-(N'-methylthiocarbamoyl)gentamicin $B_1$,
4',6'-O-iso-propylidene-1,3,2',3''-tetra-N-(N'-methylthiocarbamoyl)-antibiotic G-418.
4',6'-O-iso-propylidene-1,3,2',3''-tetra-N-(N'-methylthiocarbamoyl)gentamicin A, and
4',6'-O-iso-propylidene-1,3,2',3''-tetra-N-(N'-methylthiocarbamoyl)gentamicin $X_2$.

Isolate and purify each of the resultant products in a manner similar to that described in Example 1A to obtain, respectively:

3',4'-O-iso-propylidene-2''-O-methanesulfonyl-1,3,2',6',3''-penta-N-(N'-methylthiocarbamoyl)-antibiotic JI-20-A,
3',4'-O-iso-propylidene-2''-O-methanesulfonyl-1,3,2',6',3''-penta-N-(N'-methylthiocarbamoyl)-antibiotic JI-20-B,
a mixture comprising 2',3'(and 3',4')-O-iso-propylidene-2''-O-methanesulfonyl-1,3,6',3''-tetra-N-(N'-methylthiocarbamoyl) gentamicin B,
a mixture comprising 2',3'(and 3',4')-O-iso-propylidene-2''-O-methanesulfonyl-1,3,6',3''-tetra-N-(N'-methylthiocarbamoyl)gentamicin $B_1$,
4',6'-O-iso-propylidene-2''-O-methanesulfonyl-1,3,2',3''-tetra-N-(N'-methylthiocarbamoyl)-antibiotic G-418,
4',6'-O-iso-propylidene-2''-O-methanesulfonyl-1,3,2',3''-tetra-N-(N'-methylthiocarbamoyl)gentamicin A, and
4',6'-O-iso-propylidene-2''-O-methanesulfonyl-1,3,2',3''-tetra-N-(N'-methylthiocarbamoyl)gentamicin $X_2$.

B. 2''-Epi-sulfhydryl-2''-deoxy-3''-N-(N'-methylcarbamoyl)-per-N-(N'-methylthiocarbamoyl)aminoglycosides 1. In a manner similar to that described in Example 10A, treat each of the O-iso-propylidene-2''-O-methanesulfonyl derivatives of Example 15A with aqueous dimethylformamide at 100°C for 1 hour to obtain the corresponding intermediary O-iso-propylidene-2''-epi-sulfhydryl-2''-deoxy derivatives, e.g.

3',4'-O-iso-propylidene-2''-epi-sulfhydryl-2''-deoxy-3''-N-(N'-methylcarbamoyl)-1,3,2',6'-tetra-N-(N'-methylthiocarbamoyl)antibiotic JI-20-A,
3',4'-O-iso-propylidene-2''-epi-sulfhydryl-2''-deoxy-3''-N-(N'-methylcarbamoyl)-1,3,2',6'-tetra-N-(N'-methylthiocarbamoyl)antibiotic JI-20-B,
a mixture comprising 2',3'(and 3',4')-O-iso-propylidene-2''-epi-sulfhydryl-2''-deoxy-3''-N-(N'-methylcarbamoyl)-1,3,6'-tri-N-(N'-methylthiocarbamoyl)gentamicin B,
a mixture comprising 2',3'(and 3',4')-O-iso-propylidene-2''-epi-sulfhydryl-2''-deoxy-3''-N-(N'-methylcarbamoyl)-1,3,6'-tri-N-(N'-methylthiocarbamoyl)gentamicin $B_1$,
4',6'-O-iso-propylidene-2''-epi-sulfhydryl-2''-deoxy-3''-N-(N'-methylcarbamoyl)-1,3,2'-tri-N-(N'-methylthiocarbamoyl)antibiotic G-418,
4',6'-O-iso-propylidene-2''-epi-sulfhydryl-2''-deoxy-3''-N-(N'-methylcarbamoyl)-1,3,2'-tri-N-(N'-methylthiocarbamoyl)gentamicin A, and
4',6'-O-iso-propylidene-2''-epi-sulfhydryl-2''-deoxy-3''-N-(N'-methylcarbamoyl)-1,3,2'-tri-N-(N'-methylthiocarbamoyl)gentamicin $X_2$.

2. In a manner similar to that described in Example 10A, treat each of the foregoing intermediary O-iso-propylidene derivatives with 50% aqueous acetic acid at room temperature for 1 hour. Isolate and purify each of the resultant products in a manner similar to that described in Example 10A to obtain, respectively:

2''-epi-sulfhydryl-2''-deoxy-3''-N-(N'-methylcarbamoyl)-1,3,2',6'-tetra-N-(N'-methylthiocarbamoyl)-antibiotic JI-20-A,
2''-epi-sulfhydryl-2''-deoxy-3''-N-(N'-methylcarbamoyl)-1,3,2',6'-tetra-N-(N'-methylthiocarbamoyl)-antibiotic JI-20-B,
2''-epi-sulfhydryl-2''-deoxy-3''-N-(N'-methylcarbamoyl)-1,3,6'-tri-N-(N'-methylthiocarbamoyl)-gentamicin B,
2''-epi-sulfhydryl-2''-deoxy-3''-N-(N'-methylcarbamoyl)-1,3,6'-tri-N-(N'-methylthiocarbamoyl)-gentamicin $B_1$,
2''-epi-sulfhydryl-2''-deoxy-3''-N-(N'-methylcarbamoyl)-1,3,2'-tri-N-(N'-methylthiocarbamoyl)-antibiotic G-418,
2''-epi-sulfhydryl-2''-deoxy-3''-N-(N'-methylcarbamoyl)-1,3,2'-tri-N-(N'-methylthiocarbamoyl)-gentamicin A, and
2''-epi-sulfhydryl-2''-deoxy-3''-N-(N'-methylcarbamoyl)-1,3,2'-tri-N-(N'-methylthiocarbamoyl)-gentamicin $X_2$.

C. 2''-Epi-sulfhydryl-2''-deoxyaminoglycosides

In a manner similar to that described in Example 11A, treat each of the 2''-epi-sulfhydryl-2''-deoxy-3''-N-(N'-methylcarbamoyl)-per-N-(N''-methylthiocarbamoyl)aminoglycosides prepared as described in Example 15B with aqueous sodium hydroxide at 120°C for 96 hours. Isolate and purify the resultant products in a manner similar to that described to obtain, respectively:

2''-epi-sulfhydryl-2''-deoxy-antibiotic JI-20-A,
2''-epi-sulfhydryl-2''-deoxy-antibiotic JI-20-B,
2''-epi-sulfhydryl-2''-deoxygentamicin B,
2''-epi-sulfhydryl-2''-deoxygentamicin $B_1$,
2''-epi-sulfhydryl-2''-deoxy-antibiotic G-418,
2''-epi-sulfhydryl-2''-deoxygentamicin A, and
2''-epi-sulfhydryl-2''-deoxygentamicin $X_2$.

D. 2''-Deoxyaminoglycosides Having Vicinal Hydroxyl Groups

In a manner similar to that described in Example 12A, treat each of the 2''-epi-sulfhydryl-2''-deoxyaminoglycosides prepared as described in Example 15C with Raney Nickel in alcohol at room temperature until no starting material is present as determined by thin-layer chromatography. Isolate and purify the resultant products in a manner similar to that described to obtain, respectively:

2''-deoxy-antibiotic JI-20-A,
2''-deoxy-antibiotic JI-20-B,
2''-deoxygentamicin B,
2''-deoxygentamicin $B_1$,
2''-deoxy-antibiotic G-418,
2''-deoxygentamicin A, and
2''-deoxygentamicin $X_2$.

EXAMPLE 16

Preparation of 2''-Deoxyaminoglycosides Having Primary Hydroxyl Groups: 2''-Deoxytrobramycin, 3',4',2''-Trideoxykanamycin B, 2''-Deoxygentamicin A, and 2''-Deoxygentamicin $X_2$ A. 2'',6''-Di-O-methanesulfonyl-1,3,2',6',3''-penta-N-thioacetyltobramycin and 2'',6''-Di-O-methanesulfonyl-1,3,2',6',3''-penta-N-thioacetyl-3',4'-dideoxykanamycin B 1. Dissolve 1,3,2',6',3''-penta-N-thioacetyltobramycin (7.41 g.) in dry pyridine (75 ml). Distill the pyridine in vacuo, then repeat this procedure twice more with 75 ml. portions of dry pyridine to thoroughly dry the penta-N-thioacetyl derivative. Then dissolve the dried thioacetyl derivative in 35 ml. of dry pyridine, add 4 g. of methanesulfonyl chloride, and allow the reaction mixture to stand at room temperature for 3 hours. Add 50 ml. of methanol and evaporate the solution in vacuo to a residue comprising 2'',6''-di-O-methanesulfonyl-1,3,2',6',3''-penta-N-thioacetyltobramycin. Purify by chromatographing over silica gel, eluting with the lower phase of a 2:1:1 chloroform-methanol-15% ammonium hydroxide mixture. Combine the fractions containing the 2'',6''-di-O-methanesulfonate derivative as determined by thin layer chromatography, then distill the combined eluates in vacuo to a residue comprising purified 2'',6''-di-O-methanesulfonyl-1,3,2',6',3''-penta-N-thioacetyltobramycin.

Alternatively, the 2'',6''-di-O-methanesulfonate is purified by chromatography on a column of Dowex 50W × 2 [$(C_2H_5)_3$ $NH^+$], eluting with a gradient of ethanol in water. Combine the eluates containing the 2'',6''-di-O-methanesulfonate and evaporate the combined eluates in vacuo to a residue comprising 2'',6''-di-O-methanelsulfonyl-1,3,2',6',3''-penta-N-thioacetyltobramycin.

2. In a manner similar to that described in Example 16A1, treat 1,3,2',6',3''-penta-N-thioacetyl-3',4'-dideoxykanamycin B in dry pyridine with methanesulfonyl chloride (3 moles per mole of aminoglycoside derivative). Isolate and purify the resultant product in a manner similar to that described to obtain 2'',6''-di-O-methanesulfonyl-1,3,2',6',3''-penta-N-thioacetyl-3',-4'-dideoxykanamycin B.

3. In a manner similar to that described in Examples 16A1 and 16A2, treat each of 1,3,2',6',3''-penta-N-(N'-methylthiocarbamoyl)tobramycin and 1,3,2',6',-3''-penta-N-(N'-methylthiocarbamoyl)-3',4'-dideoxykanamycin B with 3.5 moles of methanesulfonyl chloride per mole of aminoglycoside to obtain the corresponding 2'',6''-di-O-methanesulfonate derivatives.

4. In the procedures of Examples 16A1, 16A2, and 16A3, by substituting an equivalent quantity of p-toluenesulfonyl chloride for methanesulfonyl chloride, there is obtained the corresponding 2'',6''-di-O-p-toluenesulfonate intermediates.

B. 6',2''-Di-O-methanesulfonyl-1,3,2',3''-tetra-N-thioacetylgentamicin A and 6',2''-Di-O-methanesulfonyl-1,3,2',3''-tetra-N-thioacetylgentamicin $X_2$ 1. In a manner similar to that described in Example 16A1, treat each of 1,3,2',3''-tetra-N-thioacetylgentamicin A and 1,3,2',3''-tetra-N-thioacetylgentamicin $X_2$ with methanesulfonyl chloride in dry pyridine. Isolate and purify each of the respective products in a manner similar to that described in Example 16A1 to obtain, respectively: 6',2''-di-O-methanesulfonyl-1,3,2',3''-tetra-N-thioacetylgentamicin A and 6',2''-di-O-methanesulfonyl-1,3,2',3''-tetra-N-thioacetylgentamicin $X_2$.

2. In a manner similar to that described in Example 16B1, treat each of 1,3,2',3''-tetra-N-(N'-methylthiocarbamoyl)gentamicin A and 1,3,2',3''-tetra-N-(N''-methylthiocarbamoyl)gentamicin $X_2$ with methanesulfonyl chloride in dry pyridine to obtain the corresponding 6',2''-di-O-methanesulfonate derivatives.

3. In the procedures of Examples 16B1 and 16B2 by substituting p-toluenesulfonyl chloride for methanesulfonyl chloride, there is obtained the corresponding 6',-2''-di-O-p-toluenesulfonates of the compounds of Examples 16B1 and 16B2.

C. 2''-Epi-sulfhydryl-2''-deoxy-3''-N-acetyl-per-N-thioacetyl Derivatives of Tobramycin, 3',4'-Dideoxykanamycin B, Gentamicin A, and Gentamicin $X_2$ 1. Add 5 g. of sodium acetate to 75 ml. of 10% aqueous dimethylformamide, then add 5 g. of 2'',6''-di-O-methanesulfonyl-1,3,2',6',3''-penta-N-thioacetyltobramycin. Heat the reaction solution at reflux temperature for 8 hours. Cool the reaction mixture, filter, and distill the filtrate in vacuo to a residue. Dissolve the residue in 20 ml. of water and add the aqueous solution to a column containing 500 g. of G-10 Sephadex. Elute with water, combine the like eluates as determined by thin layer chromatography, and evaporate the combined eluates in vacuo to a residue comprising 2''-epi-sulfhydryl-2''-deoxy-3''-N-acetyl-1,3,2',6'-tetra-N-thioacetyltobramycin which is used without further purification in the procedure of Example 16D1.

2. In a manner similar to that described in above Example 16C1, treat each of the following 2''-O-methanesulfonylaminoglycosides with aqueous dimethylformamide and sodium acetate:

2'',6''-di-O-methanesulfonyl-1,3,2',6',3''-penta-N-thioacetyl-3',4'-dideoxykanamycin B,
6',2''-di-O-methanesulfonyl-1,3,2',3''-tetra-N-thioacetylgentamicin A, and
6',2''-di-O-methanesulfonyl-1,3,2',3''-tetra-N-thioacetylgentamicin $X_2$.

Isolate and purify each of the resultant products in a manner similar to that described in Example 16A1 to obtain, respectively:

2''-epi-sulfhydryl-3''-N-acetyl-1,3,2',6'-tetra-N-thioacetyl-3',4',2'''-trideoxykanamycin B, 2''-epi-sulfhydryl-2''-deoxy-3''-N-acetyl-1,3,2'-tri-N-thioacetylgentamicin A, and 2''-epi-sulfhydryl-2''-deoxy-3''-N-acetyl-1,3,2'-tri-N-thioacetylgentamicin X$_2$.

3. In a manner similar to that described in Examples 16C1 and 16C2, treat each of 2'',6''-di-O-methanesulfonyl-1,3,2',6',3''-penta-N-(N'-methylthiocarbamoyl)-tobramycin and 2'',6''-di-O-methanesulfonyl-1,3,2',6',3''-penta-N-(N'-methylthiocarbamoyl)-3',4'-dideoxykanamycin B with aqueous dimethylformamide and sodium acetate to obtain, respectively: 2''-epi-sulfhydryl-2''-deoxy-3''-N-(N'-methylcarbamoyl)-1,3,2',6'-tetra-N-(N'-methylthiocarbamoyl) tobramycin and 2''-epi-sulfhydryl-3''-N-(N'-methylcarbamoyl)-1,3,2',6'-tetra-N-(N'-methylthiocarbamoyl)-3',4',2'''-trideoxykanamycin B.

4. In the procedures of above Examples 16C1, 16C2 and 16C3, by substituting an equivalent quantity of the corresponding di-O-p-toluenesulfonyl derivative for the di-O-methanesulfonyl starting compound, there is obtained the corresponding 2''-epi-sulfhydryl-2''-deoxy-per-N-substituted-aminoglycoside.

5. Alternatively, the 2''-epi-sulfhydryl-2''-deoxy-3''-N-acetyl-per-N-thioacetyl derivatives of gentamicin A and of gentamicin X$_2$ are prepared as follows. Treat each of 4',6'-O-iso-propylidene-1,3,2',3''-tetra-N-thioacetylgentamicin A and 4',6'-O-iso-propylidene-1,3,2',3''-tetra-N-thioacetylgentamicin X$_2$ with methanesulfonyl chloride in dry pyridine in the manner described in Example 1A followed by treatment of the thereby formed 2''-O-methanesulfonyl-4',6'-O-iso-propylidene-1,3,2',3''-tetra-N-thioacetylgentamicin A and 2''-O-methanesulfonyl-4',6'-O-iso-propylidene-1,3,2',3''-tetra-N-thioacetylgentamicin X$_2$, respectively, with aqueous dimethylformamide at reflux temperature followed by treatment of the resulting corresponding 2''-epi-sulfhydryl-2''-deoxy-4',6'-O-iso-propylidene-3''-N-acetyl-per-N-thioacetyl intermediate with aqueous acetic acid at room temperature in a manner similar to that described in Example 10A whereby is obtained, respectively: 2''-epi-sulfhydryl-2''-deoxy-3''-N-acetyl-1,3,2'-tri-N-thioacetylgentamicin A and 2''-epi-sulfhydryl-2''-deoxy-3''-N-acetyl-1,3,2'-tri-N-thioacetylgentamicin X$_2$. Similiarly, treat each of 4'',6''-O-iso-propylidene-1,3,2',6',3''-penta-N-thioacetyltobramycin and 4'',6''-O-iso-propylidene-1,3,2',6',3''-penta-N-thioacetyl-3',4'-dideoxykanamycin B with methanesulfonyl chloride in dry pyridine followed by treatment of the thereby formed 2''-O-methanesulfonyl-4'',6''-O-iso-propylidene-1,3,2',6',3''-penta-N-thioacetyltobramycin and 2''-O-methanesulfonyl-4'',6''-O-iso-propylidene-1,3,2',6',3''-penta-N-thioacetyl-3',4'-dideoxykanamycin B respectively with aqueous dimethylformamide at reflux temperature followed by treatment of the resultant corresponding 2''-epi-sulfhydryl-2''-deoxy-4'',6''-O-iso-propylidene -3''-N-acetyl-1,3,2',6'-tetra-N-thioacetyl intermediate with aqueous acetic acid at room temperature whereby is obtained respectively:

2''-epi-sulfhydryl-2''-deoxy-3''-N-acetyl, 1,3,2',6'-tetra-N-thioacetyltobramycin, and 2''-epi-sulfhydryl-2''-deoxy-3''-N-acetyl-1,3,2',6'-tetra-N-thioacetyl -3',4'-dideoxykanamycin B.

D. 2''-epi-sulfhydryl-2''-deoxytobramycin; 2''-epi-sulfhydryl-3',4',2'''-trideoxykanamycin B; 2''-epi-sulfhydryl-2''-deoxygentamicin A; and 2'-epi-sulfhydryl-2'-deoxygentamicin X$_2$ 1. In a manner similar to that described in Example 11A, treat each of the 2''-epi-sulfhydryl-2''-deoxy-3''-N-acetyl-per-N-thioacetylaminoglycosides prepared in Examples 16C(1) and 16C(2) with aqueous sodium hydroxide in a sealed vessel at 120°C. Isolate and purify the resultant products in a manner similar to that described to obtain respectively:

2''-epi-sulfhydryl-2''-deoxytobramycin,

2''-epi-sulfhydryl-3',4',2'''-trideoxykanamycin B,

2''-epi-sulfhydryl-2''-deoxygentamicin A, and

2''-epi-sulfhydryl-2''-deoxygentamicin X$_2$

2. In a manner similar to that described in 16D(1), treat the 2''-epi-sulfhydryl-2''-deoxy-3''-N-(N'-methylcarbamoyl)-per-N-(N'-methylthiocarbamoyl) derivatives of tobramycin, 3',4'-dideoxykanamycin B, gentamicin A and gentamicin X$_2$ (compounds of Example 16C3) with aqueous sodium hydroxide at 120°C and there is obtained the title compounds of this example.

E. 2''-deoxytobramycin, 3',4',2'''-trideoxykanamycin B, 2''-deoxygentamicin A and 2''-deoxygentamicin X$_2$ In a menner similar to that described in Example 12A, treat each of the compounds prepared as described in Example 16D(1) with Raney Nickel in ethanol at room temperature until no further starting compound remains in the reaction mixture as determined by thin-layer chromatographic analysis. Isolate and purify each of the resultant products in a manner similar to that described in Example 12A to obtain respectively:

2''-deoxytobramycin,

3',4',2'''-trideoxykanamycin B,

2''-deoxygentamicin A, and

2''-deoxygentamicin X$_2$.

EXAMPLE 17

Alternate method of preparing 2''-deoxyaminoglycosides having primary hydroxy groups via intermediates having primary triphenylmethyl protecting groups A. 2''-O-Methanesulfonyl-6''-O-triphenylmethyl-1,3,2',6',3''-penta-N-thioacetyl(or N-methylthiocarbamoyl)tobramycin 1. Dissolve 7.5 g. of 1,3,2',6',3''-penta-N-thioacetyltobramycin in 100 ml. of dry pyridine. Evaporate the pyridine to remove any traces of water then repeat this process. Dissolve the dried residue in 75 ml. of pyridine and at room temperature add 3.0 g. of triphenylmethyl chloride. Shake the mixture until all the triphenylmethyl chloride has dissolved and then allow the reaction mixture to stand at room temperature for 5 days. To the resulting solution of 6''-O-triphenylmethyl-1,3,2',6',3''-penta-N-thioacetyltobramycin add 1.75 g. of methanesulfonyl chloride and allow the mixture to stand an additional 24 hours. Evaporate the pyridine in vacuo to a residue comprising 2''-O-methanesulfonyl-6''-O-triphenylmethyl-1,3,2',6',3''-penta-N-thioacetyltobramycin which is used without further purification in procedure 17E(1)

2. In similar manner treat 1,3,2',6',3''-penta-N-(N'-methylthiocarbamoyl)tobromycin with triphenylmethyl chloride in pyridine followed by treatment of the resulting 6''-O-triphenylmethyl ether derivative with methylsulfonyl chloride in pyridine to obtain 2''-O-methylsulfonyl-6''-O-triphenylmethyl-1,3,2',6',-

3''-penta-N-(N'-methylthiocarbamoyl)tobramycin.

B. 2''-O-Methanesulfonyl-6''-O-triphenylmethyl-1,3,2',6',3''-penta-N-thioacetyl(or N'-methylthiocarbamoyl)-3',4'-dideoxykanamycin B 1. In a manner similar to that described in Example 17A1 treat each of 1,3,2',6',3''-penta-N-thioacetyl-3',-3'-dideoxy kanamycin B and 1,3,2',6',3''-penta-N-(N'-methylthiocarbamoyl)-3',4'-dideoxykanamycin B with triphenylmethyl chloride in dry pyridine followed by treatment of the resultant respective 6''-O-triphenylmethyl ether derivatives thereof with methanesulfonylchloride in dry pyridine to obtain, respectively, 2''-O-methanesulfonyl-6''-O-triphenylmethyl-1,3,2',-6',3''-penta-N-thioacetyl-3',4'-dideoxykanamycin B and 2''-O-methanesulfonyl-6''-O-triphenylmethyl-1,3,2', 6',3''-penta-N-(N'-methylthiocarbamoyl)-3',-4'-dideoxykanamycin B.

C. 6'-O-Triphenylmethyl-2''-O-methanesulfonyl-1,3,2',3''-tetra-N-thioacetyl(or N''-methylthiocarbamoyl)gentamicin A In a manner similar to that described in Example 17A1 treat each of 1,3,2',3''-tetra-N-thioacetylgentamicin A and 1,3,2',3''-tetra-N-(N'-methylthiocarbamoyl)gentamicin A with triphenylmethyl chloride in dry pyridine followed by treatment of the resultant respective 6'-O-triphenylmethyl ether derivative thereof with methanesulfonyl chloride in dry pyridine. Isolate the resultant products in a manner similar to that described to obtain, respectively, 6'-O-triphenylmethyl-2''-O-methanesulfonyl-1,3,2',3''-tetra-N-thioacetylgentamicin A and 6'-O-triphenylmethyl-2''-O-methanesulfonyl-1,3,2',3''-tetra-N-(N'-methylthiocarbamoyl)gentamicin A.

D. 6'-O-Triphenylmethyl-2''-O-methanesulfonyl-1,3,2',3''-tetra-N-thioacetyl(or N'-methylthiocarbamoyl)gentamicin $X_2$ In a manner similar to that described in Example 17A1 treat each of 1,3,2',3''-tetra-N-thioacetylgentamicin $X_2$ and 1,3,2',3''-tetra-N-(N-methylthiocarbamoyl)gentamicin $X_2$ with triphenylmethyl chloride in dry pyridine followed by treatment of the resultant respective 6'-O-triphenylmethyl ether derivatives thereof with methanesulfonyl chloride in dry pyridine. Isolate and purify the resultant products in a manner similar to that described to obtain, respectively, 6'-O-triphenylmethyl-2''-O-methanesulfonyl-1,3,2',3''-tetra-N-thioacetylgentamicin $X_2$ and 6'-O-triphenylmethyl-2''-O-methanesulfonyl-1,3,3''-tetra-N-(N-methylthiocarbamoyl)gentamicin $X_2$.

E. 2''-O-Methanesulfonyl-per-N-thioacetyl derivatives of tobramycin, 2',3'-dideoxykanamycin B, gentamicin A and gentamicin $X_2$ 1. Dissolve 2''-O-methanesulfonyl-6''-O-triphenylmethyl-1,3,2',6',3''-penta-N-thioacetyltobramycin in 90% aqueous acetic acid. Allow the solution to stand at room temperature for 2 hours then evaporate in vacuo to a residue. Chromatograph the residue on silica gel eluting with the lower phase of a 2:1:1 chloroform:methanol:15% ammonium hydroxide solvent system. Combine the like appropriate fractions as determined by thin layer chromatography, evaporate the combined fractions in vacuo to a residue comprising 2''-O-methanesulfonyl-1,3,2',6',3''-penta-N-thioacetyltobramycin.

2. In a manner similar to that described in Example 17E-1, treat each of the compounds prepared in Examples 17B, C and D with aqueous acetic acid. Isolate and purify the resultant products in a manner similar to that described to obtain, respectively, 2''-O-methanesulfonyl-1,3,2',6',3''-penta-N-thioacetyl-3',4'-dideoxykanamycin B, 2''-O-methanesulfonyl-1,3,2',3''-tetra-N-thioacetylgentamicin A, 2''-O-methanesulfonyl-1,3,2',3''-tetra-N-thioacetylgentamicin $X_2$.

3. In a manner similar to that described in Example 17E1 treat each of the following per-N-methylthiocarbamoyl derivatives with aqueous acetic acid:

2''-O-methanesulfonyl-6''-O-triphenylmethyl-1,3,2',6',3''-penta-N-(N'-methylthiocarbamoyl)-tobramycin, 2''-O-methanesulfonyl-6''-O-triphenylmethyl-1,3,2',6',3''-penta-N-(N'-methylthiocarbamoyl)-3',4'-dideoxykanamycin B, 6'-O-triphenylmethyl-2''-O-methanesulfonyl-1,3,2',-3''-tetra-N-(N'-methylthiocarbamoyl)gentamicin A, and 6'-O-triphenylmethyl-2''-O-methanesulfonyl-1,3,2',-3''-tetra-N-(N'-methylthiocarbamoyl)gentamicin $X_2$.

Isolate and purify the resultant respective products in a manner similar to the described in Example 17E1 to obtain, respectively:

2''-O-methanesulfonyl-1,3,2',6',3''-penta-N-(N'-methylthiocarbamoyl)tobramycin,

2''-O-methanesulfonyl-1,3,2',6',3''-penta-N-(N'-methylthiocarbamoyl)-3',4'-dideoxykanamycin B, 2''-O-methanesulfonyl-1,3,2',3''-tetra-N-(N'-methylthiocarbamoyl)gentamicin A, 2''-O-methanesulfonyl-1,3,2',3''-tetra-N-(N'-methylthiocarbamoyl) gentamicin $X_2$.

F. 2''-Deoxyaminoglycosides

1. Treat each of the compounds produced as described in Examples 17E(1) and 17E(2) with aqueous dimethylformamide at reflux temperature in the manner described in Example 6A to obtain the corresponding 2''-epi-sulfhydryl-2''-deoxy-3''-N-acetyl-per-N-thioacetyl derivatives which in turn upon treatment with aqueous sodium hydroxide at 120°C. according to the procedure of Example 11A produces the corresponding 2''-epi-sulfhydryl-2''-deoxyaminoglycoside, i.e.

2''-epi-sulfhydryl-2''-deoxytobramycin,

3',4',2''-trideoxykanamycin B,

2''-epi-sulfhydryl-2''-deoxygentamicin A,

2''-epi-sulfhydryl-2''-deoxygentamicin $X_2$.

2. Alternatively, the compounds of this Example are prepared by treating the compounds of Example 17E(3) with aqueous dimethylformamide at reflux temperature followed by treatment of the thereby formed 2''-epi- sulfhydryl-2''-deoxy-3''-N-acetyl-per-N-thioacetyl derivatives with aqueous sodium hydroxide at 120°C.

3. Treatment of each of the foregoing 2''-epi-sulfhydryl derivatives with Raney Nickel according to the procedure of Example 12A yields the corresponding 2''-deoxy compound i.e.

2''-deoxytobramycin,

3',4',2''-trideoxykanamycin B,

2''-deoxygentamicin A, and

2''-deoxygentamicin $X_2$.

EXAMPLE 18

2''-Deoxyaminoglycosides and 2''-epi-amino-2''-deoxy 3''-desamino-aminoglycosides prepared via hydrogenolysis of the corresponding 2''-deoxy-3''-desamino-2'',3''-epiminoaminoglycoside (Chart B Process)

A. 2''-Deoxy-3''-desmethylamino-2'',3''-N-methylepiminogentamicin $C_2$

1. Prepared via 2''-O-methanesulfonyl-1,3,2',6'-tetra-N-benzylidene-3'',4''-N,O-benzylidenegentamicin $C_2$ Dissolve 0.5 g. of 1,3,2',6'-tetra-N-benzylidene-3''-4''-N,O-benzylidenegentamicin $C_2$ in 10 ml. of dry pyridine and evaporate the pyridine in vacuo to a residue. Repeat this process with an additional 10 ml. of dry pyridine. Then dissolve the resultant dry residue in 5 ml. of dry pyridine and add dropwise a solution of 0.05 ml. of methanesulfonyl chloride in 5 ml. of pyridine. Stir the reaction mixture at room temperature for 16 hours, then evaporate in vacuo to a residue comprising 2''-O-methanesulfonyl-1,3,2',6'-tetra-N-benzylidene-3'',4''-N,O-benzylidenegentamicin $C_2$.

Dissolve the foregoing residue comprising the 2''-O-methanesulfonyl derivative in 15 ml. of methanol, add 1.5 ml. of 0.1N hydrochloric acid and stir at room temperature for 6 hours. Dilute the solution with 15 ml. of water and add 0.1N hydrochloric acid until the pH of the reaction mixture is 4.8 (about 8.5 ml. of 0.1N hydrochloric acid are usually added). Stir the acidic reaction mixture at room temperature for 16 hours then extract the solution with 15 ml. of ether and discard the ether extracts. Evaporate the aqueous layer to a residue comprising 2''-deoxy-3''-desmethylamino-2'',3''-N-methylepiminogentamicin $C_2$. Purify by chromatography over silica gel eluting with the lower phase of a 2:1:1 mixture of chloroformmethanol-15% ammonium hydroxide. Assay the eluate fractions by thin layer chromatography and combine the like appropriate fractions. Evaporate the combined eluates to a residue comprising purified 2''-deoxy-3''-desmethylamino-2'',3''-N-methylepiminogentamicin $C_2$ exhibiting the following data: nuclear magnetic resonance (60MH$_2$, CDCl$_3$) $\delta$ 1.05 (doublet, 3H, J=6.5H$_z$, CH—CH$_3$), $\delta$ 1.27 (singlet, 3H, C—CH$_3$), $\delta$ 2.42 (singlet, 3H, N—CH$_3$) $\delta$ 5.08 (doublet, 1H, J=3.75H$_z$, anomeric proton), $\delta$ 5.24 (singlet, 1H, anomeric proton.) Mass spectrum: peaks at m/e 446 ([M+1]$^+$), 333, 332, 315, 314, 305, 304, 286, 287 (pseudodisaccharide ions), 143, 142 (monosaccharide ions), 191, 173, 163, 145 (2-deoxystreptamine ions).

In similar manner treat each of the oxazolidinebenzylideneaminoglycosides prepared as described in Preparations 7 and 8 with methanesulfonyl chloride in pyridine followed by treatment of the resulting 2''-O-methanesulfonyl-oxazolidine-benzylideneaminoglycoside with hydrochloric acid to obtain the respective 2''-deoxy-3''-desamino-2'',3''-epimino-aminoglycoside intermediate.

2. Prepared via 2''-O-methanesulfonyl-penta-N-carbobenzyloxygentamicin $C_2$

Dissolve 500 mg. of 2''-O-methanesulfonyl-1,3,2',6',3''-penta-N-carbobenzyloxygentamicin $C_2$ in 50 mg. of absolute ethanol. Hydrogenate this solution at 50°C. over 500 mg. of a 30% palladium-on-carbon catalyst at 50 p.s.i. for 24 hours. Remove the catalyst by filtration and evaporate the filtrate to a residue comprising 2''-deoxy-3''-desmethylamino-2'',3''-N-methylepiminogentamicin $C_2$ which can be used without further purification in the process described in following Example 19B. Alternatively, the compound of this example can be purified prior to further reaction as described in Example 18B by chromatography in the manner described in Example 18A-1 to obtain purified 2''-deoxy-3''-desmethylamino-2'',3''-N-methylepiminogentamicin $C_2$ having n.m.r. and mass spectral data as set forth in Example 18A-1.

B. 2''-Deoxygentamicin $C_2$ and 2''-deoxy-2''-epimethylamino-3''-desmethylaminogentamicin $C_2$ Dissolve 2''-deoxy-3''-desmethylamino-2'',3''-N-methylepiminogentamicin $C_2$ (37 mg.) in 50 ml. of absolute ethanol and hydrogenate at 50 p.s.i. over a Raney Nickel catalyst for 24 hours. Remove the catalyst by filtration and evaporate the filtrate in vacuo to a residue comprising a product mixture containing 2''-deoxygentamicin $C_2$ and 2''-deoxy-2''-epimethylamino-3''-desmethylaminogentamicin $C_2$. Isolate and purify the products by chromatographing the residue over silica gel eluting with the lower phase of a 2:1:1 mixture of chloroform-methanol-15% ammonium hydroxide. Assay the eluate fractions by thin layer chromatography and combine the like fractions. Evaporate each of the combined like fractions to yield 2''-deoxygentamicin $C_2$ and 2''-deoxy-2''-epimethylamino-3''-desmethylaminogentamicin $C_2$ respectively.

C. In a manner similar to that described in Example 18A-2 treat each of the following 2''-O-methanesulfonyl-per-N-carbobenzyloxyaminoglycosides with hydrogen on palladium-charcoal.

2''-O-methanesulfonyl-1,3,2',6',3''-penta-N-carbobenzyloxygentamicin $C_1$,
2''-O-methanesulfonyl-1,3,2',6',3''-penta-N-carbobenzyloxygentamicin $C_{1a}$, and
2''-O-methanesulfonyl-1,3,2',6',3''-penta-N-carbobenzyloxygentamicin $C_{2a}$.

Filter the resultant reaction mixture, and evaporate the filtrate to a residue comprising the corresponding 2''-deoxy-3''-desmethylamino-2'',3''-N-methylepimino intermediate which upon treatment with hydrogen over Raney Nickel in the manner described in Example 18B yields a product mixture which is separated and purified via chromatographic techniques in a manner similar to that described in Example 18B to obtain respectively:

2''-deoxygentamicin $C_1$ and 2''-epi-methylamino-2''-deoxy-3''-desmethylaminogentamicin $C_1$,
2''-deoxygentamicin $C_{1a}$ and 2''-epi-methylamino-2''-deoxy-3''-desmethylaminogentamicin $C_{1a}$,
2''-deoxygentamicin $C_{2a}$ and 2''-epi-methylamino-2''-deoxy-3''-desmethylaminogentamicin $C_{2a}$.

D. In a manner similar to that described in Example 18A-2 treat each of the 2''-O-methanesulfonyl-O-iso-propylidene-per-N-carbobenzyloxyaminoglycosides prepared in Example 13-1 with hydrogen on palladium charcoal followed by evaporation of the resulting filtrate to a residue comprising the corresponding O-iso-propylidene-2''-deoxy-3''-desmethylamino (or 3''-desamino)-2'',3''-N-methylepimino (or epimino)-aminoglycoside which upon hydrogenation over Raney Nickel followed by separation and purification of the resultant products yields, respectively:

2''-deoxy-4'',6''-O-iso-propylidenetobramycin, and
2''-epi-amino-2''-deoxy-3''-desamino-4'',6''-O-iso-propylidenetobramycin, 3',4',2''-trideoxy-4'',6''-O-iso-propylidenekanamycin B and 2''-epi-amino-2''-deoxy-3''-desamino-4'',6''-O-iso-propylidenekanamycin B, 2''-deoxy-4',6'-O-iso-propylidenegentamicin A and 2''-epi-methylamino-2''-deoxy-3''-desmethylamino-4',6'-O-isopropylidenegentamicin A, 2''-deoxy-4',6'-O-iso-propylidenegentamicin $X_2$ and 2''-epi-methylamino-2''-deoxy-3''-desmethylamino-4',6'-O-iso-propylidenegentamicin $X_2$, 2''-deoxy-3',4'-O-iso-propylidene-antibiotic JI-20-A and 2''-epi-methylamino-2''-deoxy-3''-desmethylamino-3',4'-O-iso-propylidene-antibiotic JI-20-A, 2''-deoxy-3',4'-O-iso-propylidene-antibiotic JI-20-B and 2''-epi-methylamino-2''-deoxy-3''-desmethylamino-3',4'-O-iso-propylidene-antibiotic JI-20-B, 2''-deoxy-4',6'-O-iso-propylidene-antibiotic G-418 and 2''-epi-methylamino-2''-deoxy-3''-desmethylamino-4',6'-O-iso-propylidene-antibiotic G-418, a mixture comprising 2''-deoxy-2',3'-O-iso-propylidene (and 3',4'-O-iso-propylidene)gentamicin B and 2''-epi-methylamino-2''-deoxy-3''-desmethylamino-2',3'-O-iso-propylidene (and 3',4'-O-iso-propylidene)gentamicin B, a mixture comprising 2''-deoxy-2',3'-O-iso-propylidene (and 3',4'-O-iso-propylidene)gentamicin $B_1$ and 2''-epi-methylamino-2''-deoxy-3''-desmethylamino-2',3'-O-iso-propylidene (and 3',4'-O-iso-propylidene)gentamicin $B_1$.

Treat each of the foregoing product mixtures with 50% aqueous acetic acid in a manner similar to that described in Example 10A to remove the O-iso-propylidene groups, then separate the resultant product mixtures via chromatography over silica gel in a manner similar to that described in Example 18A to obtain, respectively:

2''-deoxytobramycin, 2''-epi-amino-2''-deoxy-3''-desaminotobramycin,

3',4',2''-trideoxykanamycin B, 2''-epi-amino-2''-deoxy-3''-desaminokanamycin B,

2''-deoxygentamicin A, 2''-epi-methylamino-2''-deoxy-3''-desmethylaminogentamicin A, 2''-deoxygentamicin $X_2$, 2''-epi-methylamino-2''-deoxy-3''-desmethylaminogentamicin $X_2$, 2''-deoxy-antibiotic JI-20-A, 2''-epi-methylamino-2''-deoxy-3''-desmethylamino-antibiotic JI-20-A, 2''-deoxy-antibiotic JI-20-B, 2''-epi-methylamino-2''-deoxy-3''-desmethylamino-antibiotic JI-20-B, 2''-deoxy-antibiotic G-418, 2''-epi-methylamino-2''-deoxy-3''-desmethylamino-antibiotic G-418, 2''-deoxygentamicin B, 2''-epi-methylamino-2''-deoxy-3''-desmethylaminogentamicin B, 2''-deoxygentamicin $B_1$, and 2''-epi-methylamino-2''-deoxy-3''-desmethylaminogentamicin $B_1$.

In the foregoing procedure of Example 18D, the starting 2''-o-methanesulfonyl-per-N-carbobenzyloxyaminoglycoside may have O-benzylidene protecting groups (compounds of Example 13-2) instead of O-isopropylidene protecting groups.

E. 2''-deoxysisomicin, 2''-deoxyverdamicin and the 3''-desmethylamino-2''-epi-methylamino analogs thereof.

1. 2''-deoxy-3''-desmethylamino-2'',3''-N-methylepiminosisomicin and 2''-deoxy-3''-desmethylamino-2'',3''-N-methylepiminoverdamicin To 0.60 g. of 2''-O-methanesulfonyl-1,3,2',6',3''-penta-N-carbobenzyloxysisomicin [prepared as described in Example 13(1)] in 20 ml. of dry tetrahydrofuran, add a solution of 25 mg. of lithium in 25 ml. of redistilled ammonia. Stir the reaction mixture for one hour, then add 100 mg. of ammonium chloride. Evaporate the reaction mixture in vacuo to a residue, then extract the residue several times with chloroform. Evaporate the combined chloroform extracts in vacuo to a residue comprising 2''-deoxy-3''-desmethylamino-2'',3''-N-methylepiminosisomicin.

In similar manner treat 2''-O-methanesulfonyl-1,3,2',6',3''-penta-N-carbobenzyloxyveredamicin in dry tetrahydrofuran with lithium in ammonia. Isolate and purify the resultant product in a manner similar to that described hereinabove to obtain 2''-deoxy-3''-desmethylamino-2'',3''-N-methylepiminoverdamicin.

2. Treat each of 2''-deoxy-3''-desmethylamino-2'',3''-N-methylepiminosisomicin and 2''-deoxy-3''-desmethylamino-2'',3''-N-methylepiminoverdamicin with thiophenol and sodium methoxide in ethanol in a manner similar to that described in Example 19B to obtain a product mixture comprising 2''-deoxy-2''-phenylthiosisomicin with 2''-deoxy-3''-desmethylamino-2''-epi-methylamino-3''-epi-phenylthiosisomicin, and 2''-deoxy-2''-phenylthioverdamicin with 2''-deoxy-3''-desmethylamino-2''-epi-methylamino-3''-epi-phenylthioverdamicin, respectively. Treat each of the foregoing product mixtures with acetic anhydride in methanol according to the procedure of Example 19E(1); then desulfurize the corresponding per-N-acetyl derivatives thereby formed with Raney Nickel or with aluminum amalgam in a manner similar to that described in Example 19E (1 and 2) and in Example 19F(1) to obtain the product mixtures comprising per-N-acetyl-2''-deoxysisomicin with per-N-acetyl-2''-deoxy-3''-desmethylamino-2''-epi-methylaminosisomicin, and per-N-acetyl-2''-deoxyverdamicin with per-n-acetyl-2''-deoxy-3''-desmethylamino-2''-epi-methylaminoverdamicin, respectively.

The product mixtures produced hereinabove may be separated via chromatographic techniques followed by hydrolysis of the separated per-N-acetyl derivatives with sodium hydroxide or, alternatively, the per-N-acetyl product mixture may be hydrolyzed according to the procedure described in Example 4A followed by a separation of the hydrolyzed product mixtures thereby produced to obtain 2''-deoxysisomicin and 2''-deoxy-3''-desmethylamino-2''-epi-methylaminosisomicin, and 2''-deoxyverdamicin and 2''-deoxy-3''-desmethylamino-2''-epi-methylaminoverdamicin, respectively.

EXAMPLE 19

2''-Deoxyaminoglycosides and 2''-deoxy-2''-epi-amino-3''-desaminoaminoglycosides prepared from the corresponding 2''-deoxy-3''-desamino-2'',3''-epimino-aminoglycosides via thio derivatives followed by desulfurization (Chart B Process)

A. 2''-deoxy-2''-sulfhydrylgentamicin $C_2$ and 2''-deoxy-3''-desmethylamino-2''-epi-methylamino-3''-epi-sulfhydrylgentamicin $C_2$ To 10 ml. of ethanol saturated with hydrogen sulfide, add 100 mg. of 2''-deoxy-3''-desmethylamino-2'',3''-N-methylepiminogentamicin $C_2$. Heat the reaction mixture at 46°C until there is no evidence of the N-methylepimino starting compound in the reaction mixture as determined by thin layer chromatographic analysis of an aliquot of the reaction solution (usually about 8 hours). Evaporate the reaction mixture in vacuo to a residue comprising 2''-deoxy-2''-sulfhydrylgentamicin $C_2$ in admixture with 2''-deoxy-3''-desmethylamino-2''-epi-methylamino-3''-epi-sulfhydrylgentamimcin $C_2$.

B. 2''-deoxy-2''-phenylthiogentamicin $C_2$ and 2''-deoxy-3''-desmethylamino-2''-epi-methylamino-3''-epi-phenylthiogentamicin $C_2$ To a solution of 100 mg. of 2''-deoxy-3''-desmethylamino-2'',3''-N-methylepiminogentamicin $C_2$ in 10 ml. of ethanol at room temperature, add 100 mg. of thiophenol and 50 mg. of powdered sodium methoxide. Stir at 50°C until there is no evidence of the N-methylepimino starting compound in the reaction mixture as determined by thin layer chromatographic analysis of an aliquot of the reaction solution. Distill the reaction mixture in vacuo to a residue comprising 2''-deoxy-2''-phenylthiogentamicin $C_2$ in admixture with 2''-deoxy-3''-desmethylamino-2''-epi-methylamino-3''-epi-phenylthiogentamicin $C_2$.

C. 2''-deoxy-2''-acetylthiogentamicin and 2''-deoxy-3''-desmethylamino-2''-epi-methylamino-3''-epi-acetylthiogentamicin $C_2$ To 100 mg. of 2''-deoxy-3''-desmethylamino-2'',3''-N-methylepiminogentamicin $C_2$ in 10 ml. of ethanol, add 100 mg. of potassium thiolacetate. Heat under reflux until there is no evidence of the N-methylepimino starting compound as determined by thin layer chromatographic analysis of an aliquot of the reaction mixture. Evaporate the solution in vacuo to a residue comprising 2''-deoxy-2''-acetylthiogentamicin $C_2$ in admixture with 2''-deoxy-3''-desmethylamino-2''-epi-methylamino-3''-epi-acetylthiogentamicin $C_2$, suitable for use in the desulfurization procedure immediately following.

D. 2''-deoxygentamicin $C_2$ and 2''-deoxy-3''-desmethylamino-2''-epimethylaminogentamicin $C_2$ 1. Raney Nickel desulfurization Dissolve the product mixture obtained as described in Example 19A (i.e. 2''-deoxy-2''-sulfhydrylgentamicin $C_2$ in admixture with 2''-deoxy-3''-desmethylamino-2''-epi-methylamino-3''-epi-sulfhydrylgentamicin $C_2$) in 10 ml. of ethanol and add Raney Nickel in an amount approximately 10 times the weight of the starting product. Stir the reaction mixture at room temperature until thin layer chromatography indicates no starting material is present, then filter off the Raney Nickel and wash the Raney Nickel with ethanol and water. Evaporate the combined filtrate and washings to a residue comprising 2''-deoxygentamicin $C_2$ in admixture with 2''-deoxy-3''-desmethylamino-2''-epi-methylaminogentamicin $C_2$. Separate and purify the products by chromatographing the residue over silica gel, eluting with the lower phase of a 2:1:1 mixture of chloroform-methanol-15% ammonium hydroxide. Assay the eluate fractions by thin layer chromatography and combine the like fractions. Distill each of the combined like fractions to yield 2''-deoxygentamicin $C_2$ and 2''-deoxy-3''-desmethylamino-2''-epi-methylaminogentamicin $C_2$, respectively.

2. Aluminum amalgam desulfurization

Dissolve the product mixture obtained in Example 19A in 10 ml. of ethanol, then add 2 ml. of water and 1 gm. of amalgamated aluminum foil. Stir 24 hours at room temperature, filter the reaction mixture, and evaporate the filtrate in vacuo to a residue comprising 2''-deoxygentamicin $C_2$ in admixture with 2''-deoxy-3''-desmethylamino-2''-epi-methylaminogentamicin $C_2$, which is separated via thin layer chromatography utilizing silica gel in a manner similar to that described in Example 19D(1).

3. Similarly, treat each of the product mixtures of Example 19B and of Example 19C with Raney Nickel in ethanol or with aluminum amalgam in ethanol according to procedures similar to those described in above Examples 19D(1) and 19D(2) to obtain a product mixture comprising 2''-deoxygentamicin $C_2$ and 2''-deoxy-3''-desmethylamino-2''-epi-methylaminogentamicin $C_2$, which is separable via thin layer chromatography in a manner similar to that described in Examples 19D(1) and 19D(2).

E. Per-N-acetyl-2''-deoxy-2''-acetylthiogentamicin $C_2$ and per-N-acetyl-2''-deoxy-2''-epi-methylamino-3''-desmethylamino-3''-epi-acetylthiogentamicin $C_2$ 1. To a solution of the product mixture obtained in Example 19A in 10 ml. of methanol, add 1 ml. of acetic anhyride. Allow the reaction mixture to stand at room temperature for 1 hour, then evaporate the solution in vacuo to a residue comprising per-N-acetyl-2''-deoxy-2''-acetylthiogentamicin $C_2$ in admixture with per-N-acetyl-2''-deoxy-2''-epi-methylamino-3''-desmethylamino-3''-epi-acetylthiogentamicin $C_2$.

2. In similar manner, treat each of the product mixtures prepared in Example 19B and Example 19C with acetic anhydride in methanol at room temperature to obtain the per-N-acetyl derivatives of the respective product mixtures.

F. Per-N-acetyl-2''-deoxygentamicin $C_2$ and per-N-acetyl-2''-deoxy-3''-desmethylamino-2''-epi-methylaminogentamicin $C_2$ 1. Raney Nickel desulfurization Dissolve the per-N-acetyl product mixture prepared in Example 19E(1) in 10 ml. of ethanol and add Raney Nickel in an amount approximately 10 times the weight of the starting-product mixture. Stir the reaction mixture at reflux temperature for 3 hours, cool, filter off the Raney Nickel and wash the Raney Nickel with ethanol and water. Evaporate the combined filtrate and washings in vacuo to a residue comprising per-N-acetyl-2''-deoxygentamicin $C_2$ in admixture with per-N-acetyl-2''-deoxy-3''-desmethylamino-2''-epi-methylaminogentamicin $C_2$.

Separate and purify the products by chromatographing the residue over silica gel, eluting with the lower phase of a 2:1:1 mixture of chloroform-methanol-15% ammonium hydroxide. Assay the eluate fractions by thin layer chromatography and combine like fractions. Distill each of the combined like fractions in vacuo to yield a residue comprising per-N-acetyl-2''-deoxygentamicin $C_2$ and per-N-acetyl-2''-deoxy-3''-desmethylamino-2''-epi-methylaminogentamicin $C_2$, respectively.

2. Desulfurization using aluminum amalgam

Alternatively, the product mixture prepared in Example 19E(1) is desulfurized at room temperature by means of aluminum amalgam in the manner described in Example 19D(2), whereby there is obtained the product mixture obtained in Example 19F(1), which is separated via chromatography in the manner described in Example 19F(1).

3. Alternatively, the per-N-acetyl product mixtures obtained as described in Example 19E(2) are desulfurized with Raney Nickel or with aluminum amalgam in a manner similar to the procedures of Examples 19F(1) and 19F(2); the product mixtures produced thereby are each separated via chromatographic techniques to obtain per-N-acetyl-2''-deoxygentamicin $C_2$ and per-N-acetyl-2''-deoxy-3''-desmethylamino-2''-epi-methylaminogentamicin $C_2$, respectively.

G. Hydrolysis of the per-N-acetyl derivatives of 2''-deoxygentamicin $C_2$ and of 2''-deoxy-3''-desmethylamino-2''-epi-methylaminogentamicin $C_2$ In a manner similar to that described in Example 4A, treat per-N-acetyl-2''-deoxygentamicin $C_2$ with 50% aqueous sodium hydroxide in a sealed container at 100°C for about 42 hours. Isolate and purify the resultant product in a manner similar to that described in Example 4A to obtain 2''-deoxygentamicin $C_2$.

Similarly, treat per-N-acetyl-2''-deoxy-3''-desmethylamino-2''-epi-methylaminogentamicin $C_2$ with 50% aqueous sodium hydroxide in a sealed container at 100°C. Separate and purify the resultant products in a manner similar to that described in Example 4A to obtain 2''-deoxy-3''-desmethylamino-2''-epi-methylaminogentamicin $C_2$.

H. Preparation of other 2''-deoxyaminoglycosides and 2''-deoxy-3''-desmethylamino-2''-epi-methylamino-aminoglycosides 1. In the reaction sequence described in Examples 19A, 19B, 19C and 19D, the 2''-deoxy-3''-desmethylamino-2'',3''-epimino derivatives of aminoglycoside antibiotics other than of gentamicin $C_2$ (prepared as described in Example 18, e.g. 2''-deoxy-3''-desmethylamino-2'',3''-N-methylepiminogentamicin $C_1$) can be used as a starting compound and there is obtained a product mixture comprising the corresponding 2''-deoxyaminoglycoside in admixture with the corresponding 2''-deoxy-3''-desmethylamino-2''-epi-methylaminoaminoglycoside (e.g. 2''-deoxygentamicin $C_1$ and 2''-deoxy-3''-desmethylamino-2''-epi-methylaminogentamicin $C_1$).

2. The reaction sequence described in Examples 19E, 19F, and 19G can be carried out utilizing N-protecting groups other than N-alkanoyl groups (e.g. the N-carbobenzyloxy, the N-methylcarbamoyl and the N-benzylidene groups) which are prepared according to known procedures. After desulfurization in a manner similar to that described in Example 19F, the N-protecting groups in the 2''-deoxy-product mixtures are then removed utilizing known methods.

Thus, each of the product mixtures prepared in Examples 19A, 19B, and 19C, upon treatment with carbobenzyloxy chloride and sodium carbonate in a manner similar to that described in Preparation 5A, yields the corresponding per-N-carbobenzyloxy derivatized product mixture which, upon desulfurization in a manner similar to that described in Example 19F, yields a per-N-carbobenzyloxy derivatized product mixture of 2''-deoxygentamicin $C_2$ and 2''-deoxy-3''desmethylamino-2''-epi-methylaminogentamicin $C_2$; separation thereof using chromatographic techniques followed by removal of the per-N-carbobenzyloxy protecting groups by hydrogenation with palladium-on-charcoal catalyst in the manner of Example 18A(2), yields, respectively, 2''-deoxygentamicin $C_2$ and 2''-deoxy3''desmethylamino-2''-epi-methylaminogentamicin $C_2$.

EXAMPLE 20

2''-Deoxygentamicin Sulfate

Dissolve 3 gm. of 2''-deoxygentamicin $C_2$ in 24 ml. of water and adjust the pH to about 4.0 by the addition of 6N sulfuric acid. Add decolorizing charcoal and stir for 30 minutes. Filter, and pour the filtrate into 250 ml. of methanol. Filter off the resultant precipitate, wash with methanol and dry in vacuo to obtain 2''-deoxygentamicin $C_2$ sulfate.

In similar manner are prepared the sulfate salts of all the 2''-deoxyaminoglycosides prepared as described in above Examples 1 through 19.

EXAMPLE 21

2''-Deoxyaminoglycosides and 2''-epi-amino-2''-deoxy-3''-desaminoaminoglycosides prepared via N-derivatization of the corresponding 2''-deoxy-3''-desamino-2'',3''-epiminoaminoglycosides followed by hydrogenolysis and alkaline hydrolysis (Chart B Process)

A. 1,3,2',6'-tetra-N-acetyl-2''-deoxy-3''-desmethylamino-2'',3''-N-methylepiminogentamicin $C_1$ To 229 mg. of 2''-deoxy-3''-desamino-2'',3''-epiminogentamicin $C_1$ (prepared in the manner described in Example 18A) in three ml. of methanol, add 0.3 ml. of acetic anhydride at room temperature. Allow the reaction mixture to stand at room temperature for 2 hours, then evaporate the solvent in vacuo, redissolve the resultant residue in 1 ml. of methanol and add dropwise to 50 ml. of ether with stirring. Filter the resultant precipitate comprising 1,3,2',6'-tetra-N-acetyl-2''-deoxy-3''-desmethylamino-2'',3''-N-methylepiminogentamicin $C_1$ which can be used without further purification in the procedure of Example 21B.

If desired, purify by chromatography over silica gel, eluting with the lower phase of a 20:10:9:1 mixture of chloroform-methanol-water-concentrated ammonium hydroxide. Combine the like fractions as determined by thin layer chromatography, and evaporate to a residue comprising 1,3,2',6'-tetra-N-acetyl-2''-deoxy-3''-desmethylamino-2'',3''-N-methylepiminogentamicin $C_1$ as an amorphous solid; nmr ($CD_3OD$) 1.28(7H, multiplet, ca. 2.0(19H, multiplet), 2.37(3H, singlet, 2.88(3H, doublet), 4.97(1H, singlet), 5.44 (1H, doublet, J=3.5Hz)ppm.; mass spectral peaks at m/e 627 $(M+1)^+$, 497, 487, 469, 416, 398, 388, 370, 275, 257, 247, 241, 229, 142.

B. 2''-deoxygentamicin $C_1$ and 2''-deoxy-2''-epi-methylamino-3''-desmethylaminogentamicin $C_1$ 1. Hydrogenate 260 mg. of 1,3,2',6'-tetra-N-acetyl-2''-deoxy-3''-desmethylamino-2'',3''-N-methylepiminogentamicin $C_1$ in 300 ml. of methanol over 500 mg. of Raney Nickel at 2000 p.s.i. at 140°C for 16 hours. Cool, filter off the Raney Nickel and wash with methanol. Evaporate the combined filtrate and methanol washings in vacuo to a residue comprising a mixture of 1,3,2',6'-tetra-N-acetyl-2''-deoxygentamicin $C_1$ and 1,3,2',6'-tetra-N-acetyl-2''-deoxy-3''-desmethylamino-2''-epi-methylaminogentamicin $C_1$.

The mixture is separated by chromatography over silica gel using the lower phase of a 2:1:1 chloroform-methanol-15% aqueous ammonium hydroxide mixture as eluant.

2. Alternatively, the product mixture of this example is prepared as follows: To 315 mg. of 1,3,2',6'-tetra-N- acetyl-2''-deoxy-3''-desmethylamino-2'',3''-N-methylepiminogentamicin $C_1$ in 50 ml. of methanol at room temperature, add 19 mg. of benzyl bromide. Allow the solution to stand at room temperature for 16 hours, then evaporate in vacuo to a residue comprising 1,3,2',6'-tetra-N-acetyl-2''-deoxy-3''-desmethylamino-2'',3''-(N-benzyl-N-methyl)epiminogentamicin $C_1$ quaternary bromide salt. Dissolve the foregoing N-benzyl bromide quaternary salt in methanol and hydrogenate at 2000 p.s.i. in the manner described in Example 21B(1) and isolate the resultant product to obtain a mixture comprising 1,3,2',6'-tetra-N-acetyl-2''-deoxygentamicin $C_1$ and 1,3,2',6'-tetra-N-acetyl-2''-deoxy-3''-desmethylamino-2''-epi-methylaminogentamicin $C_1$.

Alternatively, the foregoing quaternary bromide salt is hydrogenated in ethanol over 30% palladium-charcoal catalyst in a manner similar to that described in Example 18A-2 and there is obtained the product mixture of this example.

C. 2''-deoxygentamicin $C_1$ and 2''-deoxy-3''-desmethylamino-2''-epi-methylaminogentamicin $C_1$ In a manner similar to that described in Example 4A, treat the foregoing product mixture of tetra-N-acetates with 50% aqueous sodium hydroxide in the manner of Example 4A. Isolate and purify the resultant product in a manner similar to that described in Example 4A to obtain 2''-deoxygentamicin $C_1$ and 2''-deoxy-3''-desmethylamino-2''-epi-methylaminogentamicin $C_1$.

Separate and purify each of the resultant products by chromatographing over silica gel, eluting with the lower phase of a 2:1:1 mixture of chloroform-methanol-15% ammonium hydroxide in a manner similar to that described in Example 15B to obtain 2''-deoxygentamicin $C_1$ and 2''-deoxy-2''-epiminomethylamino-3''-desmethylaminogentamicin $C_1$, respectively.

D. In a manner similar to that described in Examples 21A, 21B and 21C treat each of the 2''-deoxy-3''-desmethylamino-2'',3''-epimino-aminoglycosides prepared as described in Example 18A(1) (last paragraph) to obtain the respective 2''-deoxyaminoglycoside and 2''-deoxy-3''-desamino-2''-epi-amino-aminoglycoside.

As discussed hereinabove, the 2''-deoxyaminoglycosides of this invention such as defined by formulae I (a and b) and II (a and b) and the non-toxic pharmaceutically acceptable acid addition salts thereof in general, possess a spectrum of antibacterial activity similar to that of the 2''-hydroxy precursor thereof. Thus the preferred compounds of my invention, including 2''-deoxygentamicin $C_2$, 2''-deoxysisomicin and 2''-deoxyverdamicin, are broad spectrum anti-bacterial agents being active against gram positive and gram negative bacteria and therefore, can be used alone or in combination with other antibiotic agents to prevent the growth or reduce the number of bacteria in various environments. They may be used, for example, to disinfect laboratory glassware, dental and medical equipment contaminated with *Staphylococcus aureus* or other bacteria adversely affected by the 2''-deoxyaminoglycoside being used. The activity of the 2''-deoxyaminoglycosides against gram negative bacteria renders them useful for combatting infections caused by gram negative organisms, e.g. species of *Proteus and Pseudomonas*. My 2''-deoxyaminoglycosides, e.g 2''-deoxygentamicin $C_2$ have veterinary applications, particularly in the treatment of mastitis in cattle anad Salmonella induced diarrhea in domestic animals such as the dog and the cat.

In general, the dosage administered of the 2''-deoxyaminoglycoside will be dependent upon the age and weight of the animal species being treated, the mode of administration, and the type and severity of bacterial infection being prevented or reduced. In general, the dosage of 2''-deoxyaminoglycoside employed to combat a given bacterial infection will be similar to the dosage requirements of the corresponding 2''-hydroxyaminoglycoside. Additionally, my 2''-deoxyaminoglycosides of formulae I(a and b) and II(a and b), particularly those defined by formula I(a and b), e.g. 2''-deoxygentamicin $C_2$ are also advantageously cidal against R-factor-carrying strains of bacteria which adenylylate gentamicin and against which gentamicin and other 2''-hydroxyantibiotics are inactive.

The 2''-deoxyaminoglycosides of formulae I(a and b) and II(a and b) and the pharmaceutically acceptable acid addition salts thereof may be administered orally. They may also be applied topically in the form of ointments, both hydrophilic and hydrophobic, in the form of lotions which may be aqueous, non-aqueous or of the emulsion type or in the form of creams. Pharmaceutical carriers useful in the preparation of such formulations will include, for example such substrates as water, oils, greases, polyesters, polyols and the like.

For oral administration the 2''-deoxyaminoglycoside antibacterials of this invention may be compounded in the form of tablets, capsules, elixirs or the like or may even be admixed with animal feed. It is in these dosage forms that the antibacterials are most effective for treating bacterial infections of the gastrointestinal tract which infections cause non-specific diarrhea.

In general, the topical preparations will contain from about 0.1 to about 3.0 gms. of 2''-deoxyaminoglycoside of formulae I(a and b) or II(a and b) per 100 gms. of ointment, creams or lotion. The topical preparations are usually applied gently to lesions from about 2 to about 5 times a day.

The antibacterials of this invention may be utilized in liquid form such as solutions, suspensions and the like for otic and optic use and may also be administered parenterally via intramuscular injection. The injectable solution or suspension will usually be administered at from about 1 mg. to about 15 mgs. of antibacterial per kilogram of body weight per day divided into about 2 to about 4 doses. The precise dose depends on the stage and severity of the infection, the susceptibility of the infecting organism to the antibacterial and the individual characteristics of the animal species being treated.

The following formulations are to exemplify some of the dosage forms in which the antibacterial agents of this invention and their derivatives may be employed:

| Tablet | Formulation I 10 mg. Tab. | 25 mg. Tab. | 100 mg. Tab. |
|---|---|---|---|
| | * | * | * |
| 2''-Deoxygentamicin $C_2$ | 10.50 mg. | 26.25 mg. | 105.00 Mg. |
| Lactose, impalpable powder | 197.50 mg. | 171.25 mg. | 126.00 mg. |
| Corn Starch | 25.00 mg. | 25.00 mg. | 35.00 mg. |
| Polyvinylpyrrolidone | 7.50 mg. | 7.50 mg. | 7.50 mg. |
| Magnesium Stearate | 2.50 mg. | 2.50 mg. | 3.50 mg. |

*5% excess

Procedure

Prepare a slurry consisting of the 2''-deoxygentamicin $C_2$, lactose and polyvinylpyrrolidone. Spray dry the slurry. Add the corn starch and magnesium stearate. Mix and compress into tablets.

| Formulation 2 | |
|---|---|
| Ointment | |
| 2''-Deoxygentamicin $C_2$ (base) | 1.0 gm. |
| Methyl paraben U.S.P. | 0.5 gm. |
| Propyl paraben U.S.P. | 0.1 gm. |
| Petrolatum | to 1000 gm. |

Procedure

1. Melt the petrolatum.

2. Mix the 2''-deoxygentamicin $C_2$, methyl paraben and propyl paraben with about 10% of the molten petrolatum.

3. Pass the mixture through a colloid mill.

4. Add the remainder of the petrolatum with agitation and cool the mixture until it becomes semi-solid. At this stage the product may be put into suitable containers.

Ointments of 2''-deoxyaminoglycosides of formulae I (a and b) or II(a and b) and of the acid addition salts thereof are prepared by substituting an equivalent quantity of 2''-deoxyaminoglycoside or acid addition salt for 2''-deoxygentamicin $C_2$ in the foregoing example and by following substantially the procedure of the example.

| Formulation 3 | | |
|---|---|---|
| Injectable Solution | Per. 2.0 ml. vial | Per. 50 Liters |
| | * | * |
| 2''-Deoxygentamicin $C_2$ sulfate | 84.0 mgs. | 2100.0 gms. |
| Methyl paraben, U.S.P. | 3.6 mgs. | 90.0 gms. |
| Propyl paraben, U.S.P. | 0.4 mgs. | 10.0 gms. |
| Sodium bisulfate, U.S.P. | 6.4 mgs. | 160.0 gms. |
| Disodium Ethylenediamine tetraacetate dihydrate, R.G. | 0.2 mgs. | 5.0 gms. |
| Water, U.S.P. q.s. | 2.0 ml. | 50.0 l. |

* Includes a 5% manufacturing overcharge.

Procedure: For a 50.0 liter batch

Charge approximately 35 liters of water for injection to a suitable stainless steel jacketed vessel and heat to about 70°C. Charge the methylparaben and propylparaben to the heated water for injection and dissolve with agitation. When the parabens are completely dissolved, cool the contents of the tank to 25°–30° C by circulating cold water through the tank jacket. Sparge the solution with nitrogen gas for at least 10 minutes and keep covered with nitrogen during subsequent processing. Charge and dissolve the disodium EDTA and sodium bisulfite. Charge and dissolve the 2''-deoxygentamicin $C_2$ sulfate. Bring the batch volume up to 50.0 liters with water for injection and agitate until homogenous.

Under sterile conditions, filter the solution through a suitable bacteria retentive filter collecting the filtrate in a filling tank.

Fill the filtrate aseptically into sterile pyrogenfree multiple dose vials, stopper and seal.

In like manner, injectable solutions of 2''-deoxysisomicin, 2''-deoxyverdamicin and especially acid addition salts of such antibacterial agents, may be prepared by substituting an equivalent quantity of such compounds for 2''-deoxygentamicin $C_2$ sulfate and by following the procedure set forth above.

I claim:

1. A compound selected from the group consisting of a 2''-deoxyaminoglycoside selected from the group consisting of 2''-deoxygentamicin A, 2''-deoxygentamicin B, 2''-deoxygentamicin $B_1$, 2'-deoxygentamicin $C_1$, 2''-deoxygentamicin $C_{1a}$, 2''-deoxygentamicin $C_2$, 2''-deoxygentamicin $C_{2a}$, 2''-deoxygentamicin $X_2$, 2''-deoxysisomicin, 2''-deoxyverdamicin, 2''-deoxy-Antibiotic JI-20-A, 2''-deoxy-Antibiotic JI-20-B, 2''-deoxy-Antibiotic G-418, 2''-deoxytobramycin and 3',4',2''-trideoxykanamycin B; the 3''-desmethylamino-2''-epi-methylamino- or 3''-desamino-2''-epi-amino derivatives thereof; mixtures of said 2''-deoxyaminoglycoside with the 3''-desmethylamino-2''-epi-methylamino analog thereof or with the 3-desamino-2''-epi-amino analog thereof; and the non-toxic pharmaceutically acceptable acid addition salts of the foregoing.

2. A 2''-deoxyaminoglycoside of claim 1.

3. A 2''-deoxyaminoglycoside of claim 1 which is 2''-deoxysisomicin.

4. A 2''-deoxyaminoglycoside of claim 1 which is 2''-deoxyverdamicin.

5. A 2''-deoxyaminoglycoside of claim 1 which is 2''-deoxygentamicin $C_1$.

6. A 2''-deoxyaminoglycoside of claim 1 which is 2''-deoxygentamicin $C_{1a}$.

7. A 2''-deoxyaminoglycoside of claim 1 which is a 2''-deoxygentamicin $C_2$.

8. A 2''-deoxyaminoglycoside of claim 1 which is 2''-deoxygentamicin $C_{2a}$.

9. A 3''-desmethylamino-2''-epi-methylamino analog of a 2''-deoxyaminoglycoside of claim 1 which is 2''-deoxy-3''-desmethylamino-2''-epi-methylaminogentamicin $C_2$.

10. A per-N-lower alkanoyl-derivative of a 2''-deoxyaminoglycoside of claim 1.

11. A compound according to claim 10 wherein the per-N-alkanoyl derivative is a per-N-acetyl derivative and wherein said 2''-deoxyaminoglycoside is 2''-deoxygentamicin $C_2$, said compound being per-N-acetyl-2''-deoxygentamicin $C_2$.

12. A compound selected from the group consisting of a 2''-O-hydrocarbonsulfonyl derivative of the following structural formulae I and II:

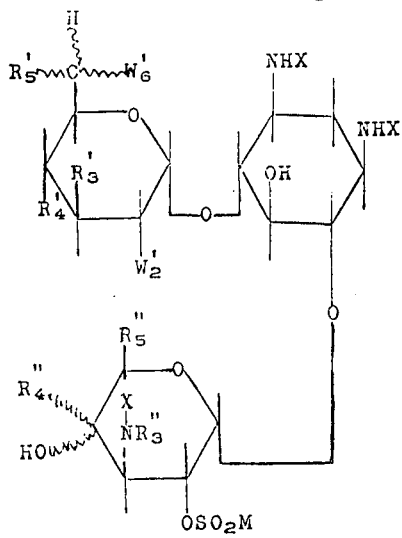

I

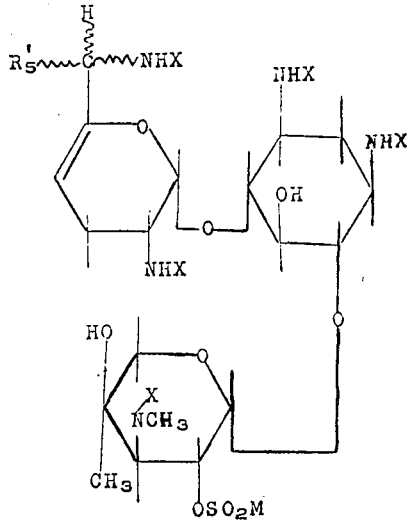

II wherein M is a hydrocarbon having up to 8 carbon atoms; X is a member selected from the group consisting of lower alkanoyl, carbobenzyloxy, lower thioalkanoyl, thioaroyl having up to 8 carbon atoms, and lower alkylthiocarbamoyl, $W_2'$ is a member selected from the group consisting of hydroxy and —NHX, X being as defined hereinabove; $W_6'$ is a member selected from the group consisting of hydroxy, —NHX and

X being as defined hereinabove; $R_3'$ and $R_4'$ are each members selected from the group consisting of hydrogen and hydroxy; $R_5'$, $R_3''$ and $R_4''$ are each members selected from the group consisting of hydrogen and methyl; and $R_5''$ is a member selected from the group consisting of hydrogen and hydroxymethyl; the cyclic ketals and cyclic acetals of protectable neighboring hydroxyl groups thereof; and when $R_5'$ is hydrogen and $W_6'$ is hydroxy, the 6'-O-hydrocarbonsulfonate and 6'-O-triphenylmethyl derivatives thereof; and when $R_5''$ is hydroxymethyl, the 6''-O-hydrocarbonsulfonate and 6''-O-triphenylmethyl derivatives thereof.

13. A compound according to claim 12 wherein $R_3''$ is methyl and $R_5''$ is hydrogen.

14. A compound according to claim 12, formula I, wherein M is methyl, $W_2'$ is —NHX, $R_3'$, $R_4'$ and $R_5''$ are hydrogen, $R_5'$, $R_3''$ and $R_4''$ are methyl and $W_6'$ is

said composed compound being per-N-X-2''-O-methanesulfonylgentamicin $C_1$, wherein X is a member selected from the group consisting of lower alkanoyl and carbobenzyloxy.

15. A compound according to claim 12, wherein M is methyl; $W_2'$ and $W_6'$ are —NHX; $R_3'$, $R_4'$, $R_5'$ and $R_5''$ are hydrogen; and $R_3''$ and $R_4''$ are methyl; said compound being per-N-X-2''-O-methanesulfonylgentamicin $C_{1a}$ wherein X is a member selected from the group consisting of lower alkanoyl and carbobenzyloxy.

16. A compound according to claim 12, formula I, wherein M is methyl, $W_2'$ and $W_6'$ are —NHX; $R_3'$, $R_4'$ and $R_5''$ are hydrogen; $R_5'$, $R_3''$ and $R_4''$ are methyl; the stereochemistry at $C_6'$ being R; said compound being per-N-X-2''-O-methanesulfonylgentamicin $C_2$ wherein X is a member selected from the group consisting of lower alkanoyl and carbobenzyloxy.

17. A compound according to claim 12, formula I, wherein M is methyl; $W_2'$ and $W_6'$ are —NHX; $R_3'$, $R_4'$ and $R_5''$ are hydrogen; $R_5'$, $R_3''$ and $R_4''$ are methyl; the stereochemistry at $C_6'$ being S, said compound being per-N-X-2''-O-methanesulfonylgentamicin $C_{2a}$ wherein X is a member selected from the group consisting of lower alkanoyl and carbobenzyloxy.

18. A compound according to claim 12, formula II, wherein M is methyl and $R_5'$ is hydrogen, said compound being per-N-X-2''-O-methanesulfonylsisomicin wherein X is a member selected from the group consisting of lower alkanoyl and carbobenzyloxy.

19. A compound according to claim 12, formula II, wherein M is methyl and $R_5'$ is methyl, said compound being per-N-X-2''-O-methanesulfonylverdamicin wherein X is a member selected from the group consisting of lower alkanoyl and carbobenzyloxy.

20. A compound selected from the group consisting of a 2''-deoxy-2''-sulfhydryl-aminoglycoside derivative of following formulae I and II:

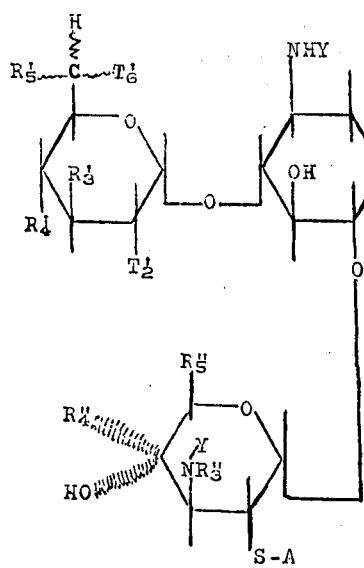 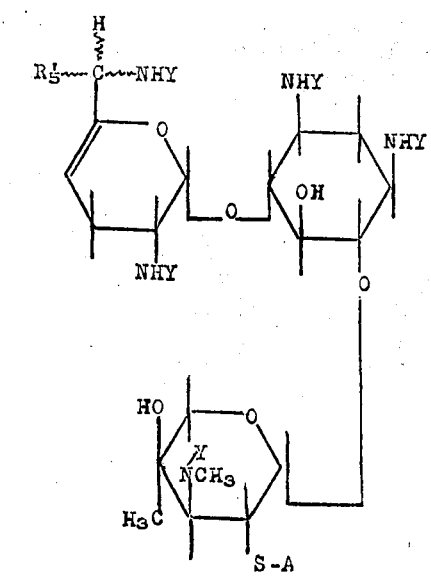

I  II wherein A is a member selected from the group consisting of hydrogen, a hydrocarbon having up to eight carbon atoms, and lower alkanoyl; Y is a member selected from the group consisting of hydrogen, lower alkanoyl, carbobenzyloxy and lower alkylcarbamoyl; $T_2'$ is a member selected from the group consisting of hydroxy and —NHY, Y being as defined hereinabove; $T_6'$ is a member selected from the group consisting of hydroxy, —NHY and

Y being as defined hereinabove; $R_3'$ and $R_4'$ are each members selected from the group consisting of hydrogen and hydroxy; $R_5'$, $R_3''$ and $R_4''$ are each a member selected from the group consisting of hydrogen and methyl; $R_5''$ is a member selected from the group consisting of hydrogen and hydroxymethyl; and the cyclic ketal and cyclic acetal derivatives of protectable neighboring hydroxyl groups thereof.

21. A compound according to claim 20, Formula I, wherein A is ethyl, Y is acetyl, $T_2'$ and $T_6'$ are each acetamido; $R_3'$, $R_4'$, $R_5'$ and $R_5''$ are hydrogen; and $R_3''$ and $R_4''$ are each methyl; said compound being 2''-deoxy-2''-ethylthio-1,3,2',6',3''-penta-N-acetylgentamicin $C_{1a}$.

22. A compound selected from the group consisting of a 2''-deoxy-3''-desamino-2'',3''-epimino-aminoglycoside of following formulae I and II:

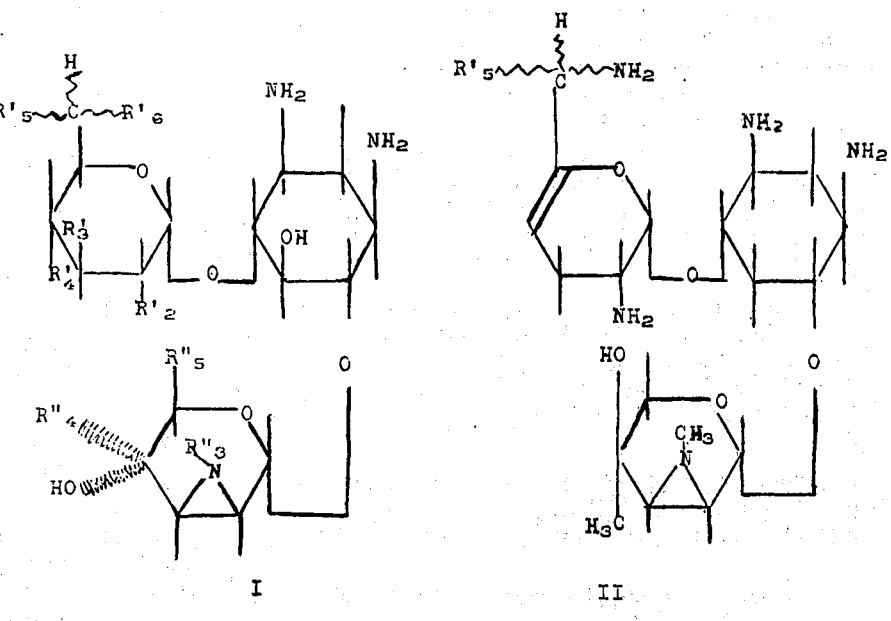

wherein $R_2'$ is a member selected from the group consisting of amino and hydroxy; $R_3'$ and $R_4'$ are members selected from the group consisting of hydrogen and hydroxy; $R_5'$, $R_3''$ and $R_4''$ are members selected from the group consisting of hydrogen and methyl; $R_6'$ is a member selected from the group consisting of hydroxy, amino and methylamino; and $R_5''$ is a member selected from the group consisting of hydrogen and hydroxymethyl; and the cyclic ketals and cyclic acetals of protectable neighboring hydroxyl groups thereof.

23. A compound according to claim 22, formula I, wherein $R_2'$ is amino; $R_3'$, $R_4'$ and $R_5''$ are hydrogen; $R_5'$, $R_3''$ and $R_4''$ are methyl; and $R_6'$ is methylamino; said compound being 2''-deoxy-3''-desmethylamino-2'',3''-N-methylepimino-gentamicin $C_1$.

24. A compound according to claim 22, formula I, wherein $R_2'$ and $R_6'$ are amino; $R_3'$, $R_4'$, $R_5'$ and $R_5''$ are hydrogen; $R_3''$ and $R_4''$ are methyl; said compound being 2''-deoxy-3''-desmethylamino-2'',3''-N-methylepimino-gentamicin $C_{1a}$.

25. A compound according to claim 22, formula I, wherein $R_2'$ and $R_6'$ are amino; $R_3'$, $R_4'$ and $R_5''$ are hydrogen; and $R_5'$, $R_3''$ and $R_4''$ are methyl, the configuration at $C_6'$ being R; said compound being 2''-deoxy-3''-desmethylamino-2'',3''-N-methylepiminogentamicin $C_2$.

26. A compound according to claim 22, formula I, wherein $R_2'$ and $R_6'$ are amino; $R_3'$, $R_4'$ and $R_5''$ are hydrogen; and $R_5'$, $R_3''$ and $R_4''$ are methyl, the configuration at $C_6'$ being S, said compound being 2''-deoxy-3''-desmethylamino-2'',3''-N-methylepiminogentamicin $C_{2a}$.

27. A compound according to claim 22, formula II, wherein $R_5'$ is methyl, said compound being 2''-deoxy-3''-desmethylamino-2'',3''-N-methyl-epiminoverdamicin.

28. A compound according to claim 22, formula II, wherein $R_5'$ is hydrogen, said compound being 2''-deoxy-3''-desmethylamino-2'',3''-N-methylepiminosisomicin.

29. A compound selected from the group consisting of a 2''-deoxy-3''-desamino-2''-epi-amino-3''-epi-sulfhydrylaminoglycoside derivative of following formulae I and II:

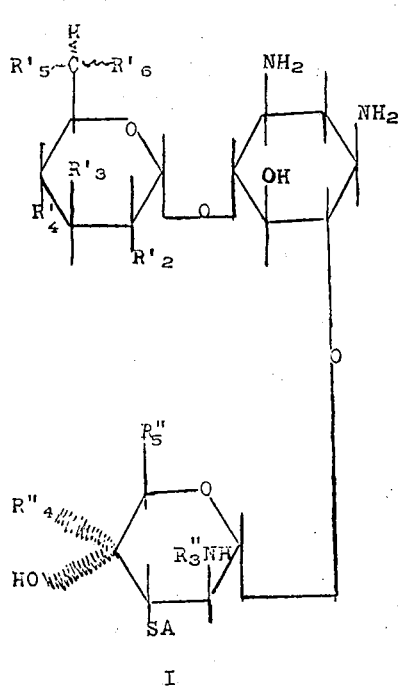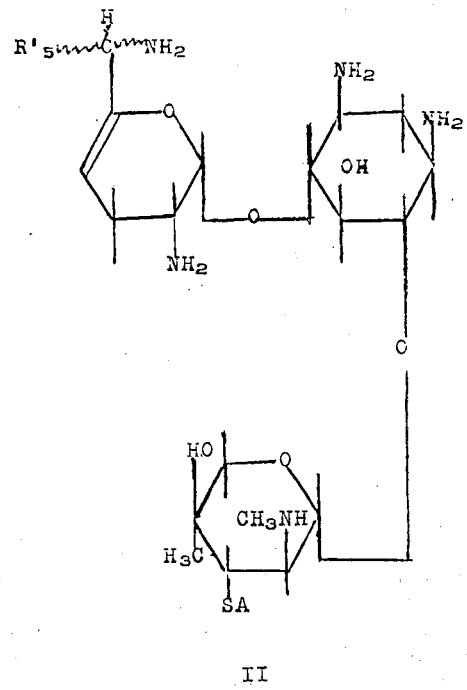

I  II wherein A is a member selected from the group consisting of hydrogen, hydrocarbon having up to 8 carbon atoms, and lower alkanoyl; $R_2'$ is a member selected from the group consisting of amino and hydroxy; $R_3'$ and $R_4'$ are each members selected from the group consisting of hydrogen and hydroxy; $R_5'$, $R_3''$ and $R_4''$ are each selected from the group consisting of hydrogen and methyl; $R_6'$ is a member selected from the group consisting of hydroxy, amino, and methylamino, and $R_5''$ is a member selected from the group consisting of hydrogen and hydroxymethyl; cyclic ketals and cyclic acetals of protectable neighboring hydroxyl groups thereof; and per-N-substituted derivatives of the foregoing selected from the group consisting of per-N-lower alkanoyl, per-N-lower alkylcarbamoyl and per-N-carbobenzyloxy.

30. The process for preparing a 2''-deoxy 4,6-di-(aminoglycosyl)-2-deoxystreptamine which comprises treating an antibacterially active 4,6-di-(aminoglycosyl)-2-deoxystreptamine having a 2''-hydroxy function, the primary and secondary amino groups of which are protected by a lower alkanoyl, and protectable primary and secondary hydroxyl groups of which are converted to an O-protecting function selected from the group consisting of a triphenylmethyl ether of a primary hydroxyl group and a cyclic ketal or acetal of protectable neighboring hydroxyl groups; with a hydrocarbonsulfonyl halide having up to eight carbon atoms in a tertiary amine whereby is formed a 2''-O-hydrocarbonsulfonylaminoglycoside intermediate;

converting said 2''-O-hydrocarbonsulfonylaminoglycoside intermediate to a 2''-thio-2''-deoxyaminoglycoside intermediate by treating a per-N-lower alkanoyl-2''-O-hydrocarbonsulfonylaminoglycoside with an alkali metal salt of a lower alkylthiol in an anhydrous, polar, non-hydroxylic solvent, optionally followed by acid hydrolysis of any O-protecting functions present, whereby the 2''- thio-2''-deoxy intermediate formed is a 2''-lower alkylthio-2''-deoxy-per-N-lower alkanoylaminoglycoside;

treating said 2''-thio-2''-deoxyaminoglycoside intermediate with a reductive desulfurization agent selected from the group consisting of Raney Nickel and aluminum amalgam, followed by alkaline hydrolysis of any amino protecting groups, whereby is obtained a 2''-deoxyaminoglycoside.

31. The process according to claim 30 wherein said antibacterially active 4,6-di-(aminoglycosyl)-2-deoxystreptamine having a 2''-hydroxy function is a member selected from the group consisting of sisomicin, verdamicin, a gentamicin selected from the group consisting of gentamicin A, gentamicin B, gentamicin $B_1$, gentamicin $C_1$, gentamicin $C_{1a}$, gentamicin $C_2$, gentamicin $C_{2a}$, gentamicin $X_2$ and mixtures thereof, tobramycin, 3',4'-dideoxykanamycin B, Antibiotic JI-20-A, Antibiotic JI-20-B and Antibiotic G-418, whereby is obtained the corresponding 2''-deoxyaminoglycoside antibiotic derivative selected from the group consisting of:

2''-deoxysisomicin,

2''-deoxyverdamicin, a 2''-deoxygentamicin selected from the group consisting of 2''-deoxygentamicin A, 2''-deoxygentamicin B, 2''-deoxygentamicin $B_1$, 2''-deoxygentamicin $C_1$, 2''-deoxygentamicin $C_{1a}$, 2''-deoxygentamicin $C_2$, 2''-deoxygentamicin $C_{2a}$, gentamicin $X_2$ and mixtures thereof, 2''-deoxytobramycin, 3',4',2''-trideoxykanamycin B, 2''-deoxy-Antibiotic JI-20-A, 2''-deoxy-Antibiotic JI-20-B, and 2''-deoxy-Antibiotic-G-418.

32. The process according to claim 30 wherein the primary and secondary amino groups are protected by acetyl; wherein said hydrocarbonsulfonyl halide in a tertiary amine is methanesulfonyl chloride in pyridine; wherein said 2''-thio-2''-deoxyaminoglycoside intermediate is 2''-ethylthio-2''-deoxy-per-N-acetylaminoglycoside prepared by treating the corresponding per-N-acetyl-2''-O-methanesulfonylaminoglycoside with the lithium salt of ethanethiol in anhydrous dimethylformamide.

33. The process for preparing a 2''-deoxy-4,6-di-(aminoglycosyl)-2-deoxystreptamine which comprises treating an antibacterially active 4,6-di-(aminoglycosyl)-2-deoxystreptamine having a 2''-hydroxy function and a 3''-primary or secondary amino function, the primary and secondary amino groups of which are protected by a carbobenzyloxy group, and protectable neighboring primary and secondary hydroxyl groups of which are converted to a cyclic ketal or cyclic acetal function, with a hydrocarbonsulfonyl halide having up to eight carbon atoms in a tertiary amine;

removing the carbobenzyloxy groups from the 2''-O-hydrocarbonsulfonyl-per-N-carbobenzyloxyaminoglycoside thereby formed by treatment with hydrogen in the presence of a catalyst, or by cleavage with an alkali metal in liquid ammonia;

converting the resulting 2''-O-hydrocarbonsulfonylaminoglycoside to the corresponding 2''-deoxy-3''-desamino-2'',3''-epimino-aminoglycoside intermediate by spontaneous transformation or by heating in a lower alkanol either alone or together with an alkali metal salt of said alkanol, at temperatures in the range of from about 25° to about 100°C;

cleaving the 2''-deoxy-3''-desamino-2'',3''-epiminoaminoglycoside thereby formed by (1) treatment with hydrogen in the presence of a catalyst, followed by acid hydrolysis of any acetal or ketal function; or (2) N-derivatization, followed by treatment of the resulting per-N-protected-2''-deoxy-3''-desamino-2'',3''-epiminoaminoglycoside with hydrogen in the presence of a catalyst, followed by acid hydrolysis of any acetal or ketal function and alkaline hydrolysis of said N-protecting groups; or (3) N-derivatization followed by quaternization with a benzyl halide of the epimino function, treatment of the resulting per-N-protected-2''-deoxy-3''-desamino-2'',3''-(N-methyl-N-benzyl) epiminoaminoglycoside quaternary halide salt with hydrogen in the presence of a catalyst followed by acid hydrolysis of any ketal or acetal functions and alkaline hydrolysis of said N-protecting groups; or (4) treatment with a sulfur nucleophile whereby is obtained a product mixture comprising a 2''-deoxy-2''-sulfhydryl-aminoglycoside and a 2''-deoxy-3''-desamino-2''-epi-amino-3''-epi-sulfhydryl-aminoglycoside or thiol hydrocarbon ether or thiol alkanoyl ester derivatives thereof wherein said hydrocarbon and said alkanoyl have up to 8 carbon atoms, followed by desulfurization of said product mixture and acid hydrolysis of any acetal or ketal functions or alternatively, followed by desulfurization of a per-N-protected derivative of said product mixture, thence acid hydrolysis of any ketal or acetal function followed by alkaline hydrolysis of said N-protecting groups;

whereby is obtained a product mixture comprising a 2''-deoxyaminoglycoside and a 2''-deoxy-3''-desamino-2''-epi-aminoglycoside.

34. The process according to claim 33 wherein said antibacterially active 4,6-di-(aminoglycosyl)-2-deoxystreptamine having a 2''-hydroxy group is a member selected from the group consisting of sisomicin, verdamicin, tobramycin, 3',4'-dideoxykanamycin B, Antibiotic JI-20-A, Antibiotic JI-20-B, Antibiotic G-418, and a gentamicin selected from the group consisting of gentamicin A, gentamicin B, gentamicin $B_1$, gentamicin $C_1$, gentamicin $C_{1a}$, gentamicin $C_2$, gentamicin $C_{2a}$, gentamicin $X_2$ and mixtures thereof, and wherein any protectable hydroxyl groups are protected by an O-isopropylidene function.

35. The process according to claim 33 wherein said hydrocarbonsulfonyl halide in a tertiary amine is methanesulfonyl chloride in pyridine; wherein said carbobenzyloxy groups are removed from said 2''-O-methanesulfonyl-per-N-carbobenzyloxyaminoglycoside by treatment with hydrogen in the presence of palladium-on-charcoal; and said 2''-O-methanesulfonylaminoglycoside is converted to said 2''-deoxy-3''-desmethylamino-2'',3''-epimino-aminoglycoside intermediate by heating said 2''-O-methanesulfonylaminoglycoside in ethanol at reflux temperature in the presence of sodium methoxide and wherein said 2''-deoxy-3''-desamino-2'',3'' epimino-aminoglycoside is hydrogenolyzed by treatment in ethanol with hydrogen in the presence of Raney Nickel.

36. The process according to claim 33 wherein said antibacterially active 4,6-di-(aminoglycosyl)-2-deoxystreptamine having a 2''-hydroxy function is gentamicin $C_2$; wherein said hydrocarbonsulfonyl halide in a tertiary amine is methanesulfonyl chloride in pyridine; wherein said carbobenzyloxy groups are removed from said 2''-O-methanesulfonyl-per-N-carbobenzyloxygentamicin $C_2$ by treatment in ethanol with hydrogen in the presence of palladium-on-charcoal; and, wherein the thereby formed 2''-O-methanesulfonylgentamicin $C_2$ spontaneously converts to 2''-deoxy-3''-desmethylamino-2'',3''-N-methylepiminogentamicin $C_2$.

* * * * *

UNITED STATES PATENT OFFICE
CERTIFICATE OF CORRECTION

Patent No. 3,920,628  Dated November 18, 1975

Inventor(s) Peter J. L. Daniels

It is certified that error appears in the above-identified patent and that said Letters Patent are hereby corrected as shown below:

Column 2, lines 38 and 39, "Included are 2'$\lambda$'-O-hydrocarbonsulfonyl" should read ---Included are 2"-O-hydrocarbonsulfonyl---.

Column 7, line 66, "formula Ia and" should read ---formula I'a and---. Column 12, line 37, "tetra-n-acetyl" should read ---tetra-N-acetyl---. Column 18, line 31, "and Z" is lower alkanoyl, aroyl or alkylcarbamoyl" should read ---and Z "is lower alkanoyl, aroyl or alkylcarbamoyl"---. Column 26, line 51, "of tobyramycin" should read ---of tobramycin---. Column 30, line 4, "a 2"-eip-sulfhydryl" should read ---a 2"-epi-sulfhydryl---; line 5, "a 2"-eip-sulfhydryl" should read ---a 2"-epi-sulfhydryl---; line 22, "a 2'$\lambda$'-epi-sulfhydryl" should read ---a 2"-epi-sulfhydryl---; line 24, "e.g. 2"-eip-sulfhydryl" should read ---e.g. 2"-epi-sulfhydryl---. Column 34, line 64, "m.p. = 36°C" should read ---m.p. = 360°C---. Column 35, line 5, "1,3,2',6',3'-penta" should read ---1,3,2',6',3"-penta---. Column 36, line 9, "gentamicin in A," should read ---gentamicin A,---. Column 46, line 30, "     " should read ---1,3,2',6',3"-penta-N-thioacetylgentamicin $C_{1a}$,---. Column 53, line 23, "-3',4'-O-isopropylidenell,3,2'-" should read ---3',4'-O-isopropylidene-1,3,2'---; line 26, "-2"-O-methanesulfonyl14',6'-" should read ---2"-O-methanesulfonyl-4',6'---; line 29, "a mixture comprising 2"-O-methanesulfonyl12',3'-" should read ---a mixture comprising 2"-O-methanesulfonyl-2',3'---; lines 44 and 45, "inpyridine yields 2"-O-methanesulfonyl14",6"-O-" should read ---in pyridine yields 2"-O-methanesulfonyl-4",6"-O---. Column 57, line 58, "$[(C_2H_5)_3 NH^+]$" should read ---$[(C_2H_5)_3 NH^{\oplus}]$---. Column 58, line 31, "and 1,3,2',3"-tetra-N-(N"-" should read ---and 1,3,2',3"-tetra-N-(N'---. Column 60, line 1, "; and 2'-epi-sulfhydryl-2'-deoxygentamicin $X_2$" should read ---; and 2"-epi-sulfhydryl-2"-deoxygentamicin $X_2$---; line 45, "(or N-methylthiocarbamoyl)" should read ---(or N'-methylthiocarbamoyl)---. Column 61, lines 6 and 7, "N-thioacetyl-3'-3'-dideoxy-" should read ---N-thioacetyl-3',4'-dideoxy---; line 19, "(or N"-methyl-

UNITED STATES PATENT OFFICE
CERTIFICATE OF CORRECTION

Patent No. 3,920,628   Dated November 18, 1975

Inventor(s) Peter J. L. Daniels

It is certified that error appears in the above-identified patent and that said Letters Patent are hereby corrected as shown below:

thiocarbamoyl)" should read ---(or N'-methylthiocarbamoyl)---;

Column 62, line 27, "similar to the described" should read ---similar to that described---. Column 65, line 59, "-2"-o-methanesulfonyl-" should read ---2"-$\underline{O}$-methanesulfonyl---. Column 66, line 34, "described in Example 19E(1-" should read ---described in Example 19D(1 and---. Column 67, lines 8 and 9, "-3"-epi-sulfhydrylgentamimcin $C_2$" should read ---3"-epi-sulfhydrylgentamicin $C_2$---.

Signed and Sealed this

Seventh Day of December 1976

[SEAL]

Attest:

RUTH C. MASON
Attesting Officer

C. MARSHALL DANN
Commissioner of Patents and Trademarks